US005724499A

United States Patent [19]

Nishiyama et al.

[11] Patent Number: 5,724,499

[45] Date of Patent: Mar. 3, 1998

[54] IMAGE GENERATING APPARATUS

[75] Inventors: Soichi Nishiyama; Masatoshi Arai; Koichi Murakami, all of Kawasaki, Japan

[73] Assignee: Fujitsu Limited, Kawasaki, Japan

[21] Appl. No.: 369,110

[22] Filed: Jan. 5, 1995

[30] Foreign Application Priority Data

| | | | |
|---|---|---|---|
| Jan. 7, 1994 | [JP] | Japan | 6-000455 |
| Mar. 15, 1994 | [JP] | Japan | 6-044480 |
| Mar. 17, 1994 | [JP] | Japan | 6-047541 |
| Oct. 28, 1994 | [JP] | Japan | 6-265728 |
| Dec. 28, 1994 | [JP] | Japan | 6-328847 |

[51] Int. Cl.[6] ........ H04N 1/21

[52] U.S. Cl. ........ 395/173

[58] Field of Search ........ 395/152, 118, 395/100, 173; 345/122; 348/571

[56] References Cited

U.S. PATENT DOCUMENTS

| | | | |
|---|---|---|---|
| 4,731,672 | 3/1988 | Sugishima et al. | 358/296 |
| 5,381,158 | 1/1995 | Takahara et al. | 345/156 |
| 5,381,526 | 1/1995 | Ellson | 395/164 |
| 5,420,703 | 5/1995 | Sakai et al. | 358/501 |
| 5,454,075 | 9/1995 | Kudo | 395/164 |

*Primary Examiner*—Phu K. Nguyen
*Assistant Examiner*—Cliff N. Vo
*Attorney, Agent, or Firm*—Staas & Halsey

[57] ABSTRACT

An image generating apparatus has a command interpreting unit for interpreting external commands, an information storage unit for storing information for image generation, an image selecting unit for selecting desired images from the information stored in the information storage unit, and an image display unit for displaying the images selected by the image selecting unit. The information storage unit includes an image information unit where image information is stored and a reference information unit where information for selecting images that produce natural visual effects is stored. Based on the information retrieved from the reference information unit, the image selecting unit selects and generates images in accordance with the content of interpretation from the command interpreting unit and within a range that produces natural visual effects.

32 Claims, 54 Drawing Sheets

52-1
51
SIMILARITY INFORMATION
IMAGE INFORMATION
A
1st FRAME
3rd FRAME
n-th FRAME
1st FRAME
2nd FRAME
n-th FRAME
B
1st FRAME
4th FRAME
m-th FRAME
1st FRAME
2nd FRAME
m-th FRAME
C
1st FRAME
2nd FRAME
p-th FRAME
1st FRAME
2nd FRAME
p-th FRAME
D
1st FRAME
2nd FRAME
q-th FRAME
1st FRAME
2nd FRAME
q-th FRAME b:KEY FRAME

COMBINATION

FRAME INTERPOLATION b:KEY FRAME b1, b2:KEY FRAME

FIG. 5A
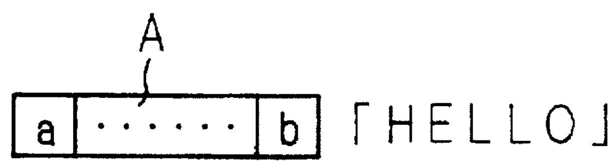
FIG. 5B
D
a
c
「GOOD-BY」
FIG. 5C
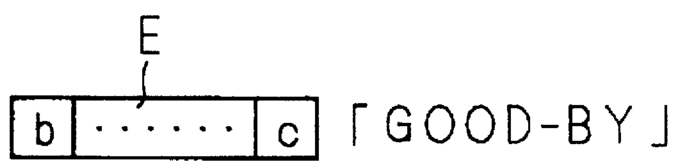
FIG. 5D
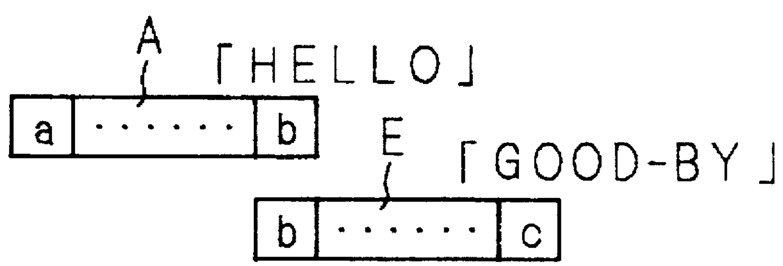

GEOMETRIC TRANSFORMATION

PERCEPTUAL FAKE

MAGNIFICATION

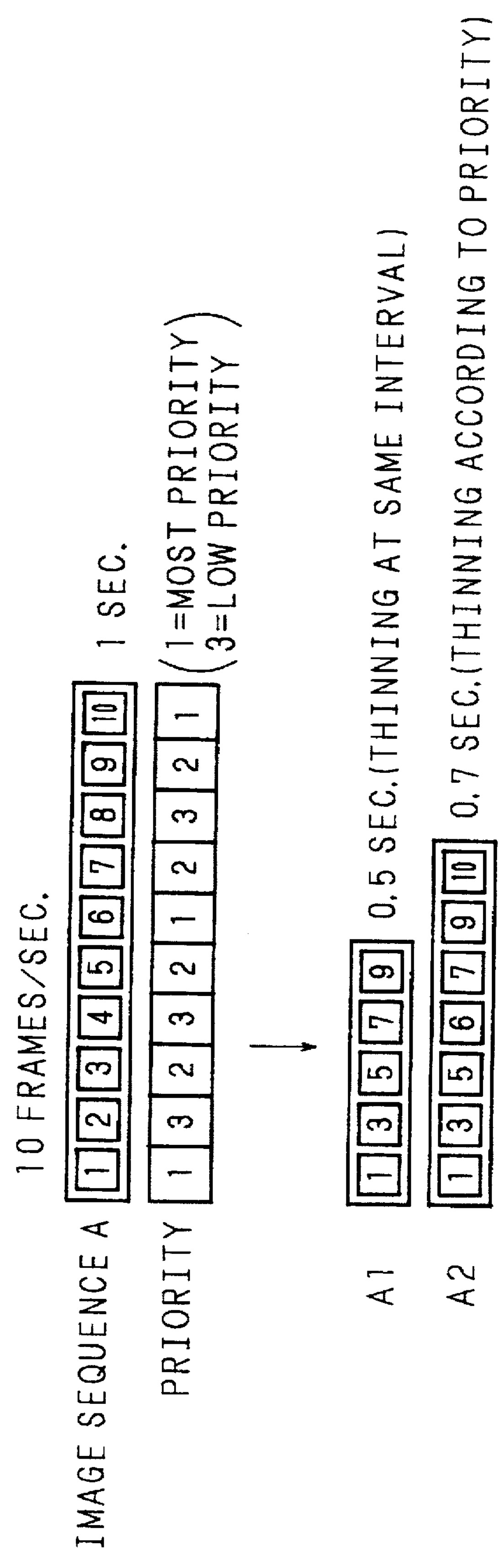
F I G. 9A
IMAGE SEQUENCE A
10 FRAMES/SEC.
1 2 3 4 5 6 7 8 9 10
1 SEC.
PRIORITY
1 3 2 3 2 1 2 3 2 1
1=MOST PRIORITY
3=LOW PRIORITY
A1
1 3 5 7 9
0.5 SEC.(THINNING AT SAME INTERVAL)
A2
1 3 5 6 7 9 10
0.7 SEC.(THINNING ACCORDING TO PRIORITY)

FIG. 24A
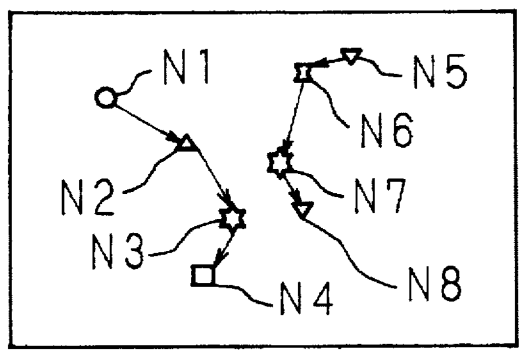
FIG. 24B
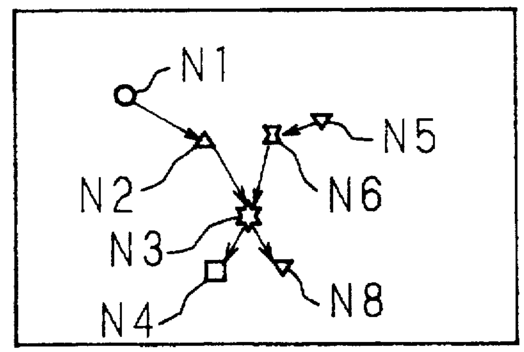
FIG. 24C
| TYPE ID | NODE POINTER |
|---|---|
| ○ | *N1 |
| △ | *N2 |
| ✡ | *N3 |
| □ | *N4 |
| ▽ | *N5, *N8 |
| ⧗ | *N6 |

FIG. 26

SORT BY X ↓

| ORDER | NODE POINTER |
|---|---|
| 1 | *n1 |
| 2 | *n6 |
| 3 | *n2 |
| 4 | *n7 |
| 5 | *n8 |
| 6 | *n3 |
| 7 | *n11 |
| 8 | *n9 |
| 9 | *n10 |
| 10 | *n20 |
| 11 | *n4 |
| 12 | *n14 |
| 13 | *n18 |
| 14 | *n12 |
| 15 | *n13 |
| 16 | *n16 |
| 17 | *n17 |
| 18 | *n15 |
| 19 | *n5 |
| 20 | *n19 |

FIG. 27A

| | PATH 1 | PATH 2 | PATH 3 | PATH 4 | PATH 5 | PATH 6 | PATH 7 |
|---|---|---|---|---|---|---|---|
| PATH 1 | 0.0 | 0.266 | 0.450 | 0.600 | 0.0 | 0.0 | 0.0 |
| PATH 2 | 0.533 | 0.0 | 0.0 | 0.0 | 0.0 | 0.0 | 0.0 |
| PATH 3 | 0.300 | 0.0 | 0.0 | 0.0 | 0.0 | 0.562 | 0.0 |
| PATH 4 | 0.200 | 0.0 | 0.0 | 0.0 | 0.500 | 0.0 | 0.0 |
| PATH 5 | 0.0 | 0.0 | 0.0 | 0.333 | 0.0 | 0.0 | 0.0 |
| PATH 6 | 0.0 | 0.0 | 0.250 | 0.0 | 0.0 | 0.0 | 0.500 |
| PATH 7 | 0.0 | 0.0 | 0.0 | 0.0 | 0.0 | 0.333 | 0.0 |

FIG. 27B

| | PATH 1 | PATH 2 | PATH 3 | PATH 4 | PATH 5 | PATH 6 | PATH 7 |
|---|---|---|---|---|---|---|---|
| PATH 1 | 0.0 | 0.266 | 0.450 | 0.600 | 0.300 | 0.252 | 0.0 |
| PATH 2 | 0.533 | 0.0 | 0.239 | 0.319 | 0.0 | 0.0 | 0.0 |
| PATH 3 | 0.300 | 0.079 | 0.0 | 0.180 | 0.0 | 0.562 | 0.281 |
| PATH 4 | 0.200 | 0.053 | 0.090 | 0.0 | 0.500 | 0.0 | 0.0 |
| PATH 5 | 0.066 | 0.0 | 0.0 | 0.333 | 0.0 | 0.0 | 0.0 |
| PATH 6 | 0.075 | 0.0 | 0.250 | 0.0 | 0.0 | 0.0 | 0.500 |
| PATH 7 | 0.0 | 0.0 | 0.083 | 0.0 | 0.0 | 0.333 | 0.0 |

FROM

| | WALK | RUN | FLY |
|---|---|---|---|
| WALK | 1 | 1 | × |
| RUN | 1 | 1 | × |
| FLY | × | × | 1 |

IMAGE GENERATING APPARATUS

BACKGROUND OF THE INVENTION

1. Field of the Invention

The present invention relates to an image generating apparatus using a computer, and more particularly, to an image generating apparatus capable of providing experiences as if in the real world by generating successive images using some visual illusions (hereinafter called "fake") from a limited number of high-quality image patterns captured into the computer.

2. Description of Related Art

In recent years, demand for interaction between a human and a computer, such as man-machine interface or human-machine interface, has been increasing, and intuitive interactive methods utilizing the five senses of human beings have been developed using such technologies as artificial reality (AR) and virtual reality (VR). Also, in the field of personal computers (PCs), etc., apparatus, exemplified by game machines, have been introduced that have high-speed image generation and animation functions whereby images change in response to operations performed by human users.

However, when it comes to the naturalness of images, in particular, images of creatures such as dogs involve a great variety of movements, and in the prior art, to present such a variety of movements, it has only been possible to replay continuously recorded images such as movies or to prepare as many image patterns as possible by considering unlimited possibilities in response to every possible display command.

Such prior art systems have the following problems. With the system designed to produce continuous data sequences like movies, it has been difficult to realize the interaction (dialogue) with a computer that, is responsive enough to respond to the action performed by participants. On the other hand, with the system designed to replay sequences of image frames in response to display commands, it has been difficult to present the continuity of images since images are displayed in a noncontinuous manner in response to the display commands. That is, this system has the short-coming that if image quality is improved, realtime interactivity is lost, and if emphasis is placed on realtime interactivity, image quality suffers and naturalness is lost.

SUMMARY OF THE INVENTION

The present invention is intended to resolve the problems associated with the prior art, and it is an object of the invention to provide an image generating apparatus that is capable of generating images using some visual fakes from a finite number of successive image patterns captured into a computer so that successive movements of the images being generated by calculation in the computer look natural to the participant engaged in dialogue (interaction) with the computer.

It is another object of the invention to provide an image generating apparatus that is capable of presenting natural-looking images, without sacrificing realtime presentation and interactivity with a computer, by generating images using visual fakes from a finite number of successive images captured into the computer.

It is a further object of the invention to provide an image generating apparatus that is capable of moving an arbitrary image (for example, a character) to a desired position in a desired time and presenting a natural-looking display of the action of the arbitrary image without causing interruptions.

The above and further objects and features of the invention will more fully be apparent from the following detailed description with the accompanying drawings.

BRIEF DESCRIPTION OF THE DRAWINGS

FIGS. 5A, 5B, 5C, and 5D are diagrams for explaining the operation of image selection according to the embodiment of the present invention;

FIGS. 9A and 9B are diagrams for explaining thinning-in-time according to the embodiment of the present invention;

FIGS. 24A, 24B, and 24C are explanatory diagrams of the principle of a total graph;

FIG. 26 is a diagram showing a sorted table;

FIGS. 27A and 27B are diagrams showing transfer tables;

FIG. 35 is a diagram showing an action table;

DESCRIPTION OF THE PREFERRED EMBODIMENTS

The present invention will now be described in detail below with reference to the accompanying drawings illustrating the preferred embodiments thereof.

Figure 1A:
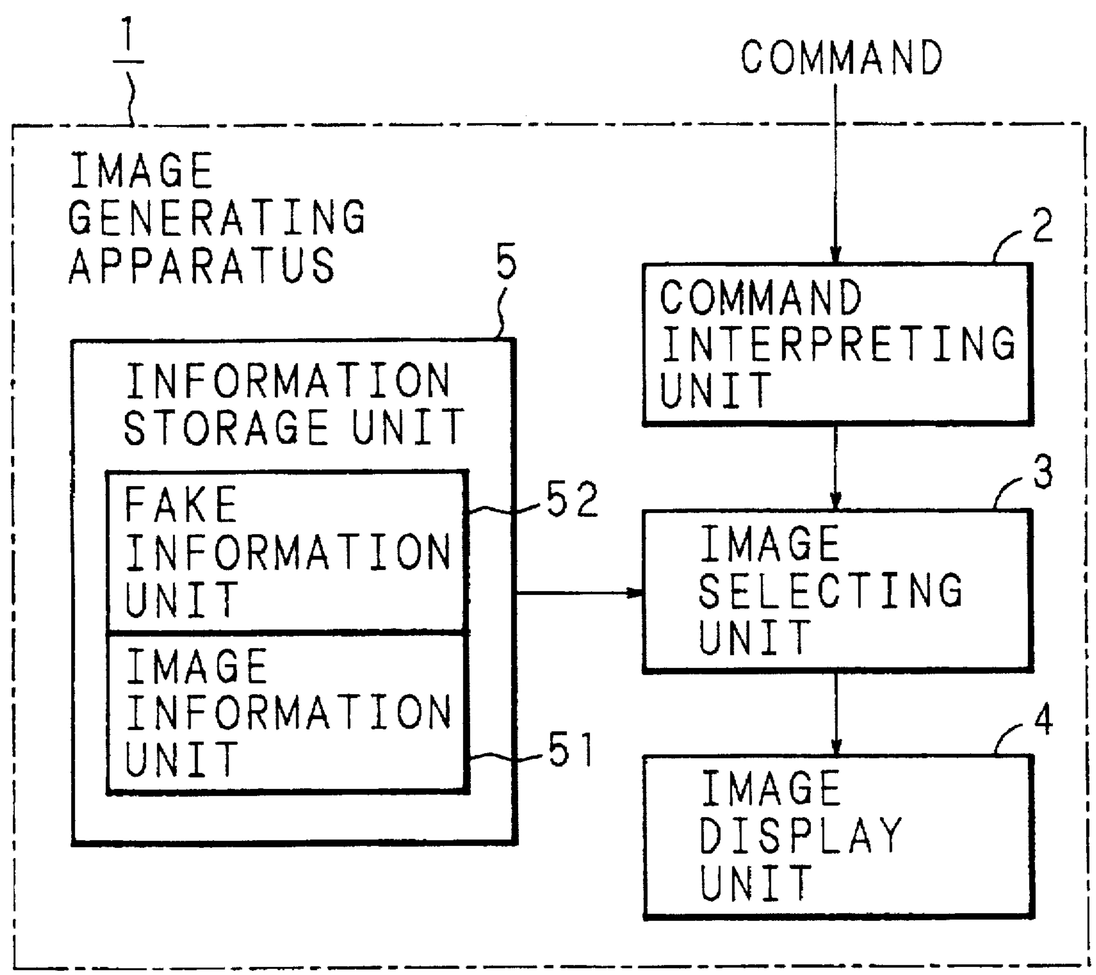
FIGS. 1A and 1B are diagrams for explaining the principle of the present invention.
Figure 1B:
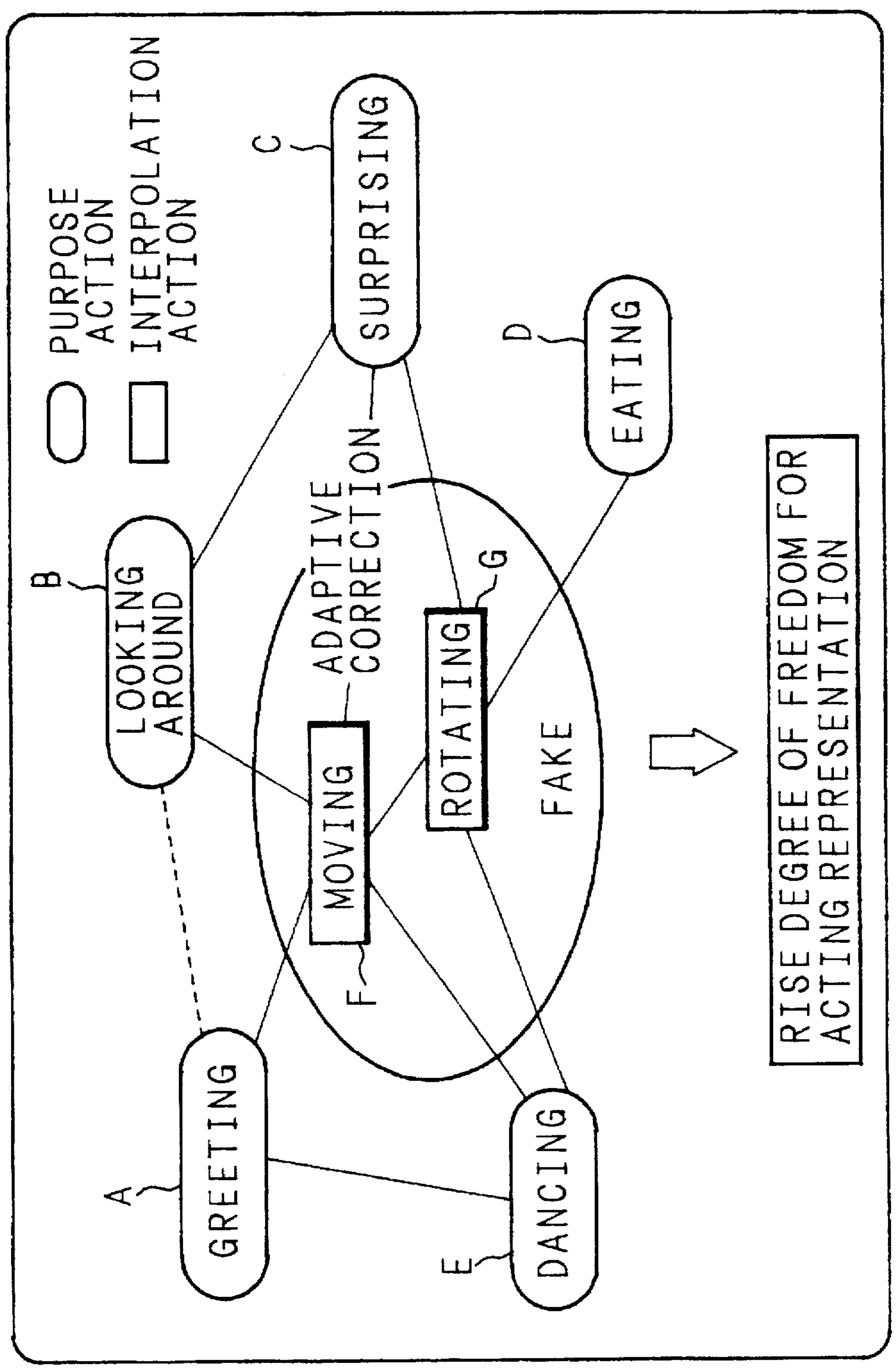

First, the principle of the present invention will be described. FIGS. 1A and 1B present diagrams for explaining the principle of the invention, where FIG. 1A shows a system configuration according to the invention. As shown in FIG. 1A, the image generating apparatus 1 of the invention has a command interpreting unit 2, an image selecting unit 3, an image display unit 4, and an information storage unit 5.

The command interpreting unit 2 determines the way how commands for generating intended images should be interpreted within the image generating apparatus 1. Based on fake information, and in accordance with the content of interpretation supplied from the command interpreting unit 2, the image selecting unit 3 selects and determines an image within a range that does not produce unnatural visual effects from the images stored in the information storage unit 5. The image display unit 4 displays the image information selected and determined by the image selecting unit 3.

The information storage unit 5 includes an image information unit 51, as database, and a fake information unit 52. In the image information unit 51, image sequences used for image generation are prestored, such as images of a purpose action, interpolation action, etc. hereinafter described. Fundamental position information and time information which are directly related to image information, information which indicates the feature of images, or the like are often added to the image sequences in the image information unit 51. The fake information unit 52 stores fake information in corresponding relationship to the images stored in the image information unit 51.

The fake information includes similarity information used when linking image sequences together, positional drift information indicating positional drift allowable areas, and thinning-in-time information for thinning or adding frames in an image sequence to accomplish time-scale adjustment when displaying the image sequence.

FIG. 1B is a diagram for explaining natural moving actions. In FIG. 1B, examples of purpose action and interpolation action, respectively, are shown; image information relating to these actions is stored in the image information unit 51. Actions, such as "Greeting" A, "Looking around" B, "Surprising" C, "Eating" D, and "Dancing" E, are called purpose actions and interpolation actions, such as "Moving" F and "Rotating" G, are used to link these purpose actions together.

The basic operation of the present invention will be described with reference to FIG. 1. A command for generating an intended image is inputted to the command interpreting unit 2, which determines the way how the command should be interpreted within the image generating apparatus 1. The following description deals with an example in which a command requesting to link tile purpose action of "Greeting" A with the purpose action of "Looking around" B is accepted by the command interpreting unit 2.

When the above described content of interpretation determined by the command interpreting unit 2 is inputted to the image selecting unit 3, the image selecting unit 3 compares, for example, the last frame of "Greeting" A with the first frame of "Looking around" B stored in the image information storage unit 5 on the basis of their corresponding fake information stored in the fake information unit 52. If the result of the comparison shows that the last frame is similar to the first frame, these can be connected directly. On the other hand, if there is a positional displacement between the two frames, for example, correction of the positional displacement is made by inserting between these two frames frames of "Movement" F, for example, which is an interpolation action that does not produce unnatural visual effects. When linking actions, making correction to the extent that unnatural visual effects are not caused is called adaptation. Using this technique, the image of "Greeting" A can be connected continuously with the image of "Looking around" B.

In this manner, by making adaption to the extent that unnatural visual effects are not caused, that is, by applying fake when generating images, the same image can be used in various kinds of scenes. In the case of an image of a creature's behavior, for example, this increases the degree of freedom of action representation for the creature. Furthermore, the images are not limited in application to two-dimensional monoscopic image representation but can also be used for three-dimensional image display (e.g., two-images stereoscopic view, lenticular method, and holography).

(1) Description of image generation using characteristic frames (hereinafter called "key frames")

Figure 2A:
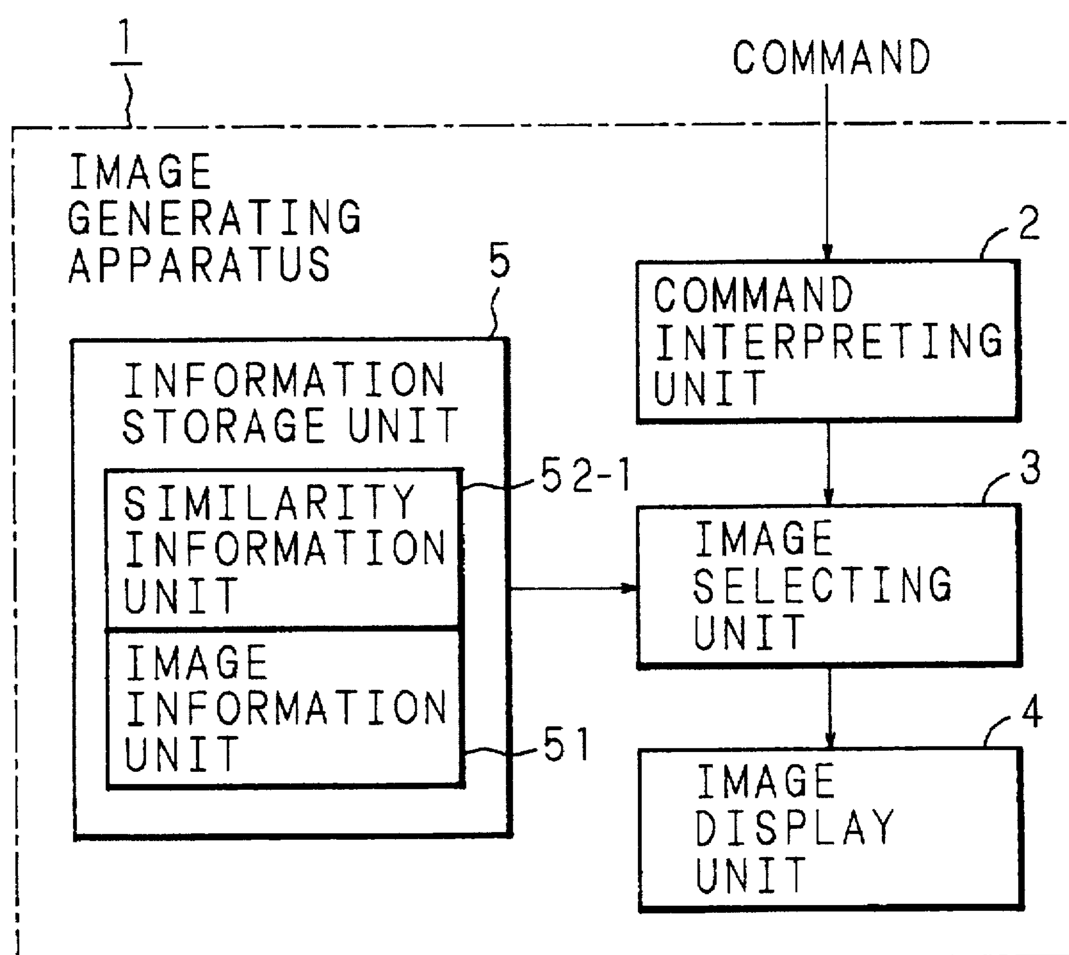
FIGS. 2A and 2B are diagrams illustrating the system configuration according to an embodiment of the present invention.
Figure 2B:
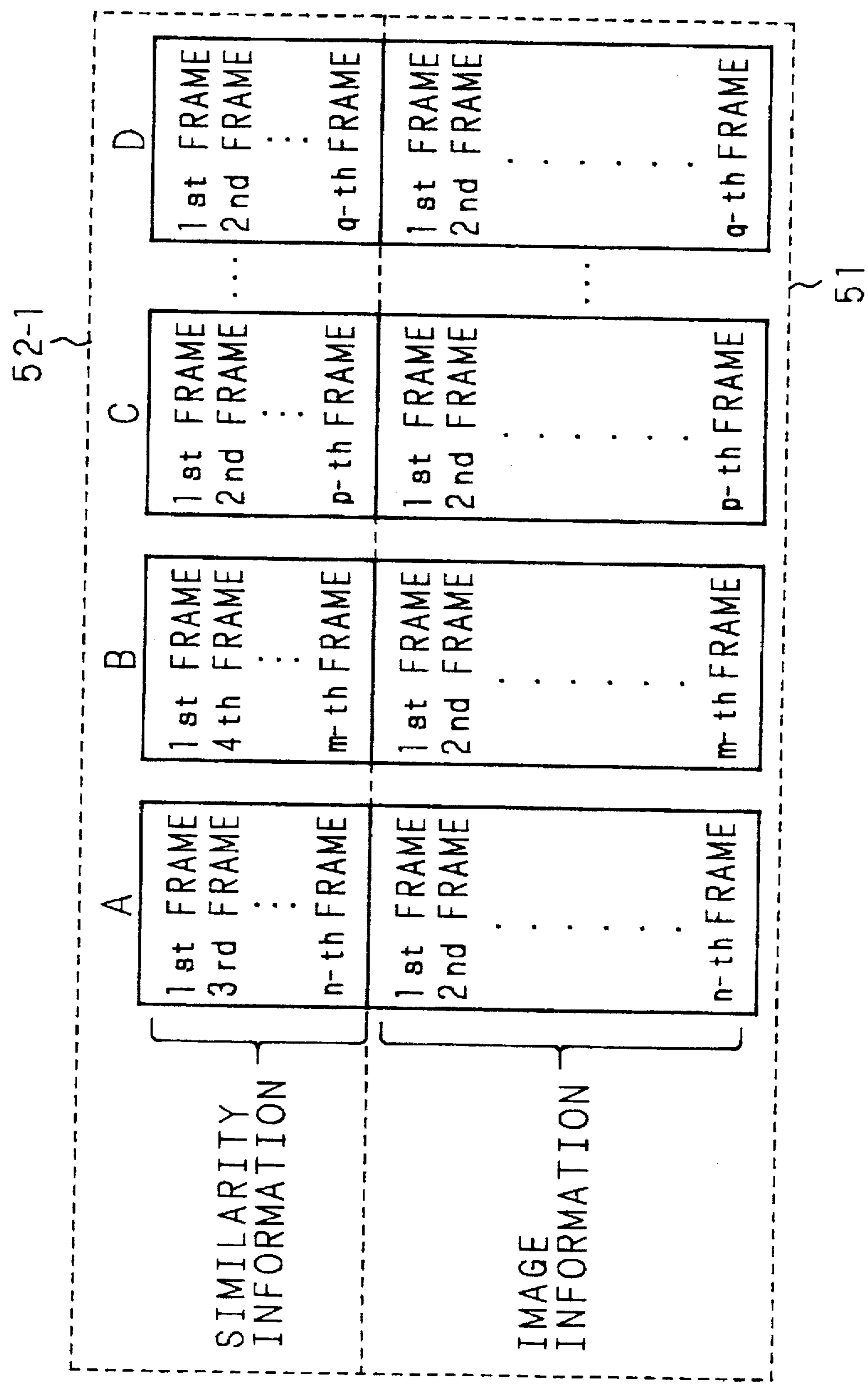

① Description of configuration of image generating apparatus using similarity information FIG. 2A is a diagram showing the configuration of an image generating apparatus using similarity information according to one embodiment of the invention. The same parts as those shown in FIG. 1A are designated by the same reference numerals. The image generating apparatus of this embodiment has a command interpreting unit 2, an image selecting unit 3, an image display unit 4, and an information storage unit 5. The information storage unit 5 includes an image information unit 51 for storing image information, and a similarity information unit 52-1 for storing similarity information. FIG. 2B is a diagram for explaining the information storage area 5. As shown, the information storage unit 5 stores image sequences A, B, C, . . . , N, and the similarity information corresponding to each image information that indicates image similarity, that is, similarity to other image information (frames) in shape, position, direction, time, etc. Examples of similarity information are "N1 frame is similar to A3 frame", "N1 frame is x % similar in image information (shape) to A3 frame", "N1 frame is similar in direction to A3 frame", "N1 frame is similar in motion vector to A3 frame", and so on. Such similarity information is stored in corresponding relationship to the frames of the image information. It is of course possible to store similarity information associated with all image information frames.

② Description of image sequence connection using key frames

Figure 3A:
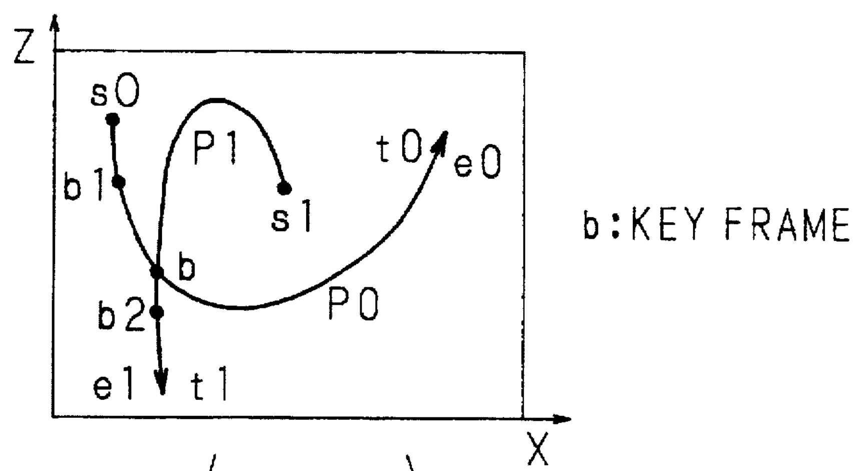
FIGS. 3A, 3B, and 3C are diagrams for explaining the concept of image sequence connection according to the embodiment of the present invention.
Figure 3B:
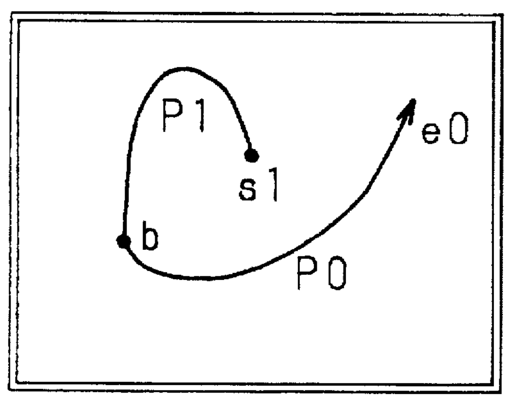
Figure 3C:
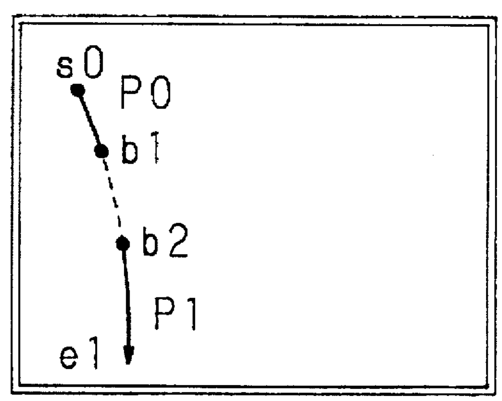

FIGS. 3A, 3B, and 3C show the concept of image sequence connection. FIG. 3A is a diagram for explaining two actions, action P0 and action P1, representing a continuous action (hereinafter called the "chain action"). Action P0 is an action moving from start point s0 toward end point e0, while action P1 is an action moving from start point s1 toward end point e1. In the figure, t0 and t1 are the times that actions P0 and P1 take to complete their respective motions.

FIG. 3B is a diagram for explaining combinational connection, showing how the two actions P0 and P1 are combined for connection. When key frame b exists at the intersection of action P0 and P1, if the key frame is similar between the two actions, action P0 can be connected continuously with action P1 by linking s1→b→e0.

FIG. 3C is a diagram for explaining connection by frame interpolation; in the example shown in FIG. 3C, key frame b does not exist at the intersection. In this case, a continuous interpolation action for linking key frames b1 and b2 spaced apart on actions P0 and P1 is selected from the information storage unit 5, and the actions are connected continuously by linking s0→b1→b2→e1.

Figure 4A:
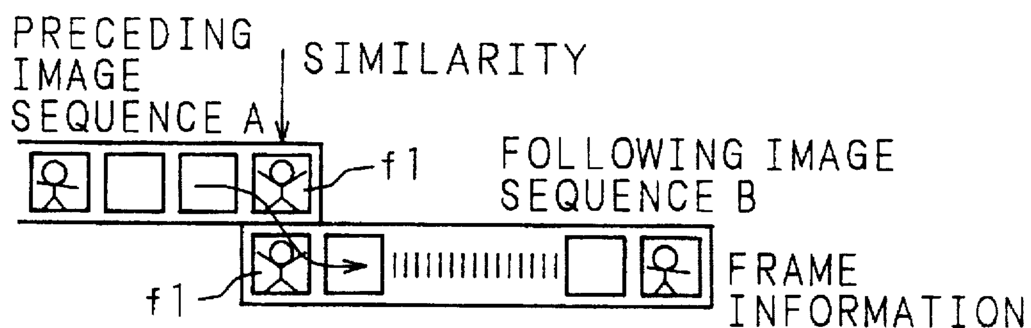
FIGS. 4A, 4B, and 4C are diagrams showing specific examples of image sequence connection using key frames according to the embodiment of the present invention.
Figure 4B:
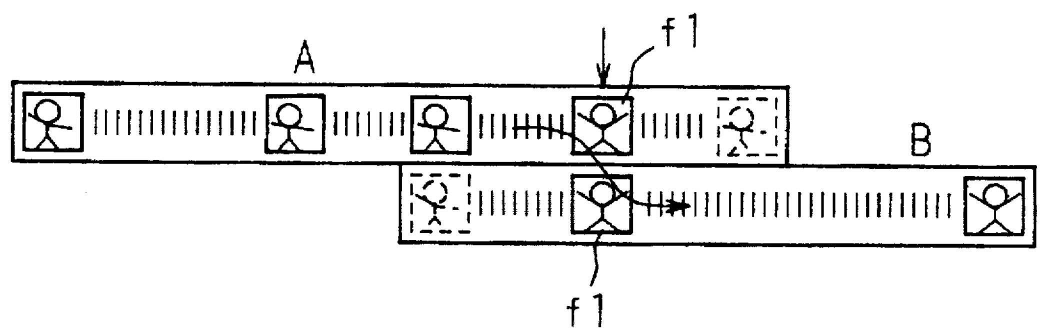
Figure 4C:
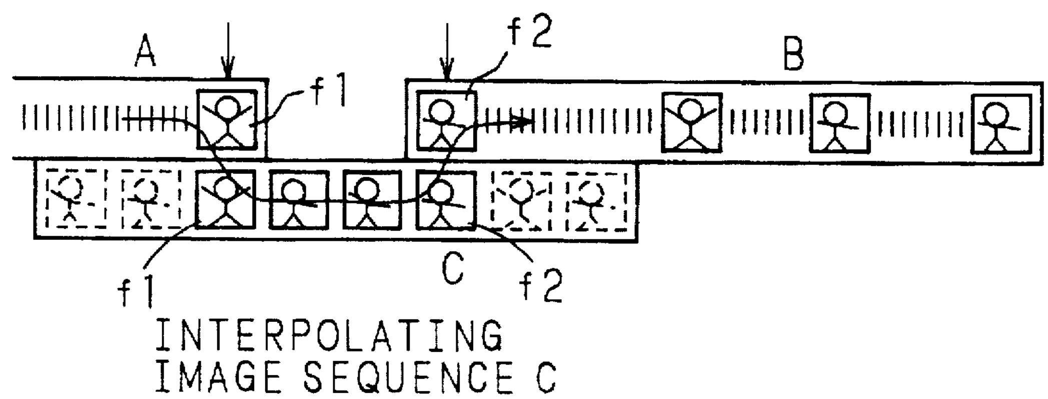

FIGS. 4A, 4B, and 4C are diagrams for explaining specific examples of image connection using key frames. In FIGS. 4A, 4B, and 4C, square boxes in each image sequence indicate the key frames, and dashed lines imply the existence of continuous images.

FIG. 4A is a diagram for explaining the case where the last frame in one image sequence is connected with the first frame in the next image sequence. In FIG. 4A, the last frame f1 in the preceding image sequence A is similar to the first frame f1 in the following image sequence B. In this case, an image moving continuously from the preceding image sequence A to the following image sequence B can be generated by connecting the last and first frames of the respective image sequences.

FIG. 4B is a diagram for explaining the case where two image sequences are connected at their intermediate points. In FIG. 4B, an intermediate frame in the preceding image sequence A and an intermediate frame in the following image sequence B, which are similar to each other, are detected, and the two image sequences are connected together where the similar frames f1 appear. An image moving continuously from the preceding image sequence A to the following image sequence B can be generated in this manner.

FIG. 4C is a diagram for explaining interpolation connection. In FIG. 4C, there are no similar key frames between the preceding image sequence A and the following image sequence B. In this case, an interpolation is made by inserting an image sequence C having a similar frame f1 and a similar frame f2 for connection to the preceding image sequence A and the following image sequence B, respectively. That is, at the frame f1 in the preceding image sequence A, a transfer is made to the inserted image sequence C, and at the frame f2 in the inserted image sequence C, a transfer is made to the following image sequence B. Thus, by using the interpolating image sequence C, an image moving continuously from the preceding image sequence A to the following image sequence B can be generated.

In the examples shown in FIGS. 4A through 4C, if connection is made using the similar frame f1 or f2, two similar frames will be displayed in succession. To avoid this, the first frame in the connecting image sequence may be dropped from the resulting image sequence.

③ Description of image sequence connecting operation using key frames

FIGS. 5A, 5B, 5C, and 5D are diagrams for explaining the operation when linking two image sequences by connecting the last frame in one image sequence with the first frame in the next image sequence. The example shown in FIGS. 5A through 5D corresponds to the image sequence connection shown in FIG. 4A. FIG. 5A shows image sequence A, for example, an image sequence for "Hello". This image sequence A is provided with similarity information a, for example, "Standing", at the head, and similarity information b, for example, "Sitting", at the end of the sequence. FIG. 5B shows image sequence D, for example, an image sequence for "Good-by", and similarity information a and similarity information c, for example, "Facing to the right", are provided for the first and last frames, respectively. FIG. 5C shows image sequence E, for example, an image sequence for "Good-by", and similarity information b and similarity information c are provided for the first and last frames, respectively.

Image sequence connection will be described below by taking the above image sequences A, D, and E as an example. Suppose, for example, that the command content fed from the command interpreting unit 2 requests that the image sequence A for "Hello" be followed by an image sequence for "Good-by". In this case, the image selecting unit 3 first selects images for "Good-by" from the images stored in the information storage unit 5. In this example, two image sequences, D and E, are selected. Next, the image selecting unit 3 retrieves similarity information b for the last frame of the image sequence A from the similarity information unit 52-1, and the first frames a and b of the image sequences D and E for comparison with the similarity information b. The image selecting unit 3 then selects the image sequence E whose first frame is similar to the last frame of the image sequence A. In this manner, the image sequence A for "Hello" and the image sequence E for "Good-by" can be displayed continuously, as shown in FIG. 5D.

If two image sequences are to be connected at intermediate points, as shown in FIG. 4B, the image selecting unit 3 selects frames similar between intermediate key frames of the two image sequences A and B on the basis of the information retrieved from the similarity information unit 52-1. On the other hand, in the case of interpolation connection, as shown in FIG. 4C, the image selecting unit 3 selects the image sequence C having frames f1 and f2 similar to the last frame f1 of the image sequence A and the first frame f2 of the image sequence B, on the basis of the information retrieved from the similarity information unit 52-1. In this manner, the image sequences A and B can be displayed continuously, as shown in FIGS. 4B and 4C.

④ Description of an example of image generation using key frames

Figure 6:
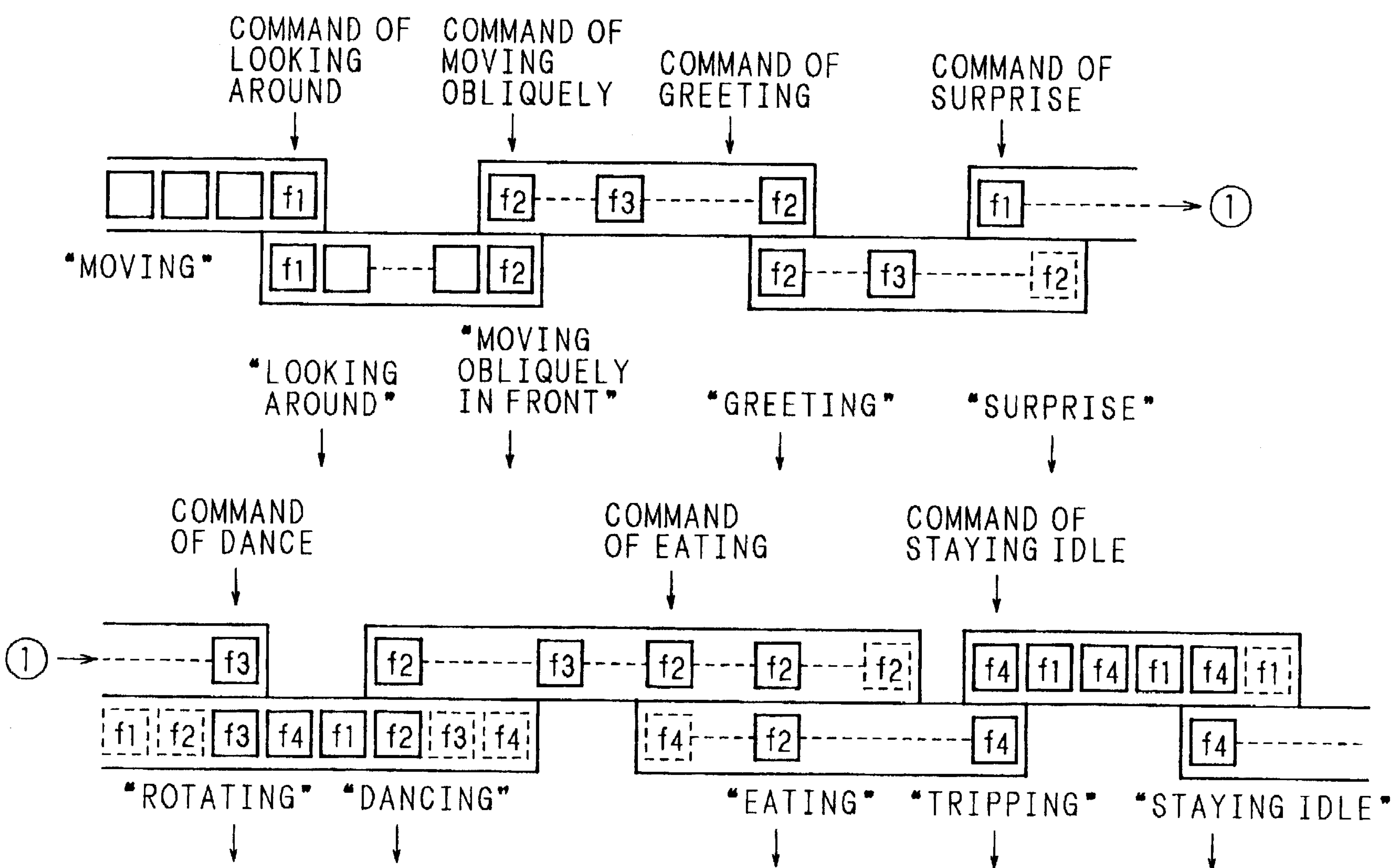
FIG. 6 is a diagram for explaining image generation using key Frames according to the embodiment of the present invention.

FIG. 6 is a diagram for explaining image generation using key frames. The following explanation assumes that the object image in FIG. 6 is a child. First, a "moving" image is being generated. At key frame f1, a command "Look around" is issued, and a transfer is made to the next image sequence for "Looking around". This transfer is made via the key frame f1 in the two image sequences, and the image flow at this time is natural and free from discontinuity. Next, a new command "Move obliquely in forward direction" is issued, and a transfer is made via the key frame f2 to an image sequence for "Moving obliquely in forward direction". Then, a command "Greet" is issued at a point between key frames f3 and f2, but since the image sequence for "Moving obliquely in forward direction" at this time is not at the appropriate point for dividing there is no key frame, the command is not executed until the key frame f2 is reached. At the key frame f2, a transfer is made to an image sequence for "Greeting".

Next, a command "Surprise" is issued at a point between f3 and f2, as in the above case, but the image sequence for "Greeting" is not at the appropriate point for dividing. However, if "Surprise" action should be represented immediately and the immediate representation degree of the "Surprise" command is high, a transfer is made to an image sequence for "Surprising" the instant the command is issued, though the frame continuity will be lost. This is effective for interactive representation. Next, a command "Dance" is issued at key frame f3, but the image sequence for "Dancing" starts with the key frame f2. If they are connected directly, image continuity will be lost. At this time, if the immediate representation degree of the command is not high, an image sequence for "Rotating" is used to interpolate between the key frames f3 and f2, to make the connection look natural.

Next, a command "Eat" is issued at key frame f2, and a transfer is made to an image sequence for "Eating" via the key frame f2 in this image sequence. At key frame f4 in this image sequence, a command "Stay idle" is issued. This key frame f4 is similar to the key frame f4 in the image sequence for "Staying idle", but if these two actions are separated in time, place, etc., an image sequence for "Tripping" is inserted between them. In this manner, naturally flowing images can be generated without loosing continuity even in such a case.

(2) Description of positional drift allowable area

Figure 7A:
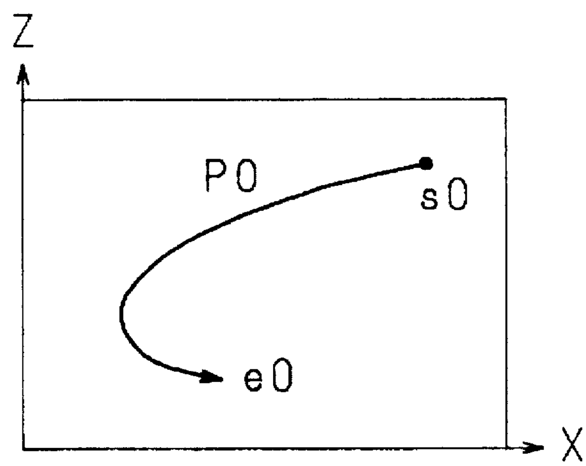
FIGS. 7A, 7B, and 7C are diagrams for explaining the concept of a positional fake according to the embodiment of the present invention.
Figure 7B:
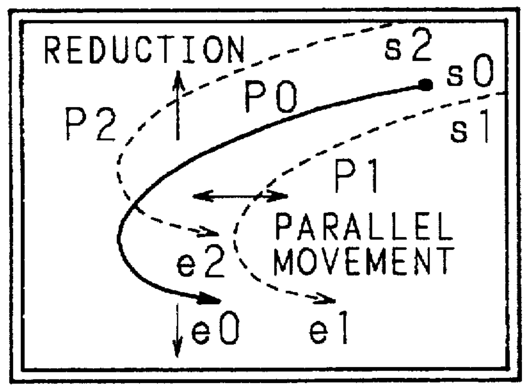

FIGS. 7A, 7B, 7C, and 7D show the concept of positional fake. FIG. 7A is a diagram for explaining action P0 which is moving from start point s0 toward end point (target position) e0. FIG. 7B is a diagram for explaining the allowable area for fake by geometric transformation. In FIG. 7B, action P0 moving from s0 toward e0 can be moved in parallel direction to fake as action p1 moving from s1 toward e1. Further, action P0 moving from s0 toward e0 can be reduced or magnified in the depth direction to fake as action P2 moving from s2 toward e2.

Figure 7C:
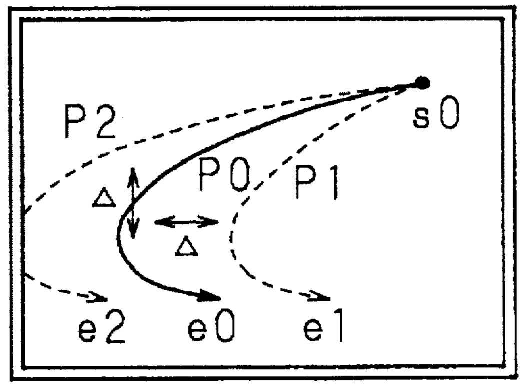

FIG. 7C is a diagram for explaining perceptual fake. FIG. 7C shows that the final end point e0 of action P0 moving from s0 toward e0 can be faked within a range from e1 to e2. For example, each image frame of action P0 moving from s0 toward e0 is drifted by positional drift allowable area α. This generates the image of action P1 moving from s0 toward e1. Furthermore, by moving each image frame of action P0 by positional drift allowable area Δ, the image of action P2 moving from s0 toward e2 can be generated.

Figure 8A:
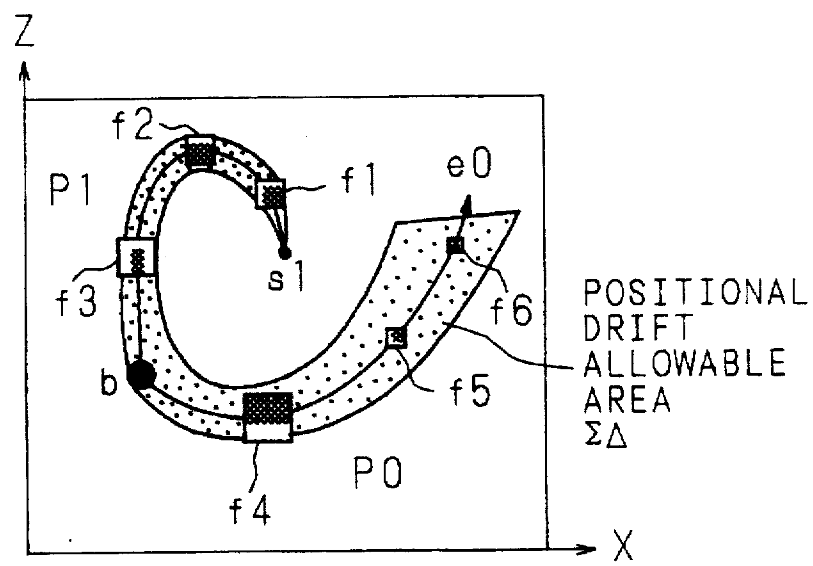
FIGS. 8A, 8B, and 8C are diagrams for explaining the positional fake according to the embodiment of the present invention.
Figure 8B:
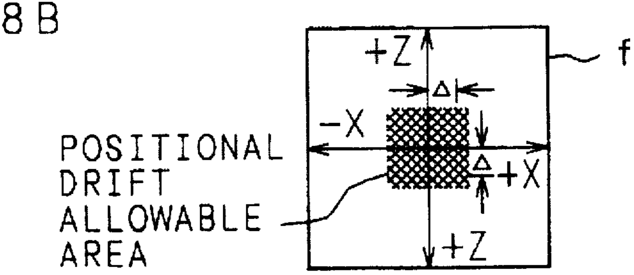
Figure 8C:
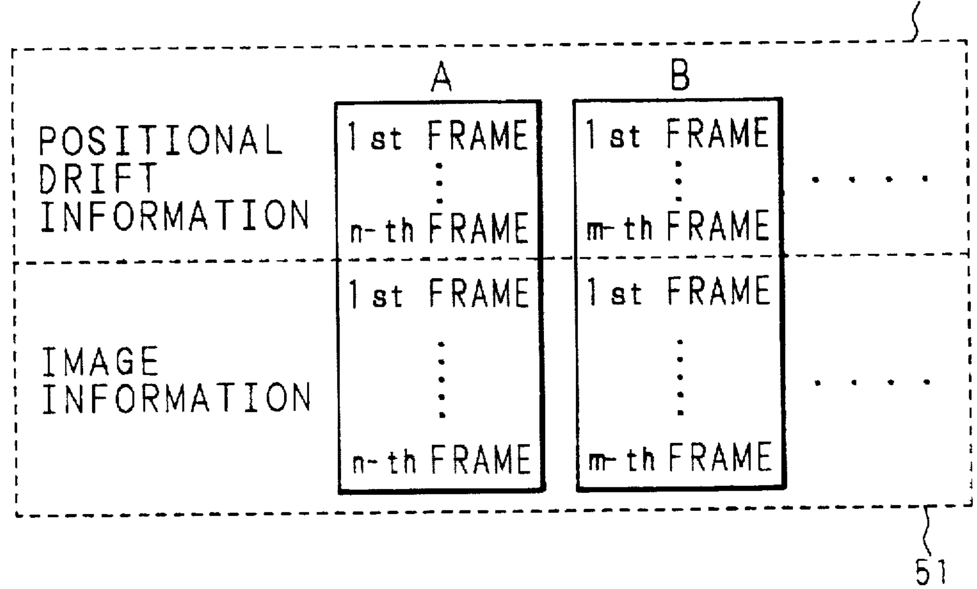

FIGS. 8A, 8B, and 8C are diagrams for explaining positional fake. FIG. 8A is a diagram for explaining the positional drift allowable area for an action moving from start point s1 toward end point e0. In FIG. 8A, action P1 from s1 to b and action P0 from b to e0 are shown. In the figure, f1 to f6 are representative frames of actions P1 and P0, and crosshatch in each of the frames f1 to f6 indicates the positional drift allowable area for the frame. The positional drift allowable area varies depending on the direction, velocity, magnitude, etc. of the action concerned; for example, the area is small when the footstep is small, and is large when the action concerns a running motion. Accordingly, the area is not always symmetrical about the center. A positional drift allowable area ΣΔ is shown along the paths of actions P1 and P0. If the target position is within this positional drift allowable area, an image that can reach the target position can be generated by drifting each frame, starting from s1, by a small amount.

FIG. 8B is a diagram for explaining the positional drift allowable area for one frame f. In FIG. 8B, the positional drift allowable area Δ with respect to the image center is shown. FIG. 8B is for a two-dimensional image; in the case of a three-dimensional image, the positional drift allowable area is provided for each of X, Y, and Z axes. In this case, for a positional drift in the depth direction, reduction or magnification is performed to prevent the image from looking unnatural.

FIG. 8C is a diagram for explaining the information storage unit 5 for positional fake. As shown in FIG. 8C, a positional drift information unit 52-2 is provided for storing positional drift allowable area information which corresponds to the fake information in the fake information unit 52 shown in FIG. 1A. The positional drift allowable area information is provided for each image sequence stored in the image information unit 51, and in frame-by-frame corresponding relationship. As an example of positional drift allowable area information, X=±Δ1, Y=−Δ2, +3Δ, and Z=±Δ4 are stored for B1 frame.

Accordingly, when generating an image of action P1 moving from s0 toward e1 shown in FIG. 7C, for example, the image selecting unit 3 first selects, from the information stored in the information storage unit 5, action P0 moving from s0 toward e0 within the positional drift allowable area. Next, based on the positional drift allowable area information for each frame of this action P0, the image selecting unit 3 generates an image with each frame of action P0 drifted in position. In this manner, the image of action P1 can be generated from the image of action P0.

The entire positional drift allowable area ΣΔ for one image sequence can be calculated by summing the positional drift allowable areas Δ for the frames of the image sequence at the time of image sequence selection, but can also be prestored for each image sequence in the positional drift information unit 52-2. When the entire positional drift allowable area ΣΔ is prestored, generation of a positionally drifted image is performed by allocating the entire positional drift allowable area ΣΔ to the respective frames of the original image. This allocation can be done equally for any frame of a given action, or adaptively in accordance with a certain function. It is also possible to store positional drift allowable area information in the positional drift information unit 52-2 only for the characteristic portions (for example, the key frames) of image information. In this case, when the positional drift allowable area is needed for each frame, it can be obtained by interpolation, etc. Furthermore, the positional drift allowable area can be expressed not only by a rectangle but also by an ellipse or other shape. In the case of a three-dimensional image, the area can be expressed as an ellipse.

(3) Description of thinning in time

Figure 9B:
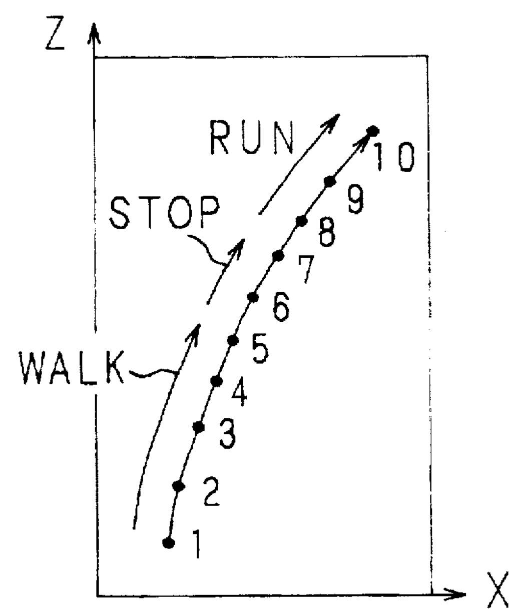
Figure 9B:
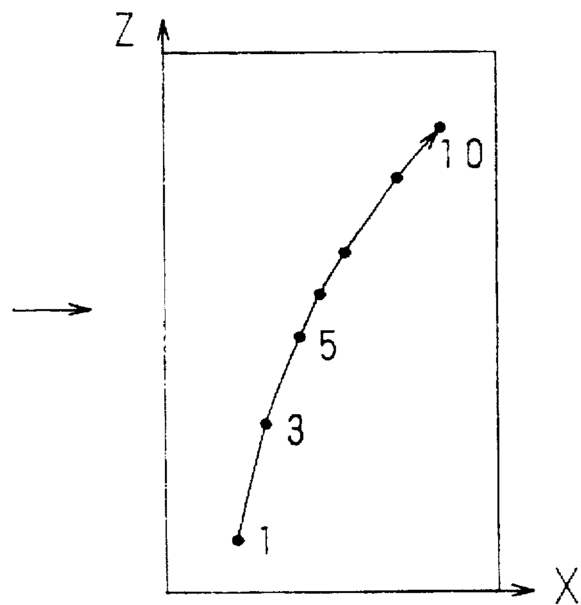

Decimation in time will be explained with reference to FIGS. 9A, and 9B. FIG. 9A is a diagram for explaining an example of thinning in time. In FIG. 9A, it is assumed that image sequence A consists, for example, of 10 frames, 1 to 10, as shown, and that the duration of image display is one second. Each frame is provided with thinning-in-time priority. Image sequence A1 is the result of thinning frames of image sequence A at same intervals. In this case, the duration of display is reduced to 0.5 second. When frames of image sequence A are thinned according to thinning priority, image sequence A2 results. In this case, low-priority frames whose priority is 3 are dropped. As a result, the duration of display time of image sequence A2 is reduced to 0.7 second.

Explanation of thinning priority will be given with reference to FIG. 9B. In FIG. 9B, the image sequence A consists of "walk", "stop", and "run" actions in sequence starting with frame 1 and ending with frame 10. High priority "1" is assigned to "stop" action, and low priority "3" is assigned to "walk" and "run" actions. With this priority assignment, frames can be thinned within a range that does not cause unnatural visual effects, as shown by image sequence A2.

In the above example, the duration of image display is reduced by thinning frames of image sequence, but it is also possible to increase the duration of image display by inserting frames.

Figure 10:
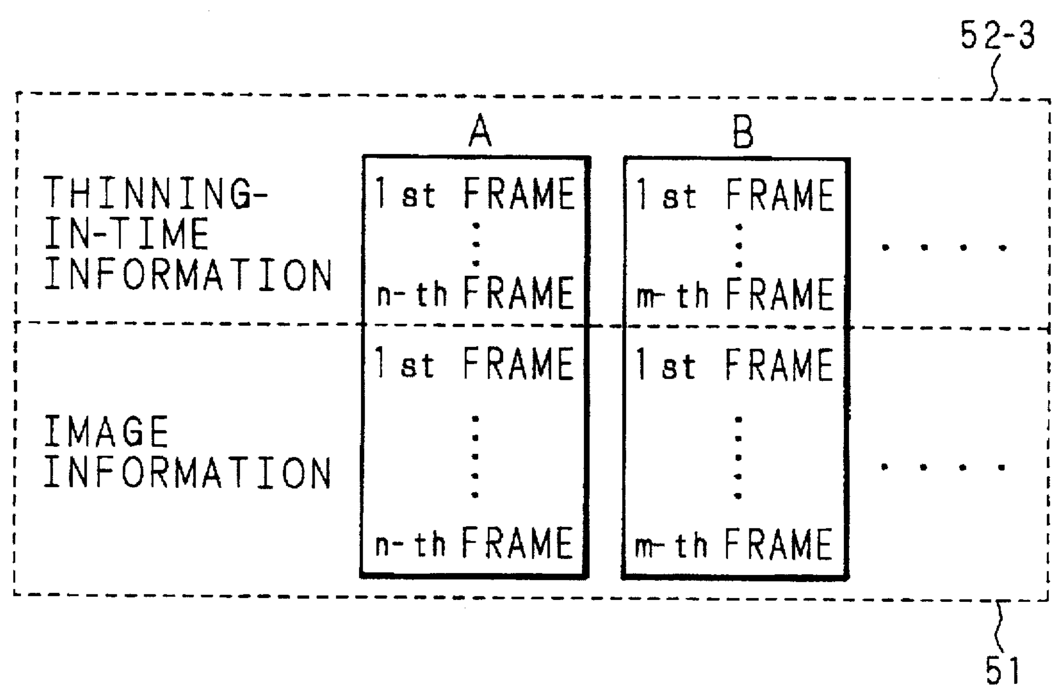
FIG. 10 is a diagram showing the organization of an information storage unit for thinning-in-time according to the embodiment of the present invention.

FIG. 10 is a diagram for explaining the information storage unit 5 for thinning in time. As shown in FIG. 10, a thinning-in-time information unit 52-3 is provided for storing thinning-in-time information which corresponds to the fake information in the fake information unit 52 shown in FIG. 1A. The thinning-in-time information is stored in corresponding relationship to each image sequence of image information stored in the image information unit 51. The thinning-in-time information contains thinning priority of each frame in each image sequence and the time-scale adjustment allowable area for each image sequence.

Accordingly, if the duration of the one-second image sequence A shown in FIG. 9A is to be reduced to 0.7 second, for example, the image selecting unit 3 first examines the time-scale adjustment allowable area (in this example, 0.5 to 1.2 seconds) for the image sequence A. Since 0.7 second is within the time-scale adjustment allowable area, the image selecting unit 3 generates the image sequence A2 by dropping low-priority frames in image sequence A. In the case of thinning in time for reducing the duration of image display, high-priority frames are interpolated at appropriate display positions so that the image does not look unnatural (to the eye).

Next, (2) Setting of positional drift allowable area and (3) thinning in time, described above, will be explained in more detail by way of example.

Figure 11:
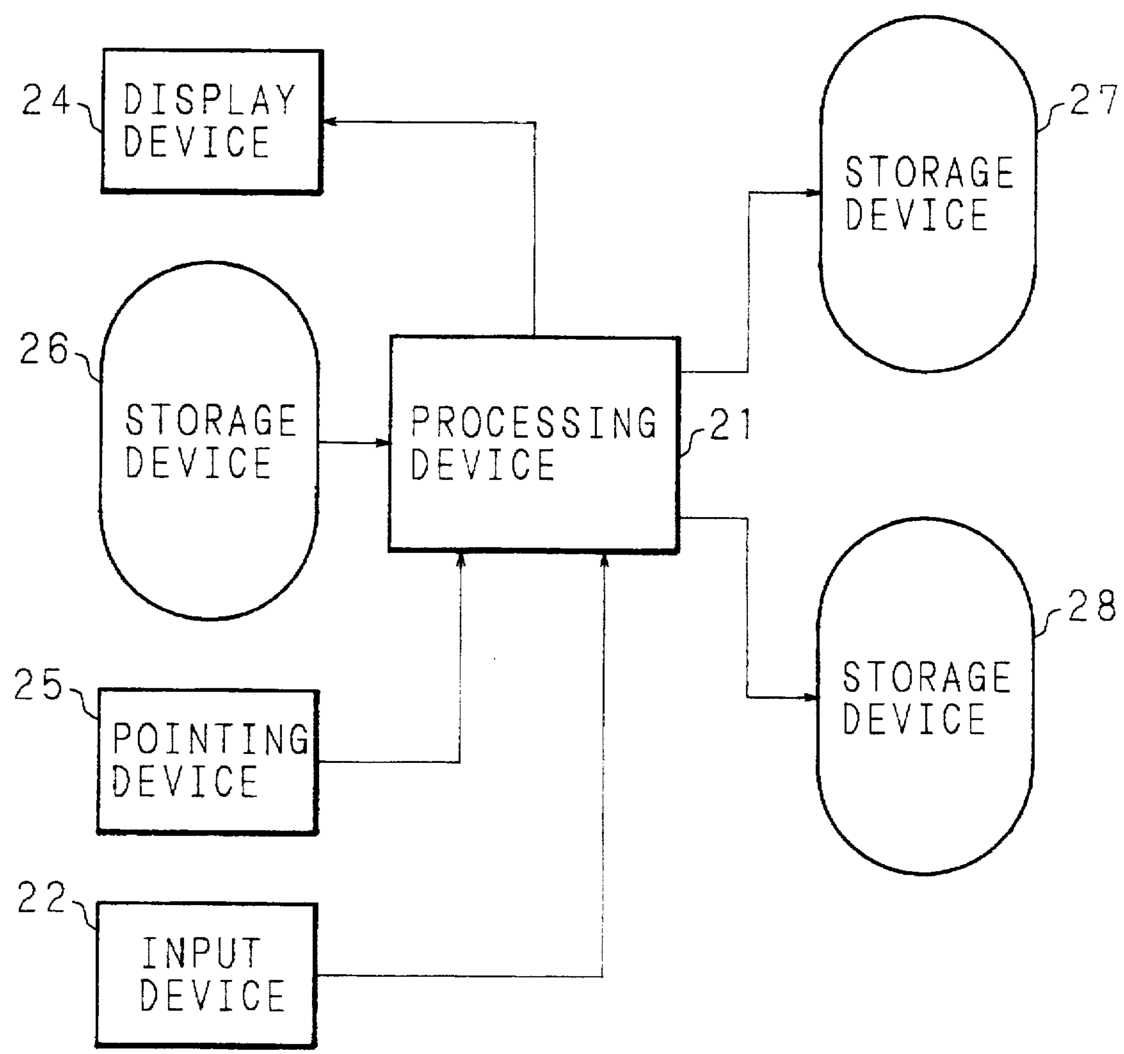
FIG. 11 is a diagram showing the internal configuration of an image generating apparatus according to the present invention.

FIG. 11 is a block diagram showing one embodiment of an apparatus for setting the positional drift allowable area and performing the thinning in time as described above. A processing device 21 is, for example, a workstation which carries out processing to create data for image generation. An input device 22 is, for example, a keyboard which is used to input commands, numeric values, etc. to the processing device 21. A display device 24 is, for example, a CRT display for displaying images on the screen. A pointing device 25 is, for example, a mouse which designates the cursor position displayed on the display device 24 and sends signals to the processing device 21.

The processing device 21 reads out actually shot image data from a storage device 26, for example, a hard disk drive, creates data for image generation, and stores the image data of a character image (frame) extracted from the actually shot image data into a storage device 27, while other data for the extracted character, such as the three-dimensional position, movement, allowable area, total graph, sorted table, and transfer table described hereinafter, are stored into a storage device 28.

Figure 12A:
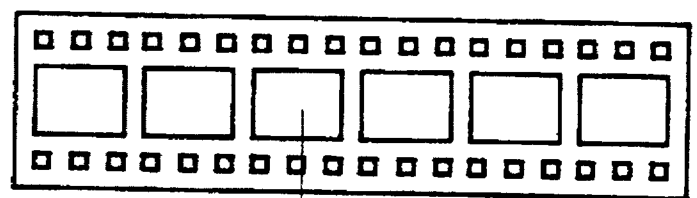
FIGS. 12A and 12B are diagrams for explaining actually shot image data and a rim.
Figure 12B:
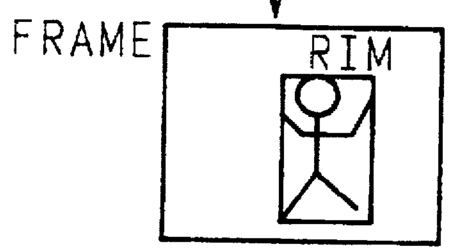

Here, the actually shot image data is the data created by shooting the action of an animation character on a designated background color such as blue by using a fixed-angle camera. FIG. 12A shows the actually shot image data in the form of a movie film, each frame of which is two-dimensional as shown in FIG. 12B. In each frame, the character can be extracted by removing the background color. The rectangle which is circumscribed about the character and is a part of frame used for the purpose of designating one unit of fake is called the rim. The three-dimensional position of the character can be calculated from the position, within the frame, of a particular point of the character, for example, the lower left corner of the character. This is possible because the image is in one-point perspective, though the frame is two-dimensional.

Figure 13:
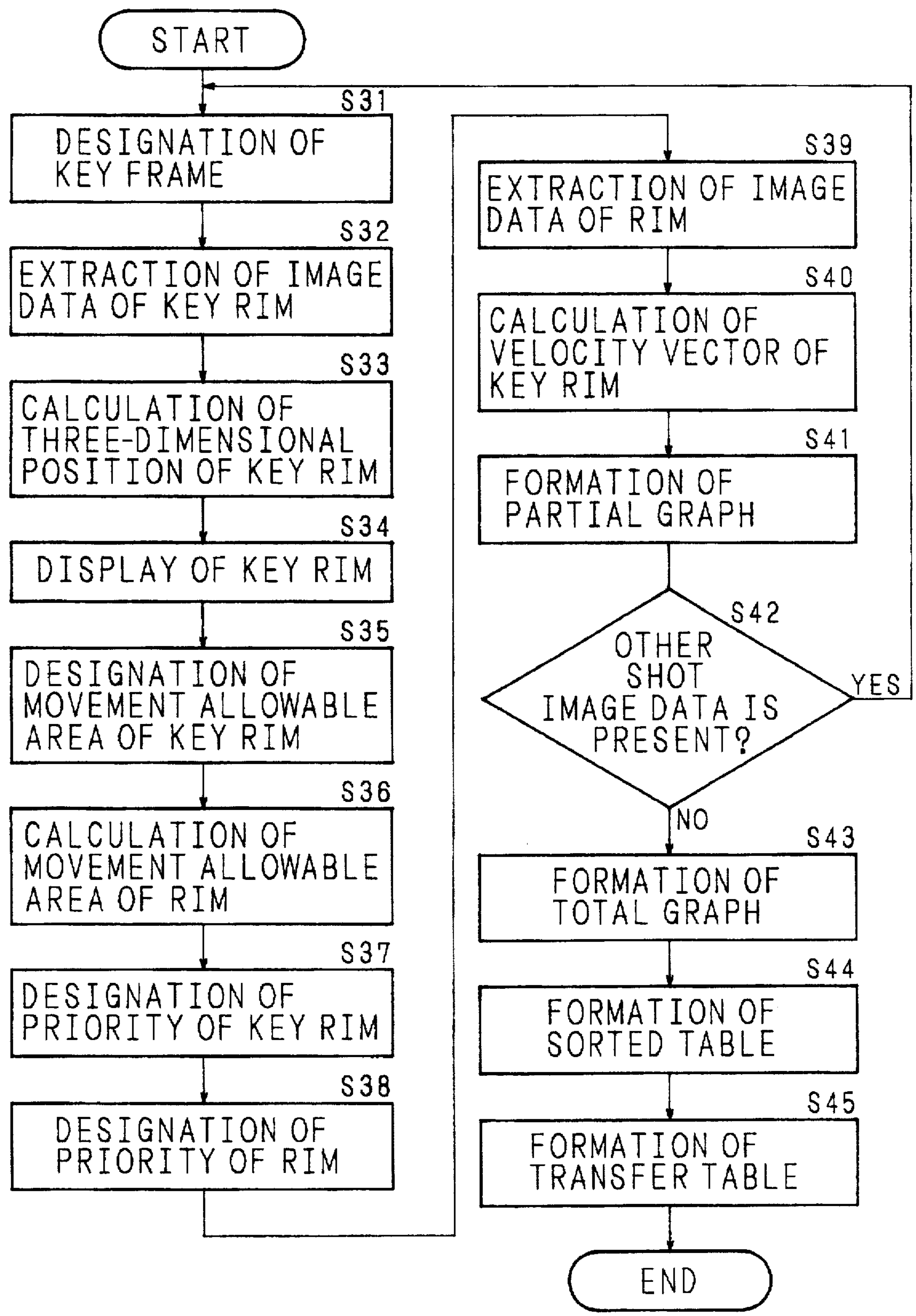
FIG. 13 is a flowchart illustrating a process for image generation data creation.

FIG. 13 shows a flowchart illustrating the process for image generation data creation carried out in the apparatus having the configuration shown in FIG. 11. First, with actually shot image data displayed on the display device 24, a plurality of frames in which the shape or velocity vector of the character is characteristic (the previously mentioned key frames) are designated (step S31). These key frames serve as the nodes used to create a partial graph, as will be described later.

Next, image data of the rim circumscribed about the character is extracted from each of the first and last frames of one action, the extracted rim being a key rim used to designate one unit of fake (step S32), and the three-dimensional position of each of the extracted key rims is calculated (step S33). Then, each key rim and its three-dimensional position are displayed on the display device 24, as shown in FIG. 14 (step S34).

Figure 14:
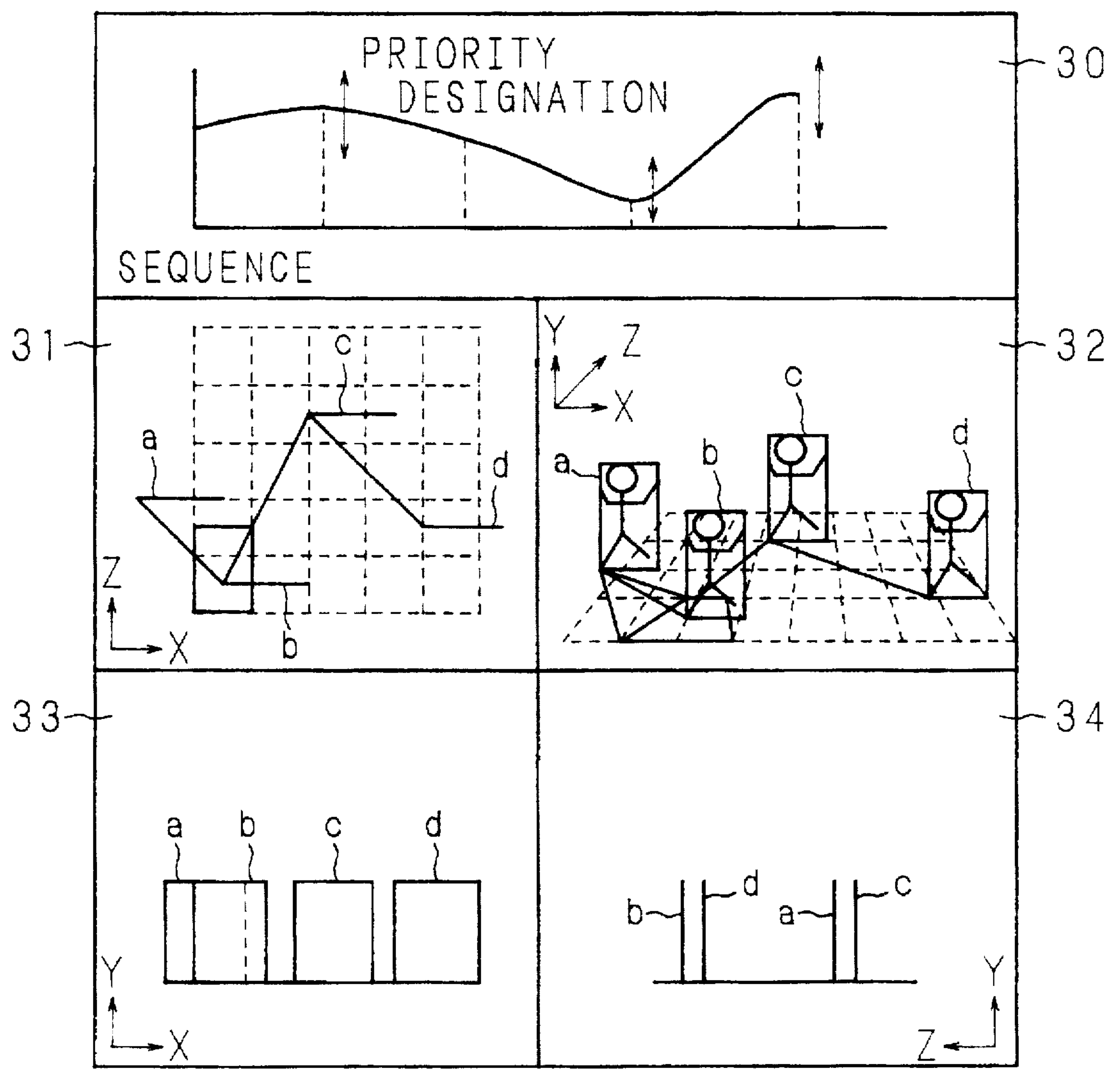
FIG. 14 is a diagram showing a display screen.

The display screen shown in FIG. 14 is split into a priority display section 30, a plan view display section 31, a perspective view display section 32, a front view display section 33, and a side view display section 34. Suppose that four key rims a, b, c, and d have been extracted. Then, in the plan view display section 31, the Z-axis coordinate positions of the key rims a, b, c, and d in the XZ plane are each designated by a straight line, and in the perspective view display section 32, the key rims a, b, c, and d are each displayed in XYZ coordinates. Further, in the front view display section 33, the X-axis coordinate positions of the key rims a, b, c, and d in the XY plane are each designated by a rectangle, and in the side view display section 34, the Z-axis coordinate positions of the key rims a, b, c, and d in the YZ plane are each designated by a straight line.

Figure 15:
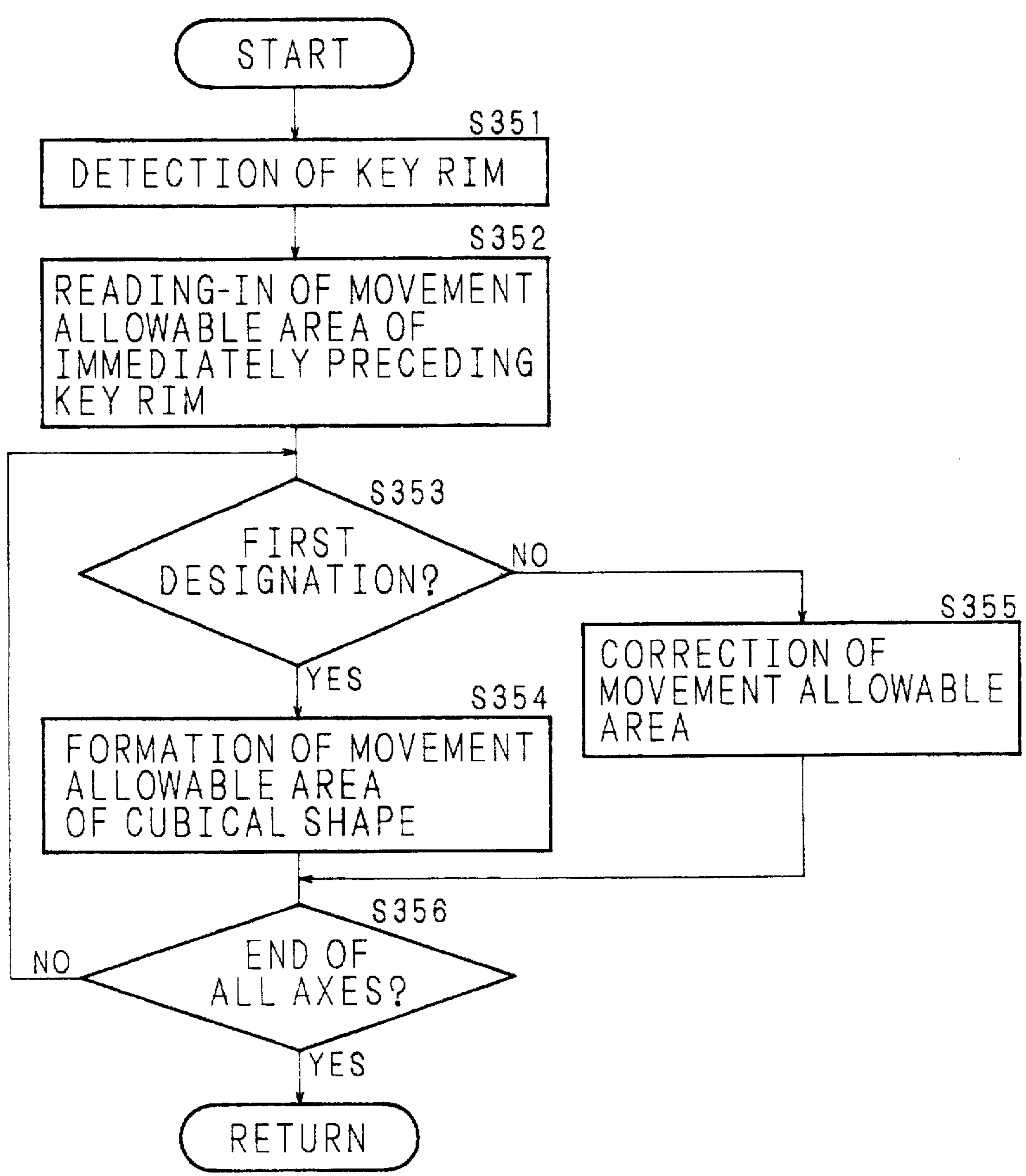
FIG. 15 is a flowchart illustrating a process for movement allowable area designation.

Next, a movement allowable area is designated for each key rim (step S35). FIG. 15 shows a Flowchart illustrating in detail the sequence of processing for movement allowable area designation carried out in step S35. The sequence of processing shown in FIG. 15 is repeated for each key rim. First, in any one of the display sections 31 to 34, the cursor is moved using the mouse, to detect the lower left corner of the key rim (step S351). Next, the movement allowable area (in X-, Y-, Z-axes directions) of the immediately preceding key rim is read in (step S352).

Figure 16A:
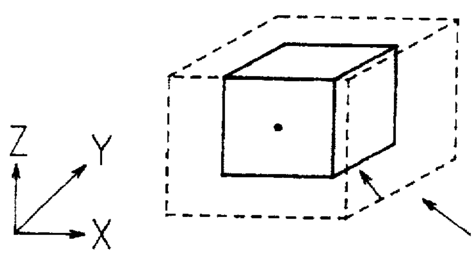
FIGS. 16A, 16B, 16C, and 16D are diagrams for explaining movement allowable area designation.

Next, it is determined whether it is the first designation (step S353), and if it is the first designation, then the key rim is dragged using the mouse (move the mouse while holding down the mouse button), to form a movement allowable area of cubic shape corresponding to the amount of drag (step S354). In FIG. 16A, tile cube formed by solid lines represents the key rim movement allowable area previously read in, while the cube formed by dashed lines is the cube formed by dragging.

On the other hand, if it is not the first designation, correction is made by dragging one side of the cube, to designate a movement allowable area of rectangular parallelepiped shape (step S355). In designating the movement allowable area, such correction as to make the range smaller than the previously read-in range is forbidden. Thereafter, it is determined whether the designation is completed (step S356). If it is not completed yet, the process returns to step S353 to repeat the processing in steps S353 to S356; if the designation is completed, the designation process is terminated.

Figure 16B:
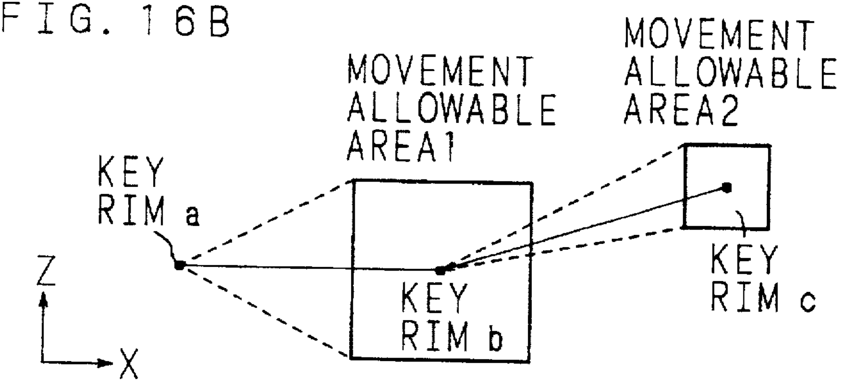
Figure 16C:
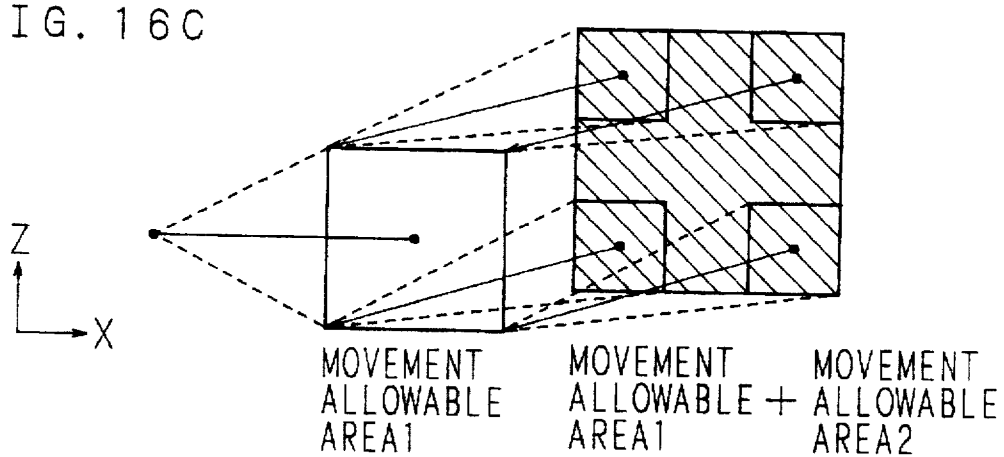
Figure 16D:
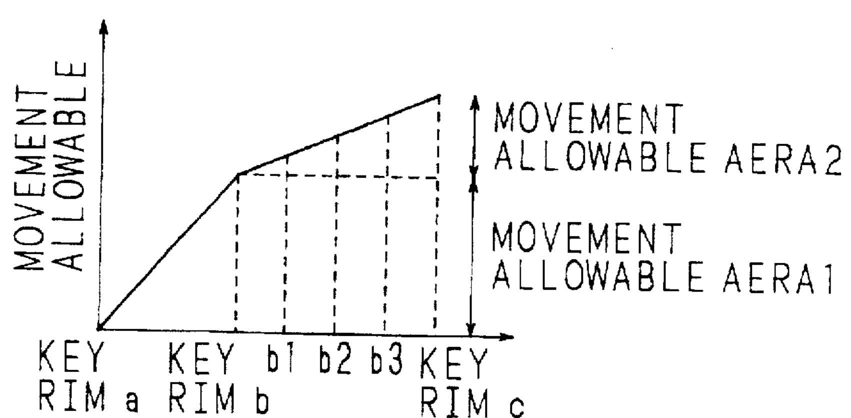

The rectangular parallelepiped thus formed represents the movement allowable area of the lower left corner of the key rim. As shown in FIG. 16B, the movement allowable area is not designated for the first key rim in order of time, but designated for each of the subsequent key rims b and c. Since the movement allowable area to be designated cannot be made smaller than the previously read-in area, the movement allowable area is enlarged along all of X-, Y-, and Z-axes, the area increasing in the order of time, i.e., in the order of key rims b and c, as shown in FIGS. 16C and 16D.

In the above example, the shape of the key rim movement allowable area to be designated has been described as a rectangular parallelepiped, but this may be in other shapes such as an elliptical sphere.

Next, a rim movement allowable area is calculated for each of intermediate frames between the key rims a, b, c, and d (step S36). Suppose, for example, that there are three frames between the key rims b and c. In this case, the movement allowable areas of the rims b1, b2, and b3 in the three frames are calculated by linear interpolation between the respective movement allowable areas of the key rims b and c along X-, Y-, and Z-axes, taking the temporal positions of the three frames into consideration. The result is shown in FIG. 16D.

Since the movement allowable area is set for each rim in this manner, the moving position of the character can be changed as desired within the limits of the movement allowable area of each rim, thus making the character's action look more natural to the eye. Furthermore, since control is performed so that the movement allowable area of any key rim occurring later in order of time is made larger than the movement allowable area of the immediately preceding key rim, the character's action is prevented from looking unnatural in the middle of the action.

Figure 17A:
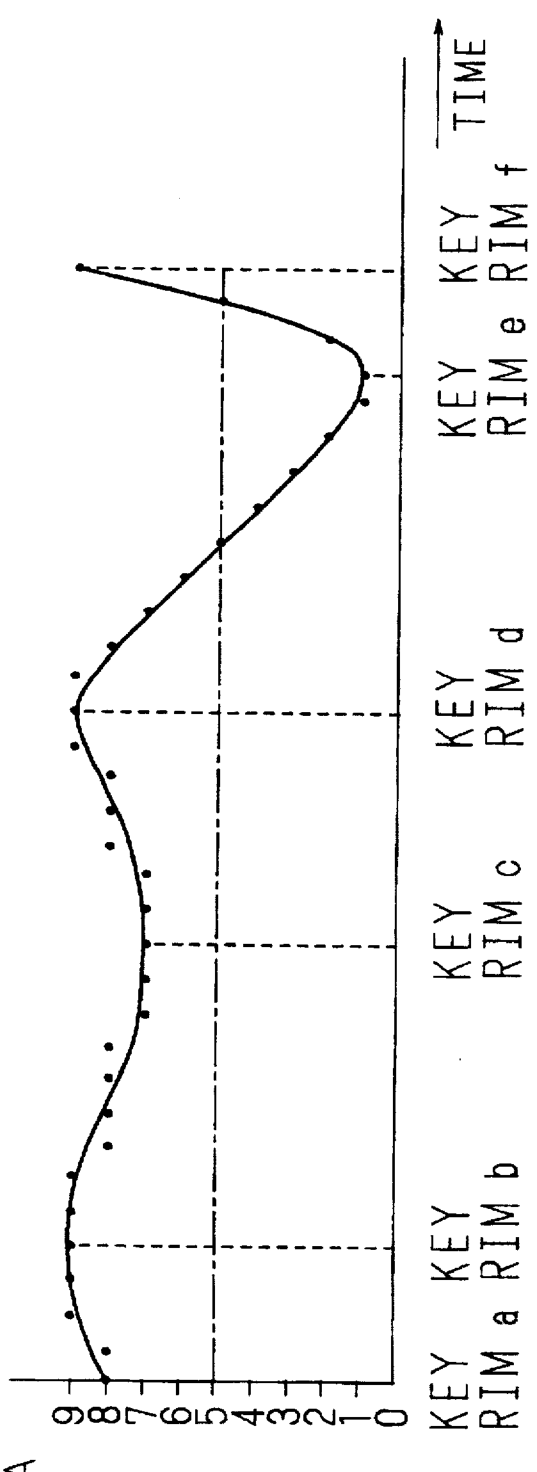
FIGS. 17A and 17B are diagrams for explaining priority designation.

Next, priority of each key rim is designated (step S37). The priority display section 30 shows the positions of the key rims and intermediate rims along the horizontal time axis and priorities of values 0 to 9 along the vertical axis, as shown in FIG. 17A. The priority before designation is 5 as shown by a one-dot chain line. The priority increases in descending order of the priority values.

When priority has been designated for all the key rims a to e, segments between the key rims a to e are interpolated using a spline function, to form a priority curve as shown by a solid line in FIG. 17A. The priority value at each rim position is rounded to the nearest whole number, to obtain a value shown by a black dot in FIG. 17A (step S38). Then, the priorities of the key rims a to e are forcefully set to 0. And, rims corresponding to key frames are set to 0, lest the key frames are not thinned.

Figure 18:
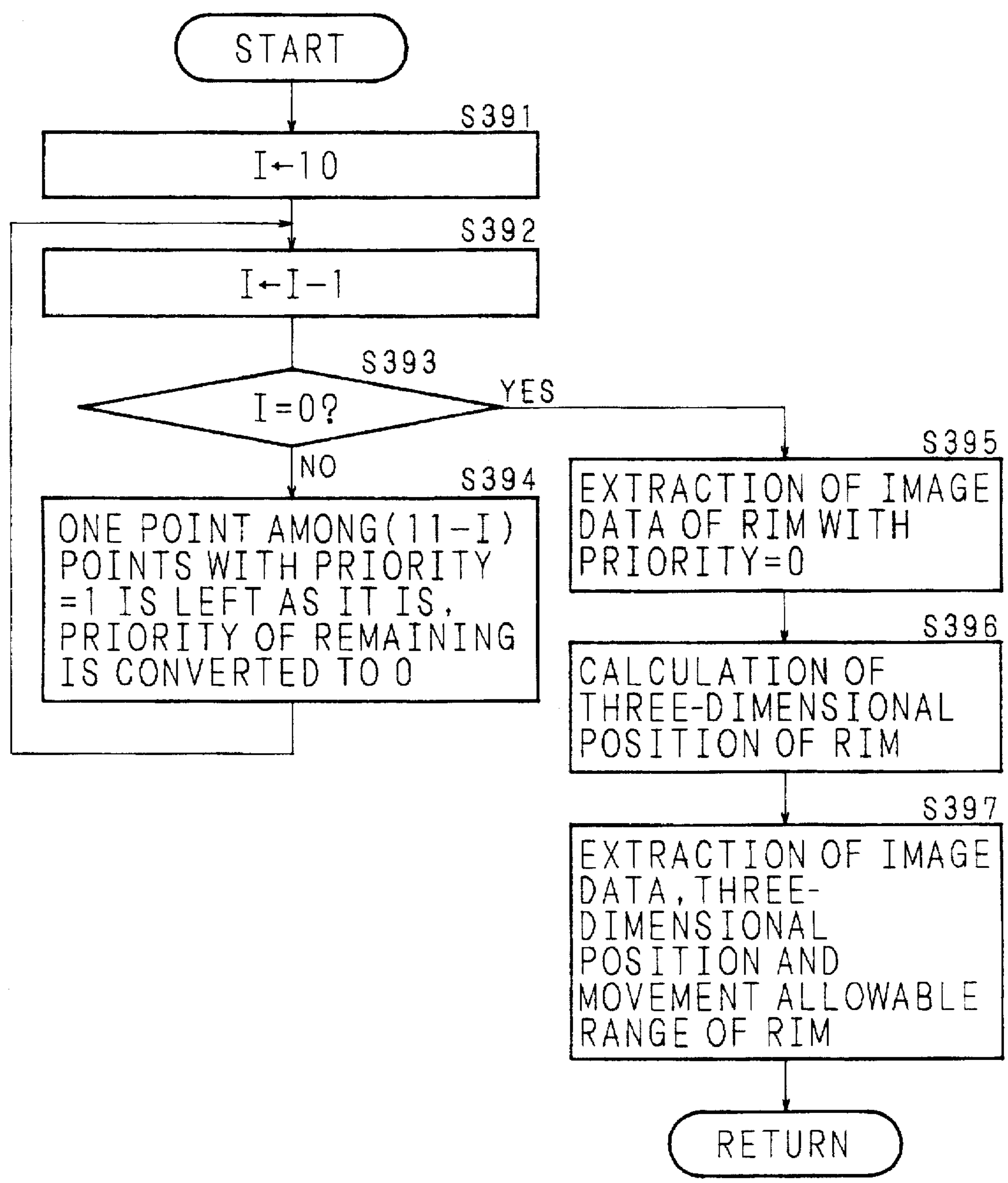
FIG. 18 is a flowchart illustrating a process for image generation data extraction.

Thereafter, image generation data is extracted (step S39). FIG. 18 shows a flowchart illustrating in detail the sequence of processing for image generation data extraction carried out in step S39. First, counter I is set to 10 (step S391). Then, after decrementing the counter I by 1 (step S392), judgment is made as to whether the counter I reads 0 or not (step S393).

If I≠0, the rims with their priority values shown by black dots in FIG. 17A and corresponding to the value of the counter I are scanned in sequence from left to right along the time axis, and the priority at one in every (11-I) point is left unchanged, while the priorities at the remaining points, that is, at (10-I) points in every (11-I) points, are forcefully set to 0 (step S394). More specifically, in FIG. 17A, of positions with priority=9, the priority is set to 0 at one in every two positions, and of positions with priority=8, the priority is set to 0 at two in every three positions. After that, the process proceeds to step S392 to repeat the steps S392 to S394.

Figure 17B:
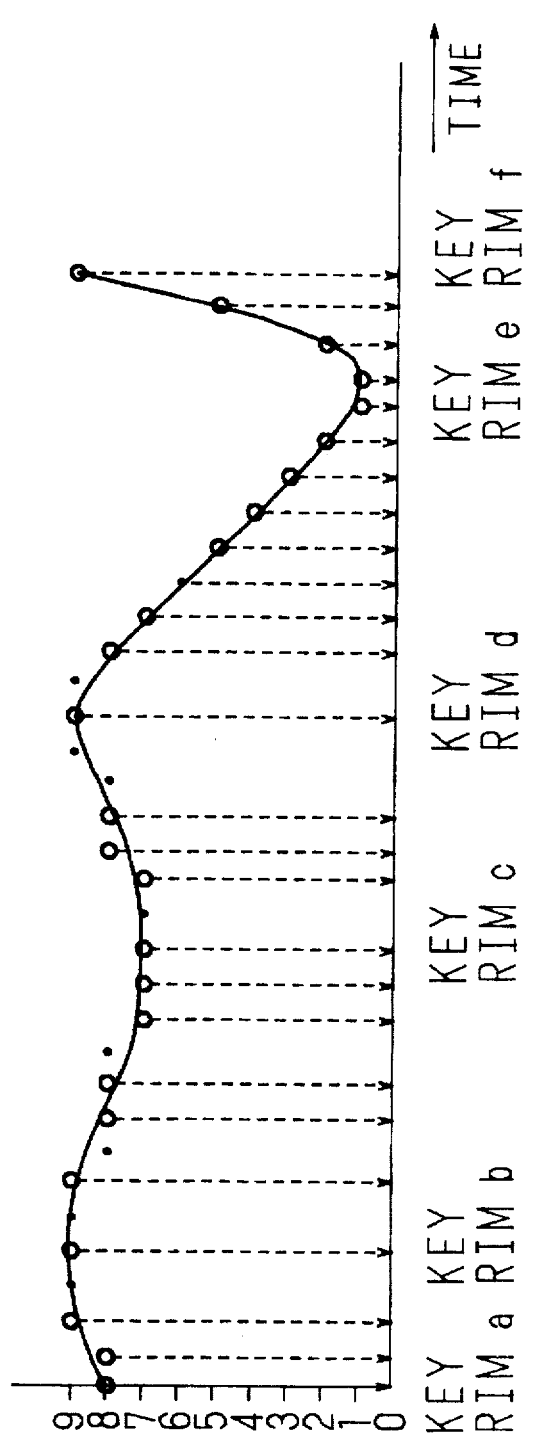

With the above processing, the priorities of the rims indicated by white dots in FIG. 17B are forcefully set to 0. If I=0 in step S393, then image data for every rim with priority=0 is extracted (step S395), the three-positional position of each rim for which image data was extracted is calculated (step S396), and the image data, three-dimensional position, and movement allowable area of each rim are extracted and stored in the respective storage devices 27 and 28 (step S397), after which the processing is terminated.

In the above example, of positions with priority=9, the priority is set to 0 at one in every two positions, but the priority may be set to 0 at one in every three positions, it is possible to set arbitrarily.

Since the image data of the character is obtained from the actually shot image data, as described above, an uninterrupted, natural image of the character's action can be generated.

If the extracted rims are displayed in sequence at intervals of predetermined time (for example, 0.1 second), for rims with priority 9 the speed of image display is doubled since one in every two rims is dropped, and for rims with priority 8 the speed of image display is increased by 1.5 multiplication since one in every three rims is dropped. Thus the speed of image display can be varied by designating priority.

Figure 19:
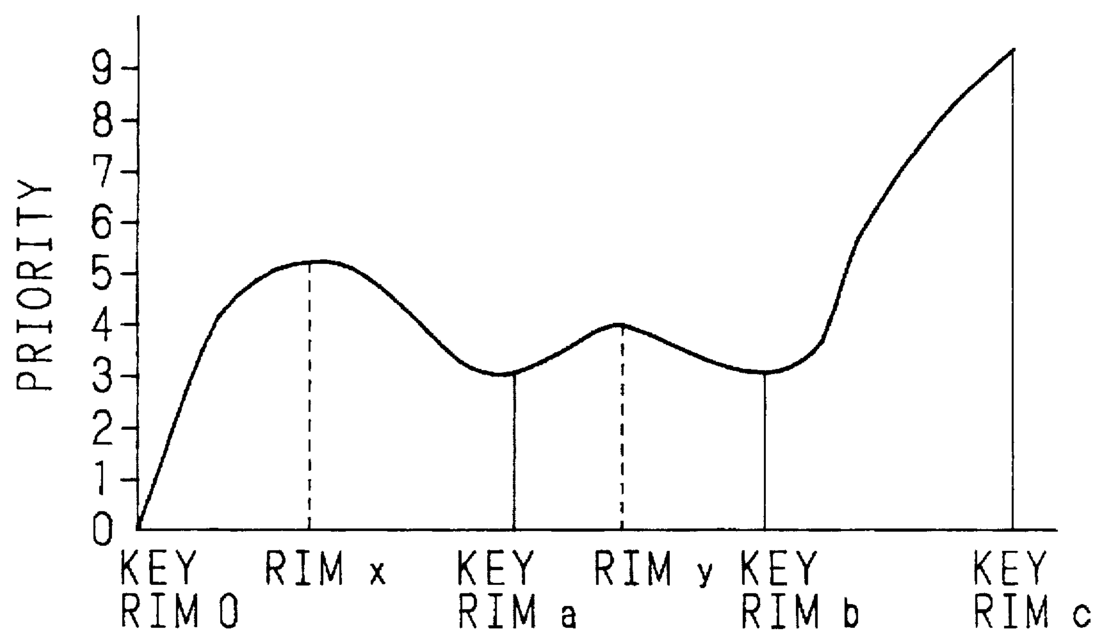
FIG. 19 is a diagram for explaining another example of priority designation.
Figure 20:
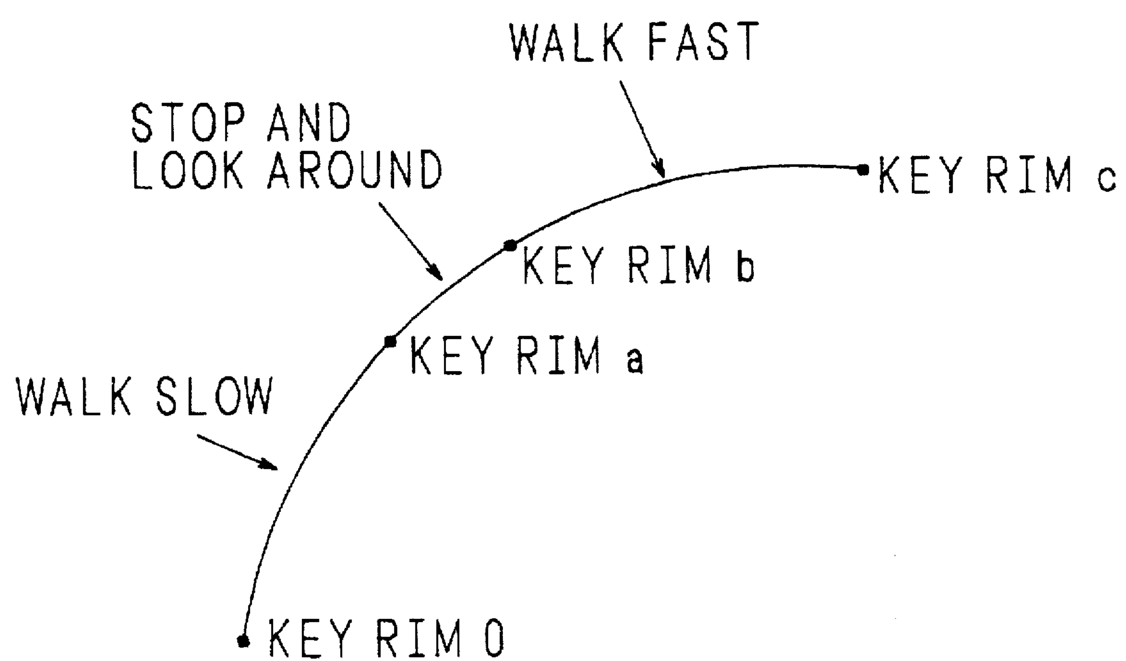
FIG. 20 is a diagram showing the relationship between action patterns and key rims.

In the above example, priority is designated only for the key rims, and the priorities of the intermediate rims are calculated by interpolation using a spline function. Alternatively, it is possible to designate priority for some of the intermediate rims. For example, as shown in FIG. 19, priority is designated not only for key rims 0, a, b, and c, but also for rim x between key rims 0 and a and also for rim y between key rims a and b, and based on these designated values, a priority curve is constructed. In the example shown, rim x and rim y are given relatively low priority values 5 and 4, respectively. With designation of such low priority values, if the action between key rims 0 and a is "walk slow", the action between key rims a and b is "stop and look around", and the action between key rims b and c is "walk fast", frames of actions "walk slow" and "stop and look around" can be decimated preferentially.

Next, velocity vector is calculated for each of the key rims a to e (step S40). For each of the key rims a to e, the velocity vector can be obtained by calculating the difference in three-dimensional position from the immediately preceding rim.

Next, a partial graph is constructed (step S41). Then, it is determined whether there remains any actually shot image data yet to be processed (step S42), and if there is such data, the process returns to step S31 to repeat the processing in steps S31 to S41. If there is no such data, the process proceeds to the construction of a total graph, a sorted table, and a transfer table (steps S43, S44, and S45), after which the process is terminated. The partial graph, total graph, sorted table, and transfer table will be described in detail in the next section (4) Image generation for optimum action.

The total graph, sorted table, and transfer table thus constructed are stored in the storage device 28. In image generation, the storage devices 27 and 28 are connected, for example, to a personal computer, and a move command that can be interpreted by the personal computer is issued. The move command is given parameters such as the start shape, move end position, moving time, etc.

Since the movement allowable area is set for each rim, the moving position of the character can be varied freely within the movement allowable area, thus making the action of the character look more natural.

As described, in the present invention, priority is set for each of the rims of the character extracted from actually shot image data, and based on the priority, rims are selected and the image data and three-dimensional positions of the selected rims are extracted; since the character is thus obtained from actually shot image data, not only the produced image of the action is free from interruptions and looks natural, but also the acting speed of the character can be varied as desired. Furthermore, since the movement allowable area is set for each rim, and the image data, three-dimensional position, and movement allowable area of each of selected rims are extracted, the moving position of the character can be varied freely within the movement allowable area of each rim, thus making the action of the character look more natural.

(4) Description of image generation for optimum action

The similarity information unit 52-1, positional drift information unit 52-2, and thinning-in-time information unit 52-3 are provided in the fake information unit 52 in the information storage unit 5 shown in FIG. 1. With this arrangement, it is possible to perform image generation for an optimum action.

Figure 21:
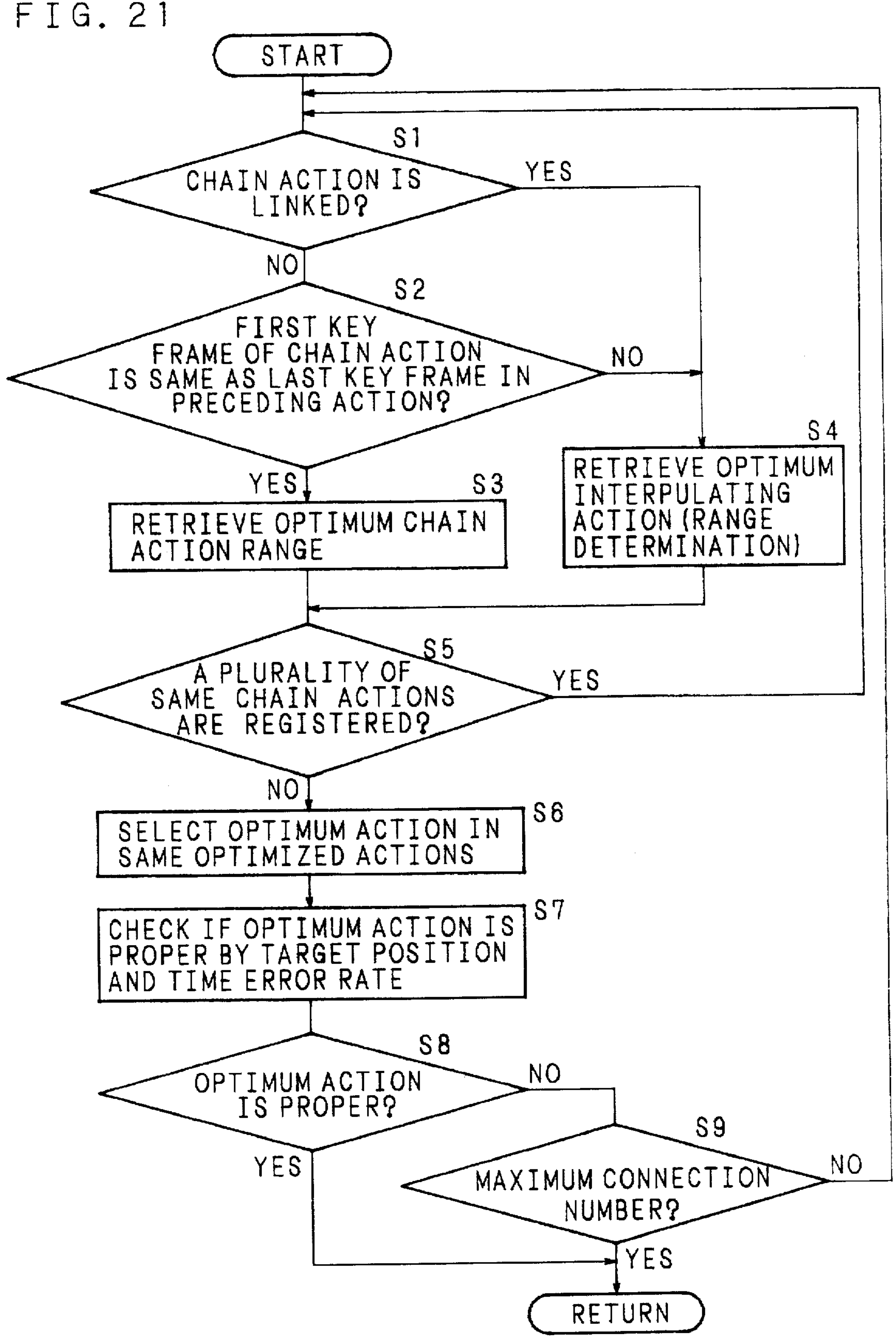
FIG. 21 is a flowchart illustrating a process of image generation for an optimum action according to the embodiment of the invention.

FIG. 21 is a flowchart illustrating a process of image generation for an optimum action. The image generation process for all optimum action will be described below with reference to FIG. 21. When the command interpreting unit 2 accepts a command requesting the generation of an image for the next action, the image selecting unit 3 performs the following processing on the basis of the information retrieved from the information storage unit 5.

First, the image selecting unit 3 determines whether the next chain action links (continuously connects) with the image of the preceding action (hereinafter simply called the "action") (step S1). Since, at first, the chain action does not link with the preceding action, the NO branch is followed. Next, it is determined whether the last key frame in the preceding action is the same as the first key frame in the chain action (step S2). If they are the same, the YES branch is followed. Of the key frames in the chain action, a key frame closest to the target (in position and time) is retrieved (step S3). If it is determined in step S1 that the chain action links (for example, there is an interpolating image), or if it is determined in step S2 that the last key frame in the preceding action is not the same as (not similar to) the first key frame in the chain action, then an optimum interpolating action within a designated range is retrieved (step S4).

If any other chain action representing the same action for connection is registered in the information storage unit 5, the process returns to step S1 to optimize the next chain action in step S3 or S4 (step S5). Each of the chain actions, representing the same action and optimized in steps S3 or S4, is examined to see if its last frame is optimum with respect to the target position and time, and the selection is thus narrowed down (step S6). Next, with reference to the predetermined error rates for the target position and time, a check is made to see if the optimum action is proper (step S7). Then, from the result of this check, it is determined whether the optimum action is proper with respect to the error rates for the target position and time (step S8).

If it is determined in step S8 that the optimum action is proper, the process proceeds to RETURN to terminate the processing. If it is determined otherwise in step S8, then in order to connect a further chain action it is checked the maximum number of action connections is reached (step S9). The maximum number of action connections is set when more than one chain actions are to be connected; for example, if this number is set to 3, a return is made to step S1 twice at maximum in the process. In this case, one chain action and two interpolating actions can be connected to follow the preceding action. If the number of connections is larger than or equal to 3 (YES in step S9), the selected action is determined as optimum, and the process proceeds to RETURN to terminate the processing.

The embodiment of the invention based on the above explanation will be described below by way of specific example.

Figure 22A:
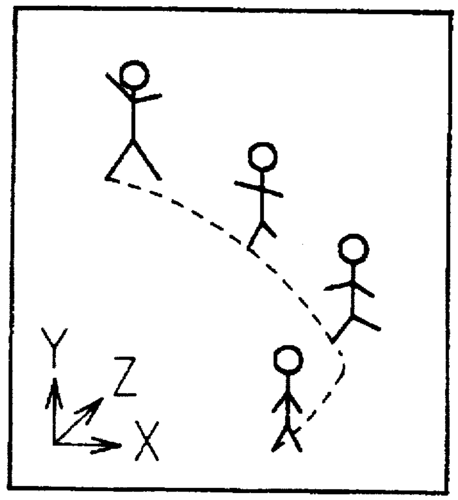
FIGS. 22A and 22B are explanatory diagrams of the principle of a partial graph.
Figure 22B:
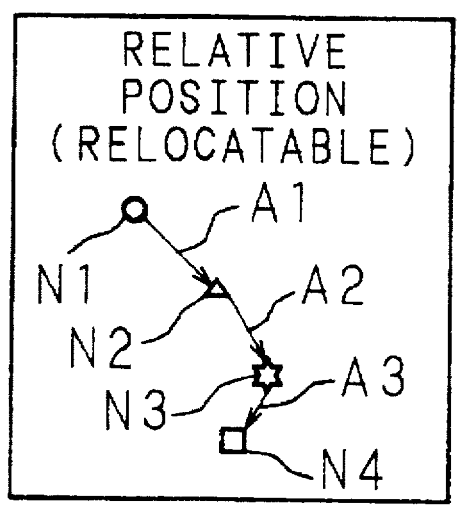

A series of actions representing an object such as a character moving in the direction shown by dotted arrow in three-dimensional space shown in FIG. 22A is captured as an image consisting of a plurality of frames, and from this series of actions, characteristic frames in which the shape or action of the object is characteristic are extracted and plotted on a graph as shown in FIG. 22B. The graph of FIG. 22B consists of nodes N1 to N4 (node corresponding to key frame) and arcs A1 to A3 connecting these nodes.

Figure 23:
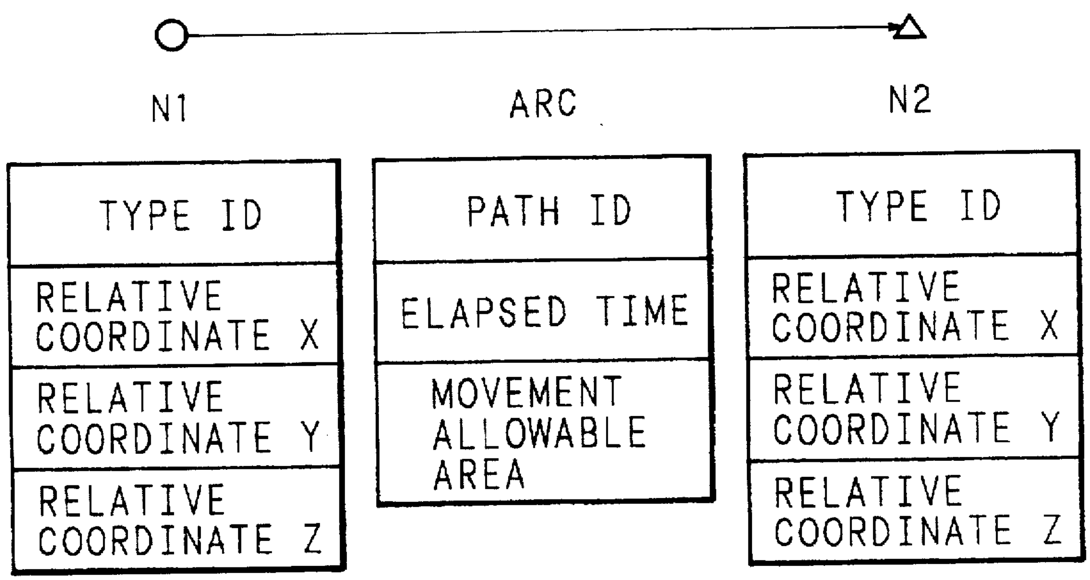
FIG. 23 is a diagram for explaining a partial graph.

As shown in FIG. 23, each node is managed by information consisting of type ID registered by labeling for identifying the shape of the object and relative coordinates X, Y, and Z in a three-dimensional coordinate system, while each arc is managed by information consisting of path ID for identifying the path and elapsed time taken to move along the path. In FIG. 22B, the nodes N1 to N4 are defined by their relative positions, and are relocatable, that is, the whole graph can be moved in parallel directions in three-dimensional space. This graph is also called a partial graph since it can be combined with other graphs to construct a new graph.

Suppose here that there are a partial graph consisting of nodes N1 to N4 and a partial graph consisting of nodes N5 to N8, as shown in FIG. 24A. If nodes N3 and N7 are similar in type and are approximately the same in velocity vector, then the nodes N8 and N7 are determined as the nodes for connection. Here, the velocity vector of node N3 represents the speed and direction in three-dimensional space directed from node N8 to node N4, while the velocity vector of node N7 represents the speed and direction in three-dimensional space directed from node N7 to node N8.

In such a case, the partial graph of nodes N1 to N4 and the partial graph of nodes N5 to N8 are moved relative to each other, and by superimposing node N3 on node N7, the two partial graphs are connected together to form a total graph, as shown in FIG. 24B. This total graph permits the use of a path leading from node N1 to N8 via N2 and N3 as well as the path leading from node N1 to N4 via N2 and N3, and also a path leading from node N5 to N4 via N6 and N3 as well as the path leading from node N5 to N8 via N6 and N3.

As shown in FIG. 24C, the type of each of the nodes N1 to N8 on the total graph is managed by a type table in which a node pointer pointing to the storage address of image data is stored corresponding to each type ID.

Figure 25:
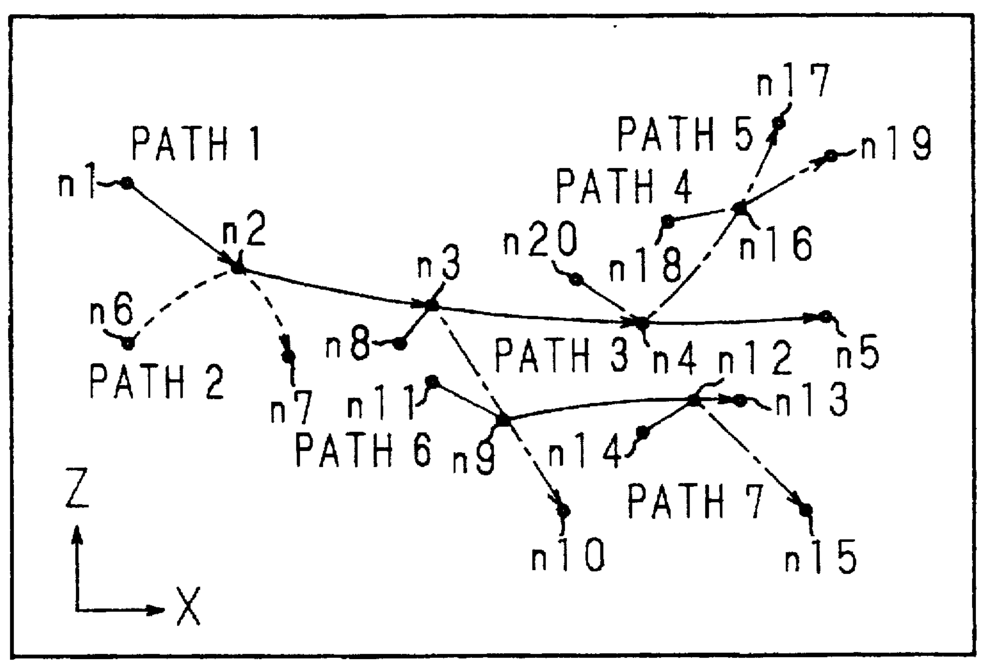
FIG. 25 is a diagram for explaining a total graph.

Now consider a total graph constructed from a path 1 consisting of nodes n1, n2, n3, n4, and n5, a path 2 consisting of nodes n6, n2, and n7, a path 3 consisting of nodes n8, n3, n9, and n10, a path 4 consisting of nodes n20, n4, n16, and n17, a path 5 consisting of nodes n18, n16, and n19, a path 6 consisting of nodes n11, n9, n12, and n13, a path 7 consisting of nodes n14, n12, and n15, as shown in FIG. 25.

By displaying this total graph, it is possible to know the direction in which a path is lacking. For example, from FIG. 25, it can be seen that a path extending upward from node n2 or n3 and a path extending downward from node n7 are lacking. Accordingly, a character moving upward and similar in type and velocity vector to node n2 or n3 and a character moving downward and similar in type and velocity vector to node 7 are captured to create their image data, and their partial graphs are added to the total graph of FIG. 25.

Then, all nodes on the resulting total graph are sorted in order in the X-axis direction, and a sorted table of node pointers, as shown in FIG. 26, is constructed.

Further, from the total graph of FIG. 25, transfer tables shown in FIGS. 27A and 27B are constructed. FIG. 27A shows the probability of a transfer being made from the path at the left, end of each row to the path in each column. That is, in the first row, for example, the probability of transfer from path 1 to path 1 is 0.0 since this cannot happen, while the probability of transfer from path 1 to path 2 is 0.266.

The transfer probability P is given by the following equation.

$$P=(\text{number of nodes before transfer})/(\text{total number of nodes on the path before transfer})\times(\text{number of nodes after transfer})/(\text{total number of nodes on the path after transfer})$$

Transfer from path 1 to path 2 is effected at node n2. In this case, the number of nodes before transfer is 2 (nodes n1 and n2), the total number of nodes on the path 1 before transfer is 5, the number of nodes after transfer is 2 (nodes n2 and n7), and the total number of nodes on the path 2 after transfer is 3; therefore, the transfer probability is 0.266.

FIG. 27B shows the probability of transfer from the path at the left end of each row to the path in each column via two transfers.

Figure 28:
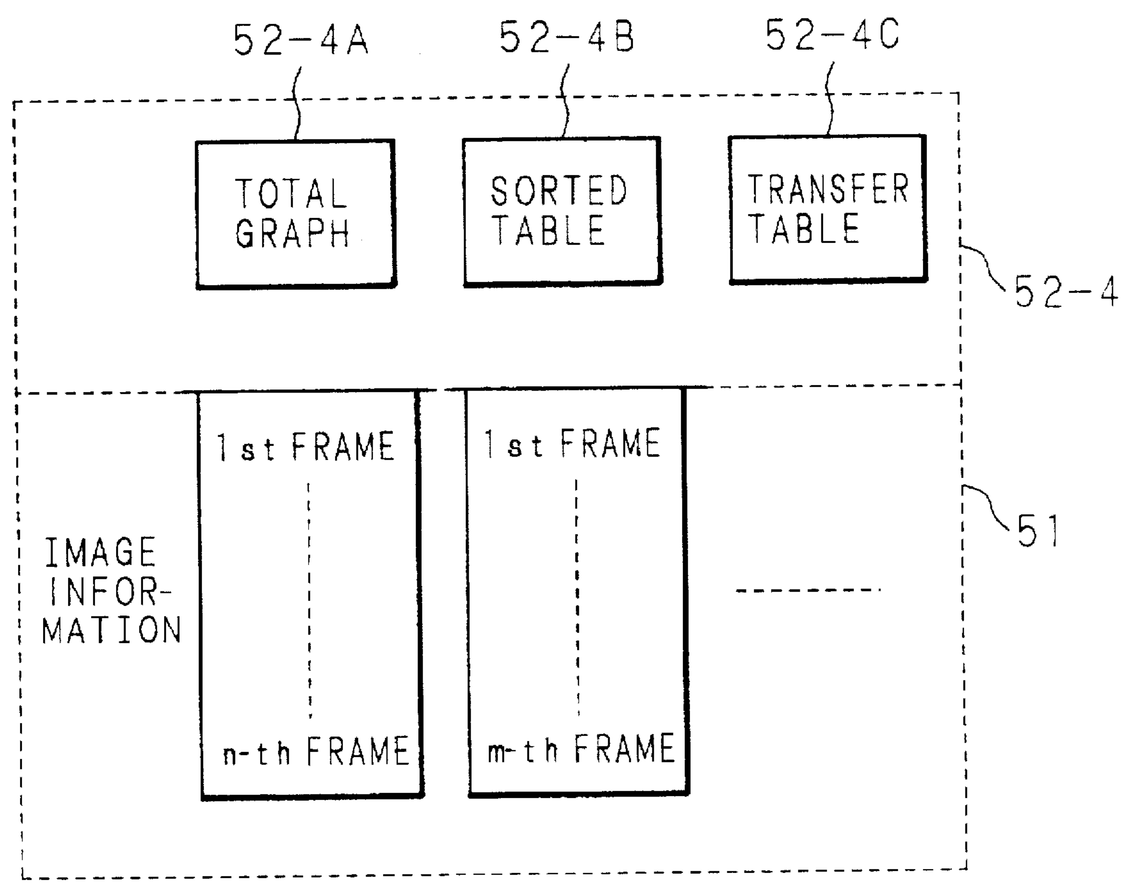
FIG. 28 is a diagram showing the organization of the information storage unit for image selection according to the embodiment of the present invention.

FIG. 28 is a diagram for explaining the information storage unit 5 in the above example. In the figure, a graph information unit 52-4 is provided for storing the total graph 52-4A, sorted table 52-4B, and transfer table 52-4C as the fake information in the fake information unit 52 shown in FIG. 1A.

Figure 29:
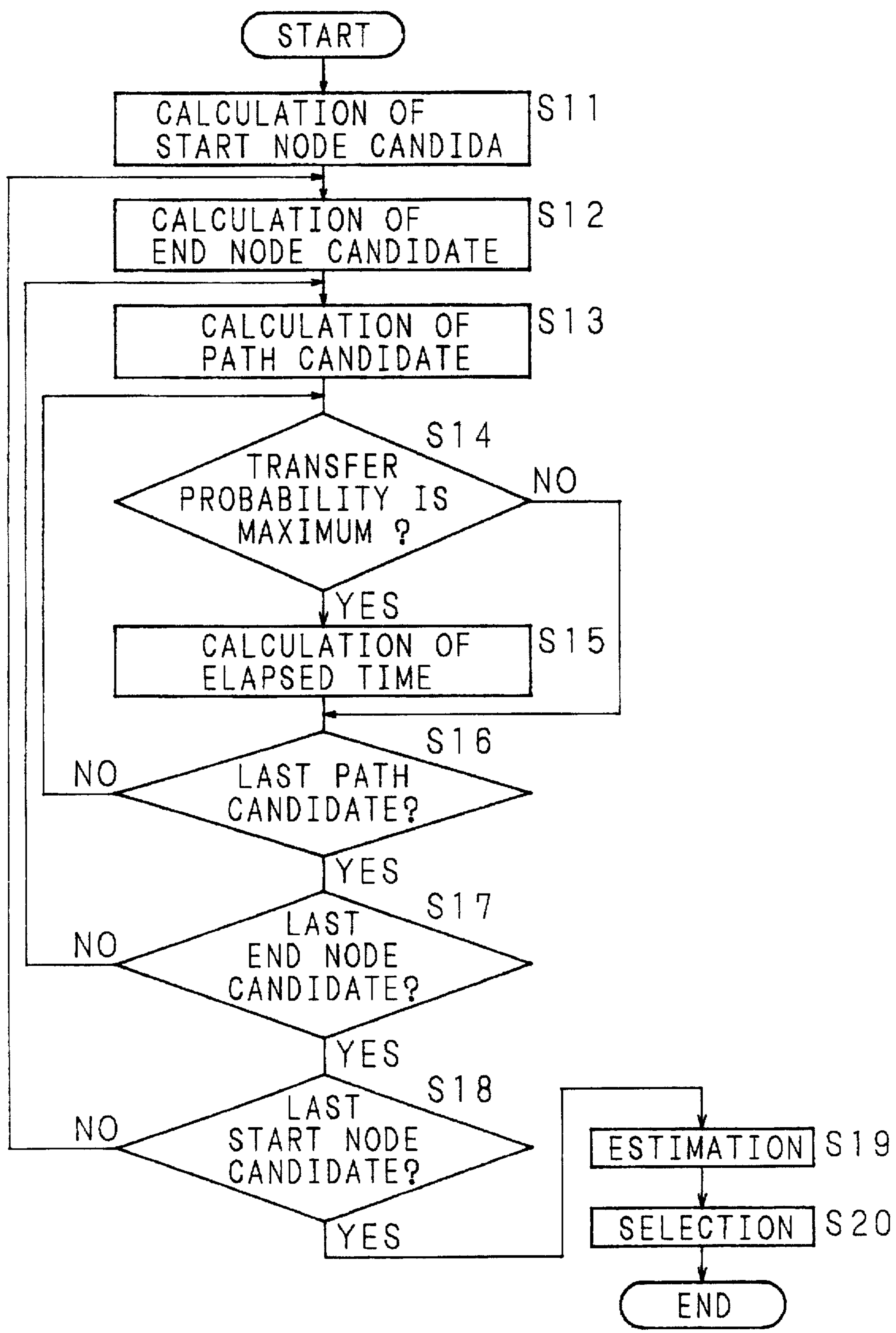
FIG. 29 is a flowchart illustrating a process of image generation.

FIG. 29 shows a flowchart illustrating the image generation process in detail. This process is initiated by issuing a move command. The move command has parameters such as the start type defining the type at the start of an object to be moved, the move end position, the moving time, priority, etc.

First, using the start type as the index, the total graph 52-4 is searched to find nodes having approximately the same type as the start type defined by the parameter, and the nodes thus found are chosen as start node candidates (step S11). Next, for each start node candidate, an end node corresponding to the move end position defined by the parameter, with the start node position as the reference, is obtained from the total graph by making a guess from the sorted table 52-4B shown in FIG. 28, and the thus obtained node is chosen an end node candidate (step S12).

Next, for each start node/end node pair, all path candidates are obtained from the total graph (step S13). At this time, the transfer probability is calculated for each path candidate by referencing the transfer tables 52-4C shown in FIGS. 27A and 27B. If there exits no transfer, the transfer probability is set to 1.0. Each path candidate is checked to see if its transfer probability is larger than any other path candidate (step S14). The path candidate with the largest transfer probability is determined as the path, and the path leading from the start node candidate to the end node is followed in sequence, and the elapsed times along the arcs between the respective nodes are summed to calculate the elapsed time of the path (step S15).

After that, it is checked if the path candidate is the last path candidate (step S16). If it is not the last candidate, the process returns to step S14, to repeat steps S14 to S16. If it is the last path candidate, the process proceeds to step S17 where it is checked if the end node candidate is the last end node candidate. If it is not the last candidate, the process returns to step S13, to repeat steps S13 to S17. If it is the last end node candidate, the process proceeds to step S18 where it is checked if the start node candidate is the last start node candidate. If it is not the last candidate, the process returns to step S12, to repeat steps S12 to S18. If it is the last start node candidate, the process proceeds to step S19.

Figure 30:
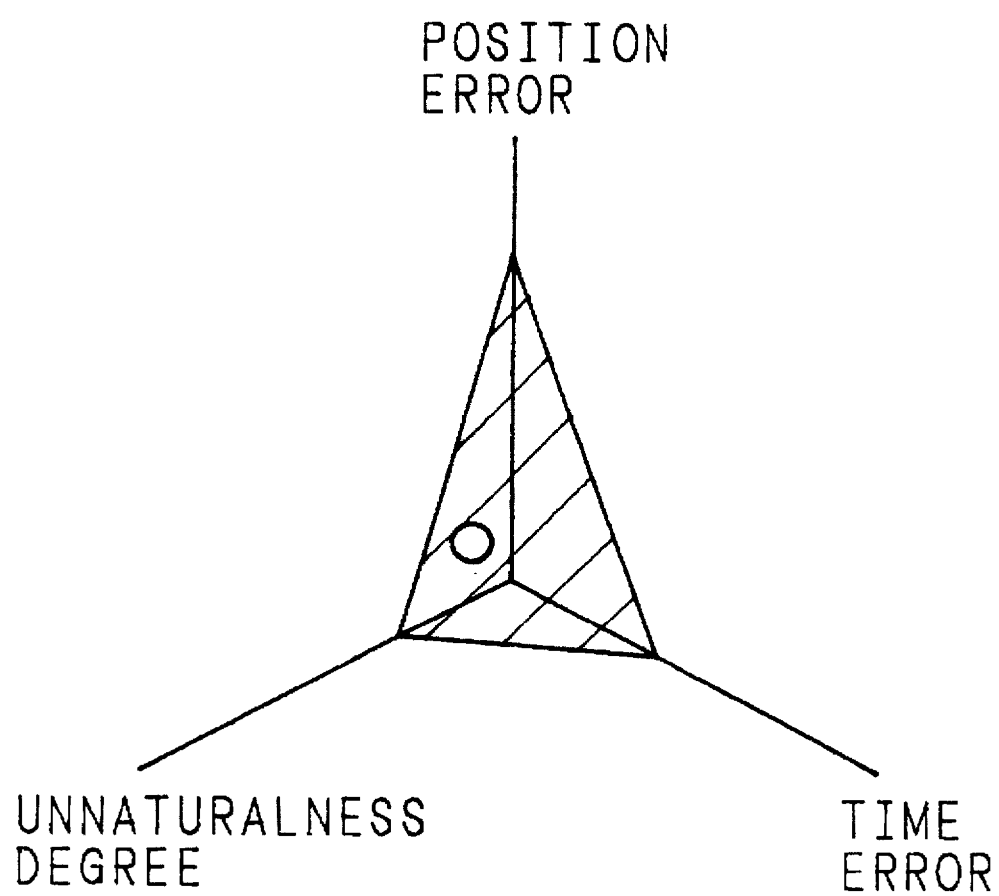
FIG. 30 is a diagram showing an evaluation chart.

In step S19, for each start node/end node candidate pair for which the path is determined, an evaluation chart, such as shown in FIG. 30, is constructed by calculating the position error between the end node position and the move end position defined by the parameter, the time error between the path's elapsed time and the moving time defined by the parameter, and the number of path transfers as an indicator of the degree of unnaturalness of the shape. At this time, these factors are weighted according to the priorities of their associated parameters, for example, position error:time error:unnaturalness degree=2:1:1. Then, the values of the position error, time error, and unnaturalness degree are respectively plotted along the three axes, and the three plotted points are joined to construct a triangle; then, the area of the triangle and the distance from the center of gravity of the triangle to the origin are calculated. Finally, a candidate pair For which the sum of the area of the triangle and the distance is the smallest is selected and determined as the start node/end node/path combination (step S20).

Figure 31:
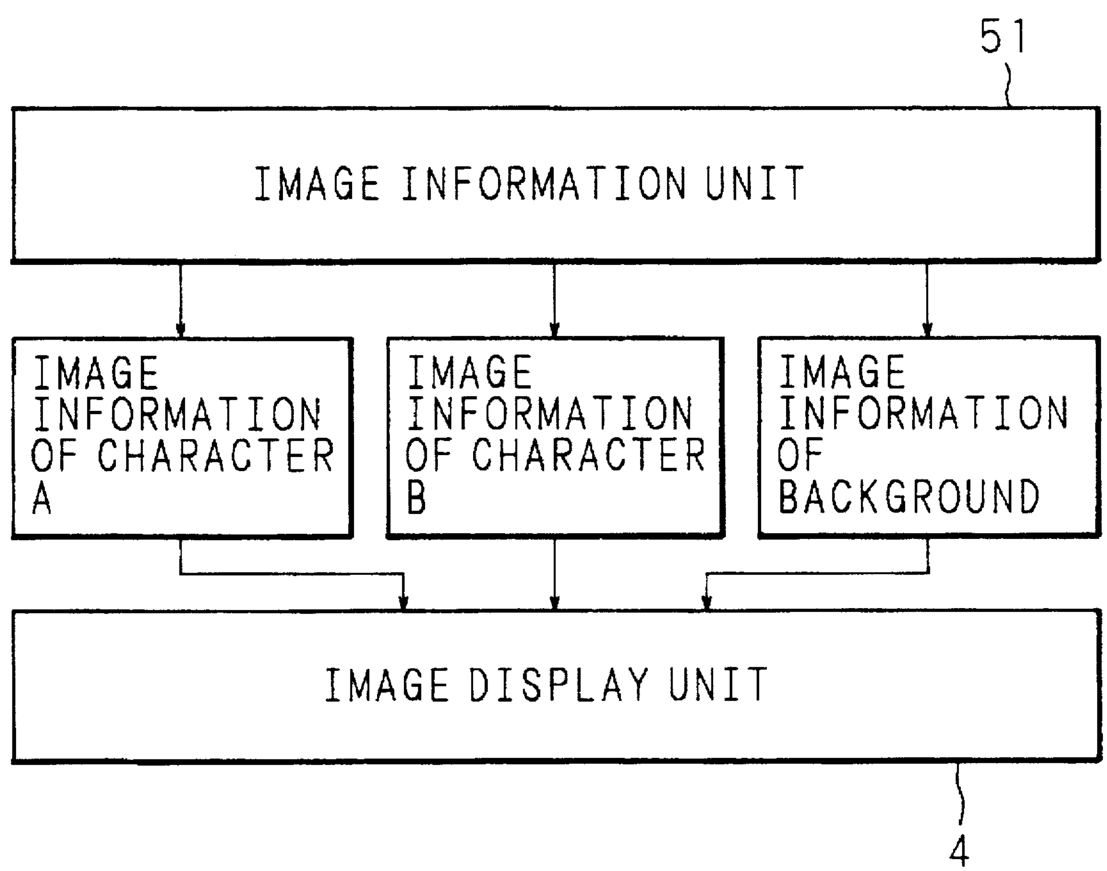
FIG. 31 is a diagram showing the flow of a plurality of image information items.
Figure 32:
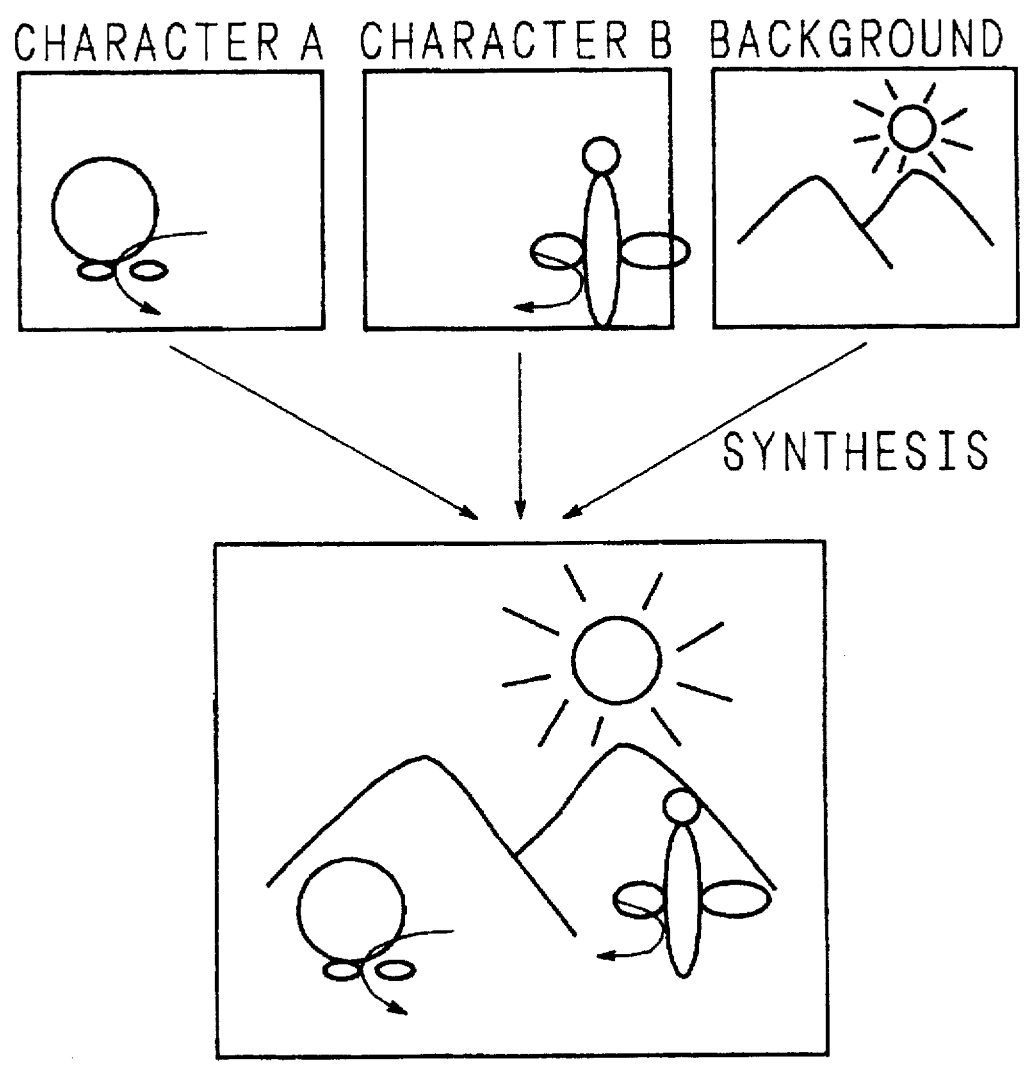
FIG. 32 is a diagram showing arm example of a combined image of a plurality of image information items.
Figure 33:
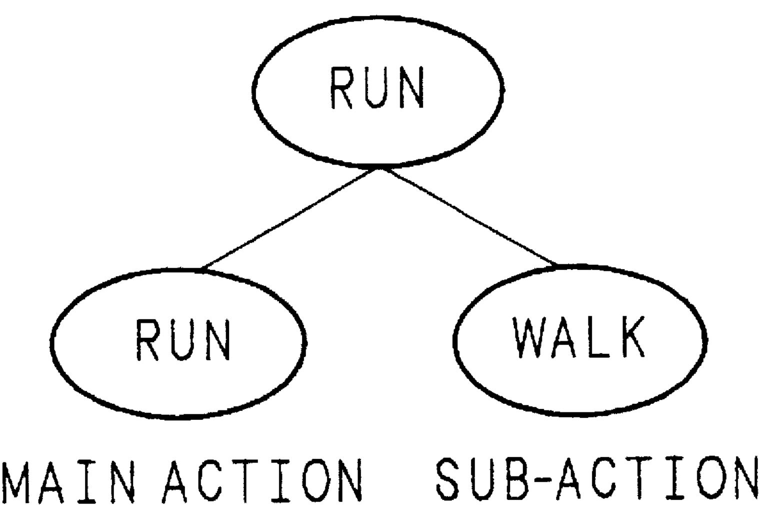
FIG. 33 is a diagram for explaining the relationship between a main action and a sub-action according to an embodiment of the present invention.

Then, image information for the key frames corresponding to the nodes along the selected path and image information for the intermediate frames between these key frames are displayed in sequence. At this time, image information appropriate for each of the characters and image information appropriate for the background are selected from the image information stored in the image information unit 51, and are outputted to the image display unit 4, which produces a display by superimposing the image information of each of the characters on the image information of the background. FIGS. 31 and 32 show an example of a display produced by superimposing the image information of two characters A and B on the image information of the background.

In the field of image generation for interactive animation and realtime animation, when it is desired to display a character of arbitrary type at the desired position and time by using actions of actually shot images, no previously known retrieval systems have been able to efficiently retrieve desired images for display, and the only method has been to search through all the actions. With this method, however, if the number of types or actions associated with the characters is too large, the time of computation necessary for retrieval will be enormous, and realtime image generation will become impossible. It has therefore been practiced to reduce the retrieval time by reducing the number of types and actions. This, however, has resulted in the production of images of similar action patterns, and it has not been possible to produce realistic images.

By contrast, according to the present embodiment, since search operations are performed using the total graph, and also the sorted table and transfer tables, a character of arbitrary type can be displayed at the desired position and time, thus making it possible to produce realistic images in real time.

(5) Abstraction of action

In the foregoing embodiment, when producing images of an action of moving from one point to another point, images of individual actions, such as "walking","running", etc., are connected together to represent an action of moving from the start point toward the target point. However, there are cases where the action of a creature to be represented as images cannot be recognized as a concrete action such as "walking" or "running", for example. The following description deals with an embodiment that is suitable for displaying highly abstract actions of creatures.

The action of "walking", if replayed at a higher speed by frame thinning (with some frames skipped), for example, will approximate to the action of "running". Conversely, the action of "running", if replayed at a slower speed by frame insertion (with some frames added), for example, will approximate to the action of "walking". The following description deals with an example in which the action of "running" contains the main action of "running" and its accompanying sub-action of "walking".

Figure 34:
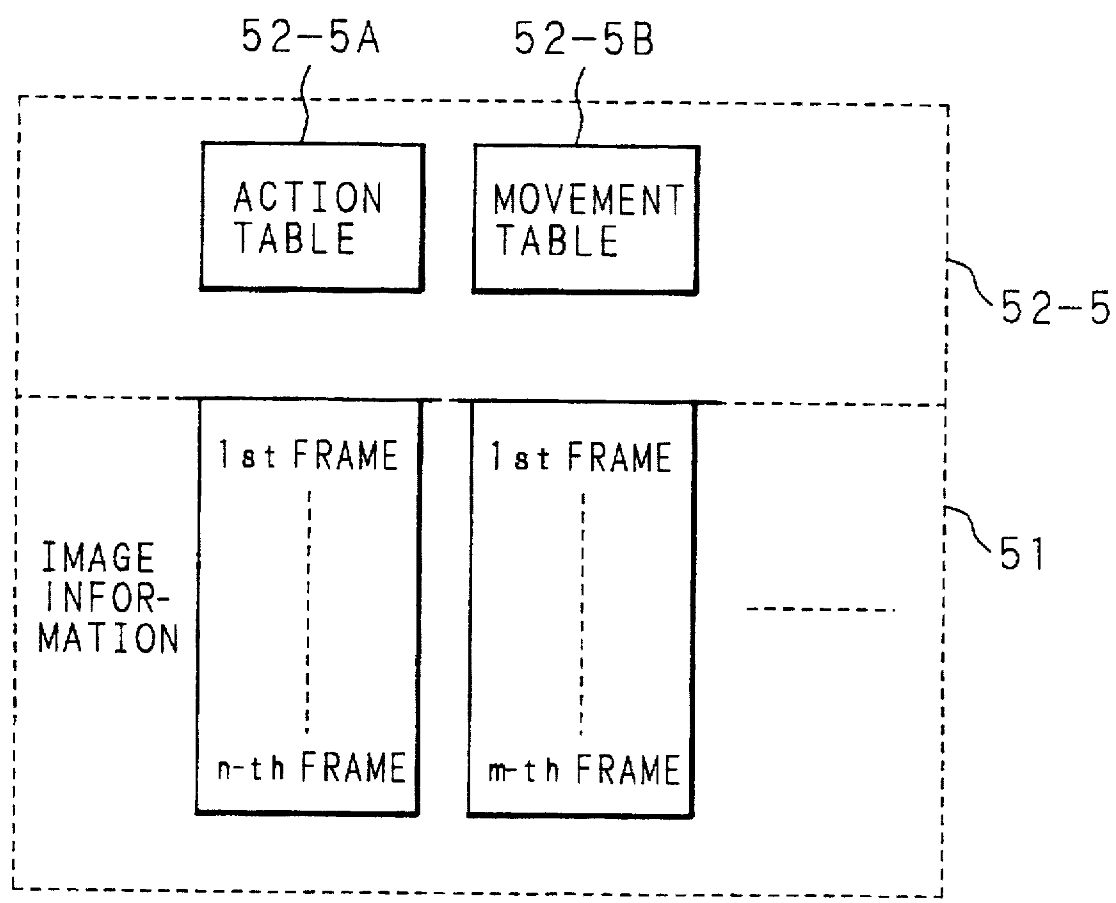
FIG. 34 is a diagram showing the organization of the information storage unit for the main action and the sub-action according to the embodiment of the present invention.

FIG. 34 is a diagram for explaining the information storage unit 5 in this embodiment. As shown, a table storage area 52-5 is provided for storing an action table 52-5A showing connection relationships between actions, and a movement table 52-5B showing the types of images moving between points.

As shown in FIG. 35, the action table 52-5A indicates whether the connection from the current action to the next action is possible or not. In FIG. 35, "1" indicates that the action connection is possible, and "x" indicates that the action connection is not possible. In the example of FIG. 35, there are three types of actions, "walk", "run", and "fly". The actions "walk" and "run" can be interconnected in either order, but the action "fly" can only be connected with the action "fly".

Figure 36:
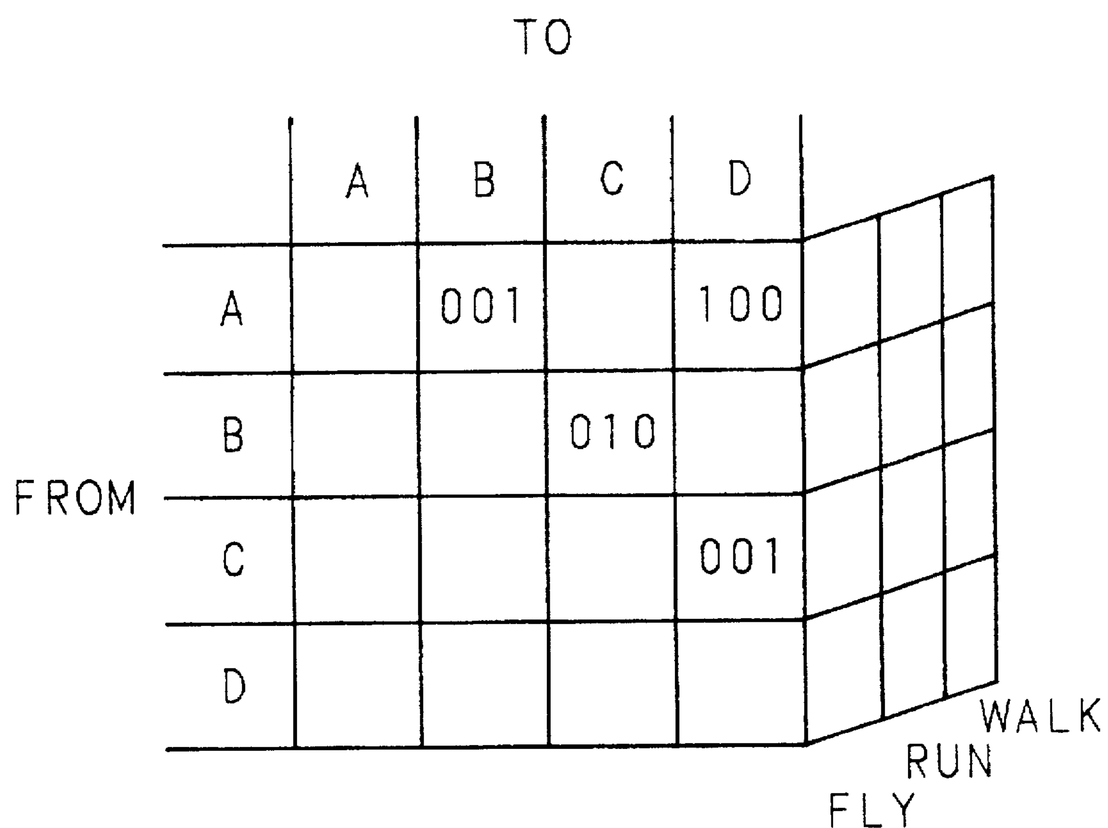
FIG. 36 is a diagram showing a movement table of a first example.
Figure 37:
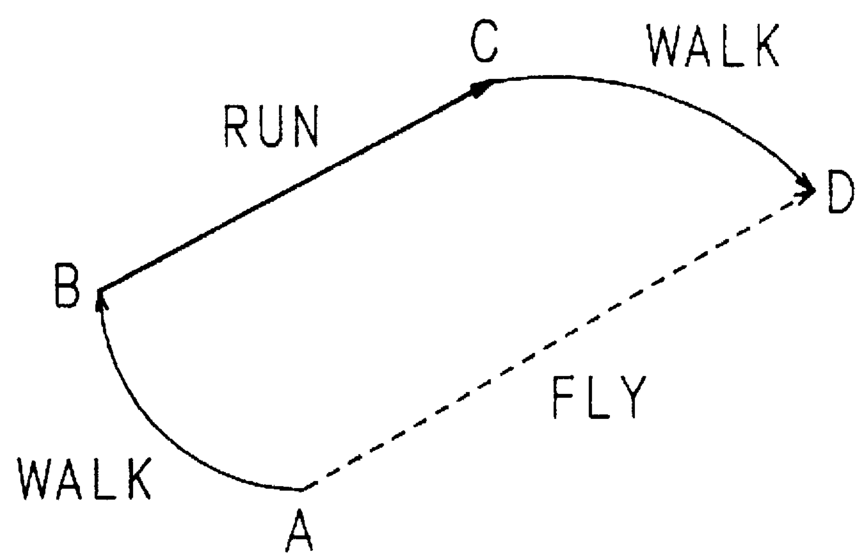
FIG. 37 is a diagram showing a path candidate of the first example.

The movement table 52-5B, as shown in FIG. 36, indicates the action types of images moving from one point, A to D, to another point, A to D. In FIG. 36, "1" indicates the existence of an image, while "0" indicates nonexistence of an image. The bits in each three-digit number are associated with the actions, "fly", "run", and "walk", in this order from the leftmost bit. In the example of FIG. 37, for movement from point A to point B, only the action "walk" exists and the other actions "run" and "fly" do not exist. Likewise, for movement from point A to point D, only the action "fly" exists, and for movement from point. B to point C or from point C to point D, only the action "run" or "walk", respectively, exists.

Suppose here that a command requesting the action "run" from start point A to end point D is inputted to the command interpreting unit 2 in the image generating apparatus 1 shown in FIG. 1A. Then, the image selecting unit 3 selects images as described below. In the movement table shown in FIG. 36, the only image available for the action from point A to point D is "fly"; therefore, in the above example, no direct path to point D is available. As for other paths passing through other points, it is not possible to establish a path to point D with images of "run" only. Since the action "walk" is the sub-action of the action "run", if the action "walk" is used in conjunction with the action "run", then a path leading from point A to point D can be established, as shown in FIG. 37. The outputs in this case are "walk" from point A to point B, "run" from point B to point C, and "walk" from point C to point D.

Figure 38:
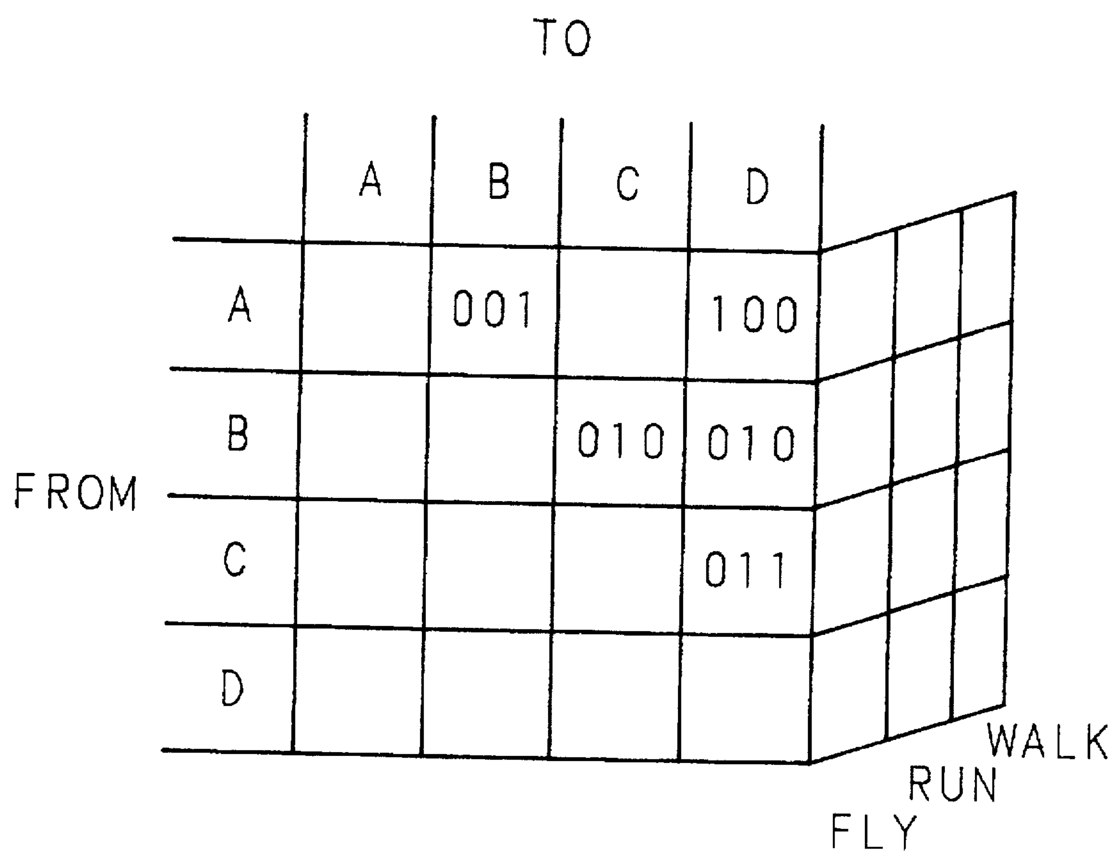
FIG. 38 is a diagram showing a movement table of a second example.
Figure 39:
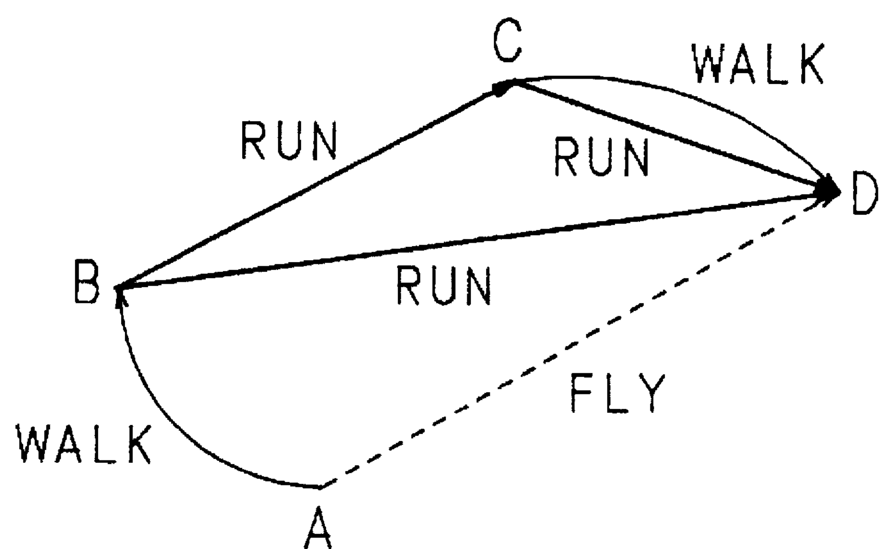
FIG. 39 is a diagram showing path candidates of the second example.

In the movement table shown in FIG. 36, only one path is possible, but if the movement table is configured as shown in FIG. 38, three paths are available for selection, as shown in FIG. 39. The first path is the same as that in the above example, i.e., A→B (walk), B→C (run), and C→D (walk). The second path consists of A→B (walk), B→C (run), and C→D (run), and the third path consists of A→B (walk) and B→D (run). When more than one path is possible, as just described, the optimum path should be selected by comparing parameters between the available paths, such as the difference between the target time and the time taken along the path, the number of transfers, and the ratio of the main action (in this example, "run") to the sub-action (in this example, "walk").

In the above example, only one kind of sub-action is provided, but it will be appreciated that more than one kind of sub-action may be provided.

Figure 40:
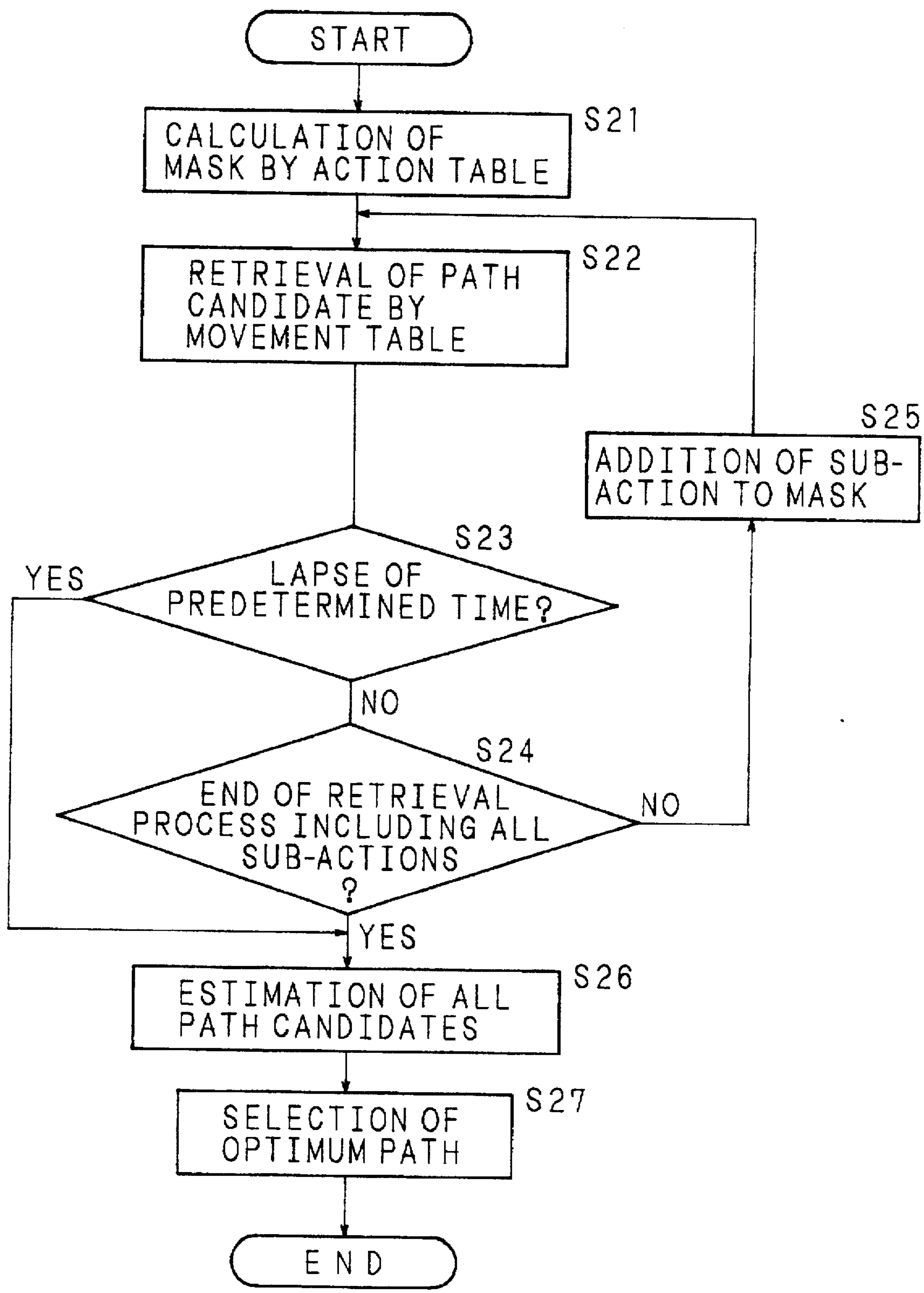
FIG. 40 is a flowchart illustrating a process of image generation.

FIG. 40 shows a flowchart illustrating a process of image generation according to this embodiment. This process is initiated by issuing a move command. First, the mask to be used is calculated according to the type of action entered, on the basis of the action table for the main and sub actions corresponding to the action entered (step S21). Then, with only the main action as the mask, a path candidate is retrieved on the basis of the movement table (step S22). Then, it is determined whether predetermined time has elapsed (step S23). If the predetermined time has elapsed, the process proceeds to step S26; if the predetermined time has not yet elapsed, then it is determined whether the retrieval process for actions including all sub-actions is completed (step S24). If there is any sub-action not processed yet, the sub-action is added to the mask (step S25), and the process returns to step S22 to retrieve a path candidate on the basis of the movement table.

When the predetermined time has elapsed (YES in step S23), or when the retrieval process for actions including all sub-actions is completed (YES in step S24), if there are a plurality of path candidates retrieved, all the retrieved path candidates are evaluated (step S26). The predetermined time used here is the time that does not affect realtime image presentation. Since the apparatus of the invention is used to present images of creatures' actions, it is of utmost importance to ensure realtime presentation of images, and to achieve realtime image presentation, it is essential that the path candidate retrieval process be finished within the effective time; therefore, after the expiration of the predetermined time, even if the retrieval process for other path candidates is not completed, the process immediately jumps to step S26 for evaluation of the already retrieved path candidates. This ensures realtime image generation. When there are a plurality of sub-actions, if priorities are allocated according to their mask order, the optimum path will be retrieved as a path candidate without fail.

The evaluation process in step S26 will be described in further detail. As in the foregoing embodiment, an evaluation triangle is constructed for each path candidate on the basis of the position error, time error, and unnaturalness degree, as shown in FIG. 30, and the area of the triangle and the distance between the center of gravity of the triangle and the origin are calculated. At this time, weights may be assigned according to the priorities of the position error, time error, and unnaturalness degree.

The position error and time error are the same as those defined in the foregoing embodiment, but the degree of unnaturalness is different from that previously defined. In the foregoing embodiment, only the number of transfers is used as the indicator of unnaturalness, but in the present embodiment, in addition to the number of transfers the ratio of the main action to the sub-action is also used as an indicator of unnaturalness. When the ratio of the main action is denoted as n, and the number of transfers as c, the unnaturalness degree in the present embodiment is given by the following equation.

$$\text{Unnaturalness degree} = n + c \times w$$

where w is the weighting factor indicating the difference in significance between the main to sub action ratio and the number of transfers. Here, n, c, and w vary depending on the creature's type and action.

Finally, as in the foregoing embodiment, a path candidate for which the sum of the distance and the area of the triangle is the smallest is selected and determined as the optimum path (step S27).

As described, according to the present embodiment, since main and sub actions are included in one action, it is possible to present images of action patterns of creatures with increased abstractiveness. Furthermore, in cases where the stored image patterns are limited and the intended image cannot be presented by using the main action only, images free from unnaturalness can be presented by using sub-actions in conjunction with the main action.

(6) Thinking and action

In recent years, with high processing ability of computer systems, artificial creatures constructed from autonomous object groups have been conceived, and attempts have been made to realize on a computer a world where such artificial creatures live. The image generating apparatus of the invention can be used to generate images of artificial creatures' actions. Referring to FIG. 1A, suppose that an action pattern that the artificial creature is thinking and wishing to perform is inputted to the command interpreting unit 2 in the form of a command (including the type of action, position of action, and time of action). Then, in accordance with the command, the image selecting unit 3 selects the desired image from the images stored in the information storage unit. 5, and the selected image is displayed on the image display unit 4, thus accomplishing the presentation of the artificial creature's action as images.

Being characteristic of creatures, artificial creatures need to have responsiveness for responding naturally to external conditions, and thinking power of a certain depth for performing planning, learning, and prediction based on past experience. In order to determine action patterns, as creatures in the natural world, artificial creatures have two action determining sections: a section serving to control reflex actions to respond instantaneously (real time) to external changes (this section corresponds to the spinal cord of creatures in the natural world), and a section that determines planned actions based on relatively deep thinking (this section corresponds to the cerebrum and cerebellum of creatures in the natural world). In the following explanation, the former section is described as a lower action determining section, and the latter section as a higher action determining section.

When presenting images to represent an action pattern based on the thinking of an artificial creature by connecting image patterns stored in the information storage unit 5, if the exchange of messages is not performed smoothly between these action determining sections and the image generating apparatus 1, unnaturalness will become noticeable in the presented action of the artificial creature. The following description deals with various examples of message exchanges between these action determining sections and the image generating apparatus 1.

① Transfer of completion warning message/completion prewarning message.

Figure 41:
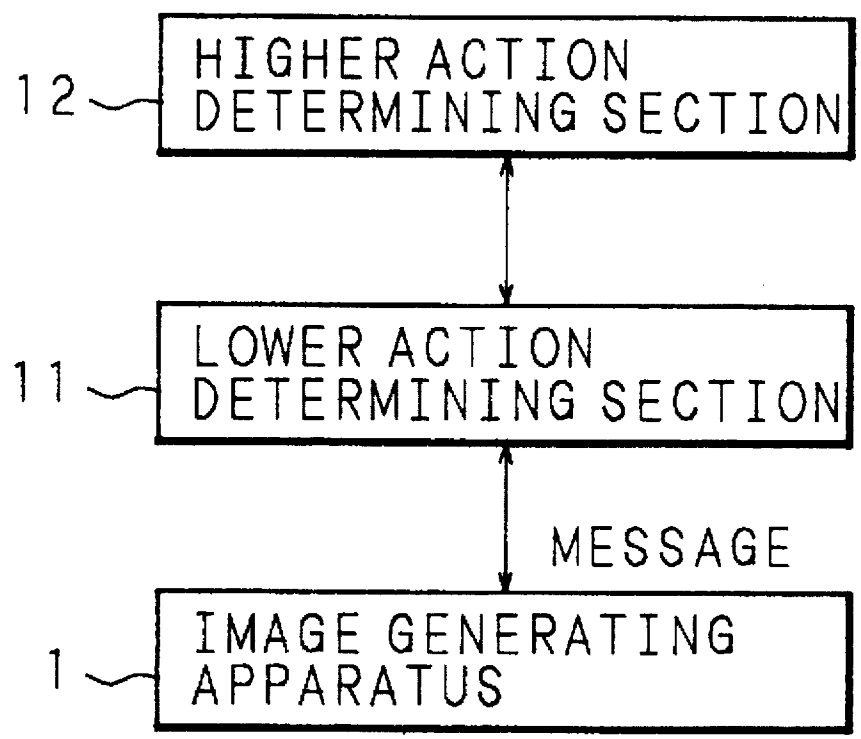
FIG. 41 is a diagram showing the relationship between an image generating apparatus and an action determining section.

FIG. 41 shows the relationships between the lower action determining section 11, the higher action determining section 12, and the image generating apparatus 1. Commands requesting images corresponding to desired action patterns are transferred as messages from the lower action determining section 11 to the image generating apparatus 1, and notification of image selection completion, etc. is transferred in the form of a message from the image generating apparatus 1 to the lower action determining section 11. On the other hand, information on perception of the external condition is transferred from the lower action determining section 11 to the higher action determining section 12, and the determined action pattern is transferred from the higher action determining section 12 to the lower action determining section 11. The image generating apparatus 1, the lower action determining section 11, and the higher action determining section 12, respectively operate with a prescribed time as a unit time (this unit time is called the tick). The length of one tick is different between them; the tick is made the shortest for the image generating apparatus 1 in order to realize realtime image representation after the action is determined, and the longest for the higher action determining section 12 which performs relatively deep thinking. The length of one tick in the lower action determining section 11 may be the same as that in the higher action determining section 12.

Figure 42:
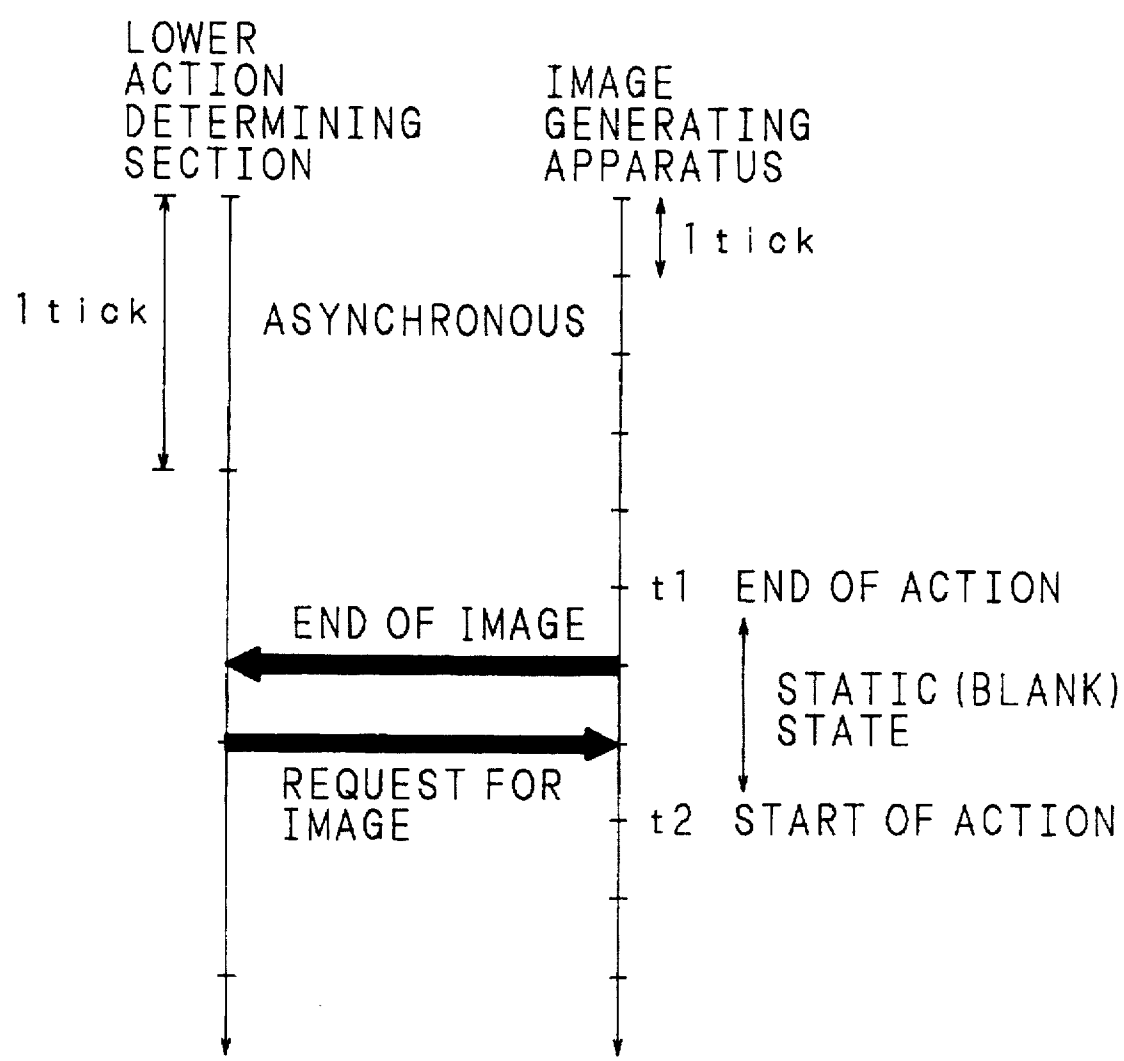
FIG. 42 is a message transfer diagram illustrating the exchange of messages between the image generating apparatus and the lower action determining section for explaining a problem involved.

In a workstation, the image generating apparatus 1 and the lower action determining section 11 are operating asynchronously, and also, there is a time difference between the ticks of the two; therefore, there occurs an image blanking period whose duration at the maximum is equal to one tick of the lower action determining section 11. FIG. 42 is a message transfer diagram for explaining the occurrence of this blanking period. In the figure, t1 is the time at which display of the selected image is finished and one action of the artificial creature is completed. When displaying the image of one action is completed, an image end message is sent at the next tick from the image generating apparatus 1 to the lower action determining section 11. Upon accepting this message, the lower action determining section 11 transfers at the next tick an image request message to the image generating apparatus 1. Only after receiving this message, the image generating apparatus 1, prepares the image of the next action requested by the message, and displays the requested image. Accordingly, during the period from time t1 until time t2 at which display of the action is resumed, the artificial creature stays in stationary state. This produces extremely unnatural effects.

The present embodiment is aimed at eliminate such unnaturalness; that is, at a time earlier than the end time of the current image display by more than one tick of the lower action determining section 11, a message (completion warning message) notifying the impending completion of the current image is transferred from the image generating apparatus 1 to the lower action determining section 11. Upon receiving this completion warning message, the lower action determining section 11 sends a message requesting the image of the next action (image request message) to the image generating apparatus 1, and immediately following the completion of the current action, the image generating apparatus 1 displays the image on the basis of the image request message without causing interruptions.

Figure 43:
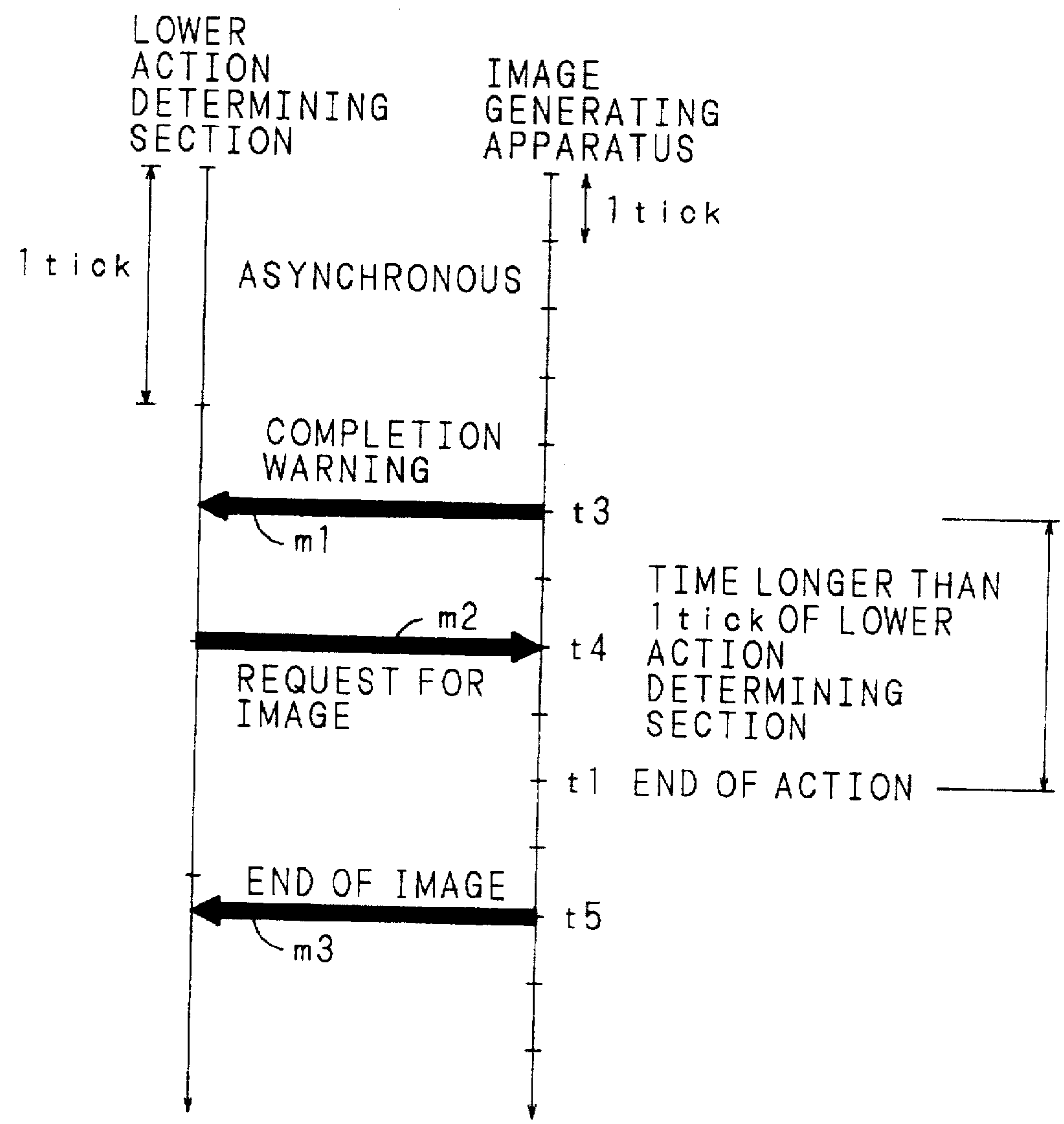
FIG. 43 is a message transfer diagram illustrating the exchange of messages between the image generating apparatus and the lower action determining section according to the embodiment of the present invention.

FIG. 43 is a message transfer diagram illustrating the exchange of messages in the present embodiment. At time t3 that is earlier than time t1, the end time of the current action, by more than one tick of the lower action determining section 11, a completion warning message m1 is transferred from the image generating apparatus 1 to the lower action determining section 11. Then, at the next tick, that is, at time t4, an image request message m2 is transferred from the lower action determining section 11 to the image generating apparatus 1. Upon receiving the image request message m2, the image generating apparatus 1 selects the requested image, and starting from time t1 at which the current action is complete, displays the selected image uninterruptedly from the current action. This enables the action of the artificial creature to be displayed without causing interruptions, so that the action of the artificial creature looks natural to the eye. After that, at time t5, an image end message m3 is transferred from the image generating means 1 to the lower action determining section 11.

One tick of the image generating apparatus 1 is shorter than one tick of the lower action determining section 11. Suppose, for example, that one tick is set to 100 ms for the image generating apparatus 1 and 400 ms for the lower action determining section 11. Then, if some message is transferred to the lower action determining section 11 at every tick of the image generating apparatus 1, the lower action determining section 11 will have to update the four-tick messages sent from the image generating apparatus 1 in order at every tick of the lower action determining section 11. To avoid this, it will be convenient if time granularity is matched between the image generating apparatus 1 and the lower action determining section 11; in the above example, provision is made so that the image generating apparatus 1 sends a message once at every four ticks of the lower action determining section 11. On the other hand, any message from the lower action determining section 11 is accepted by the image generating apparatus 1 at any tick thereof. Therefore, the completion warning message is sent at a time earlier than the image display end (action end) time by four ticks of the image generating apparatus 1 that are longer than one tick of the lower action determining section 11.

In the above example, provision is made in such a way that messages are exchanged between the lower action determining section 11 and the image generating apparatus 1 as to eliminate the blanking period in the action of the artificial creature, but it will be recognized that the same can also be considered for the interaction between the higher action determining section 12 and the image generating apparatus 1. In a workstation, it will take a sequence of steps, and therefore time, before an action determined by the higher action determining section 12 is displayed as an image by the image generating apparatus 1. Therefore, as in the relationship between the lower action determining section 11 and the image generating apparatus 1, when a series of actions of an artificial creature is to be displayed without causing interruptions between actions, if after the completion of image display of one action the higher action determining section 12 considers the next action and the image generating apparatus 1 prepares the requested image, the motion of the artificial creature will stop between one action and the next action, resulting in unnaturalness. To avoid this, in the example hereinafter described, the minimum time, within which motion continuity can be guaranteed for the action considered by the higher action determining section 12, is calculated backward from the expected end time of the current action, and at the thus calculated time, a message notifying the impending completion of the action is transferred from the image generating apparatus 1 to the higher action determining section 12 via the lower action determining section 11, the message serving a cue to start the higher action determining section thinking the next action. This completion notifying message sent from the image generating apparatus 1 to the higher action determining section 12 is hereinafter referred to as the completion prewarning message.

Figure 44:
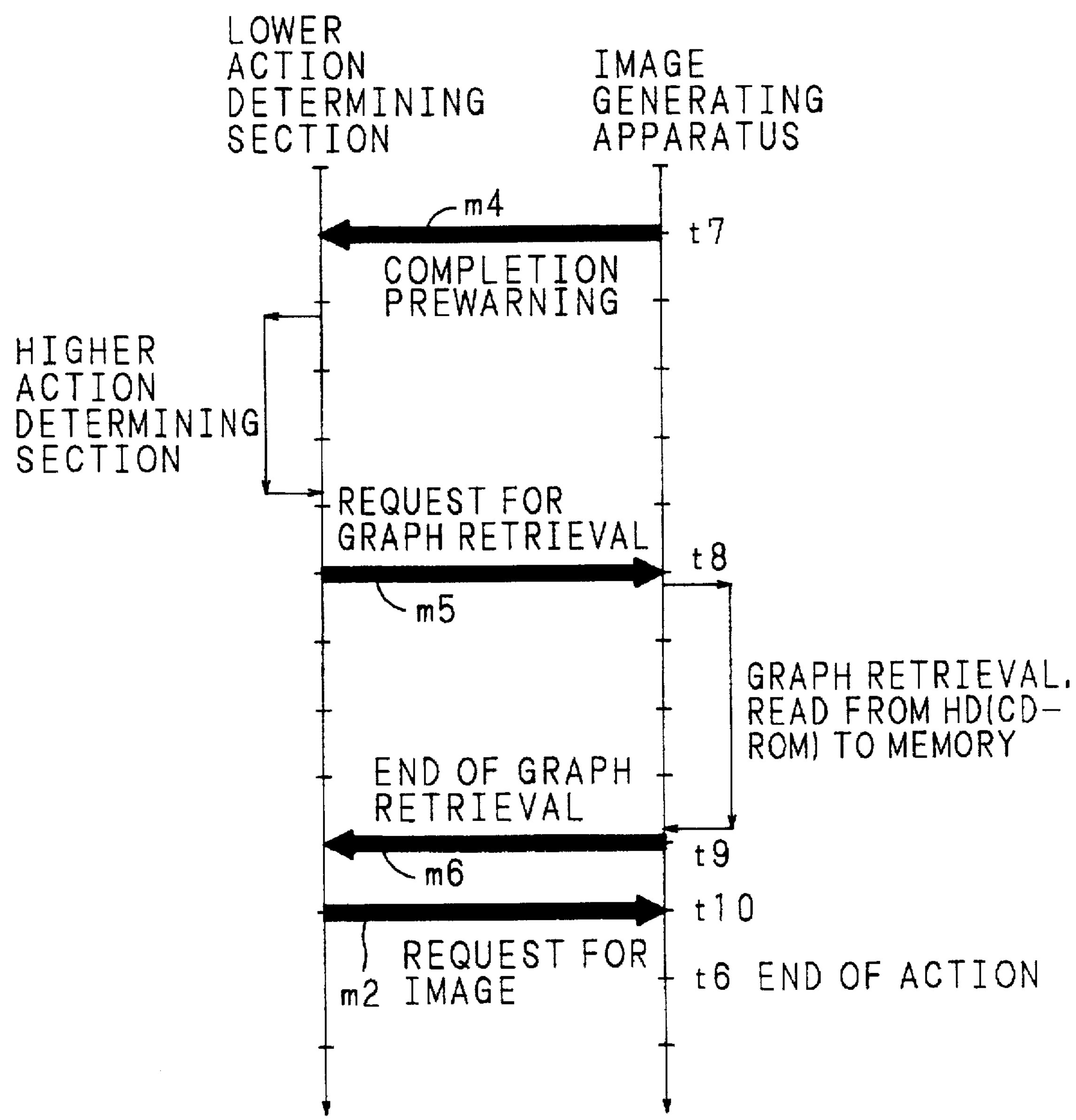
FIG. 44 is a message transfer diagram illustrating the exchange of messages among the image generating apparatus, the lower action determining section, and a higher action determining section according to the embodiment of the present invention.

FIG. 44 is a message transfer diagram illustrating the exchange of messages in the above example. The time at which the current action ends is denoted as t6. The thinking time for the higher action determining section 12 to plan an action, the time taken to read a total graph such as shown in FIG. 25 and to retrieve various path candidates, the operating times of the image generating apparatus 1 and the lower action determining section 11, etc. are subtracted from the end time t6 to calculate time t7. At time t7, tile image generating apparatus 1 sends a completion prewarning message m4 to the lower action determining section 11. When the lower action determining section 11 notifies the higher action determining section 12 of the impending completion of the current action in accordance with the completion prewarning message m4, the higher action determining section 12 plans the next action and sends, via the lower action determining section 11, a message m5 requesting the retrieval of the total graph (total graph retrieval request message) to the image generating apparatus 1 at time t8. The image generating apparatus 1 then prepares the total graph showing all the path candidates, and upon completion of the preparation, sends a message m6 notifying the completion of the total graph retrieval (graph retrieval completion message) to the lower action determining section 11 at time t9. The lower action determining section 11 sends an image request message m2 to the image generating apparatus 1 at time t10. Upon receiving the image request message m2, the image generating apparatus 1 selects the requested image, and starting from time t6 at which the current action is complete, displays the selected image uninterruptedly from the current action.

As described, according to the present embodiment, provisions are made so that the completion warning message and completion prewarning message notifying the impending completion of the action are sent to the lower action determining section 11 and the higher action determining section 12, respectively, prior to the completion of the action. As a result, by the time when the image of the current action is complete, the image of the next action is made ready, so that the action of the artificial creature can be displayed uninterruptedly without causing its motion to stop momentarily. The image of the artificial creature's action thus presented looks natural to the eye.

When the higher action determining section 12, the lower action determining section 11, and the image generating apparatus 1 operate synchronously to perfection within each one tick, the completion warning message and the completion prewarning message can be replaced by the image end message. Even when they operate synchronously in part, the situation comes to the same thing.

② Processing for sudden action

An action of a creature is determined based on its own desire or in response to a change in the outside world. The action can be categorized into two types: a normal action (classified as normal action), such as "walk toward destination" and "sit and eat food", and a sudden action (classified as sudden action), such as "surprised at a big sound" and "suddenly run away at the sight of the enemy". Therefore, an artificial creature to be displayed can have the ability to distinguish between these two types of actions, and if the distinction between them is made clear in the presentation of its actions, reality will be enhanced. That is, in the case of sudden action, unlike normal action, unnatural continuity of motion and a sudden start of an action will increase the sense of realism. The embodiment hereinafter described is aimed at enhancing reality for sudden action.

Figure 45:
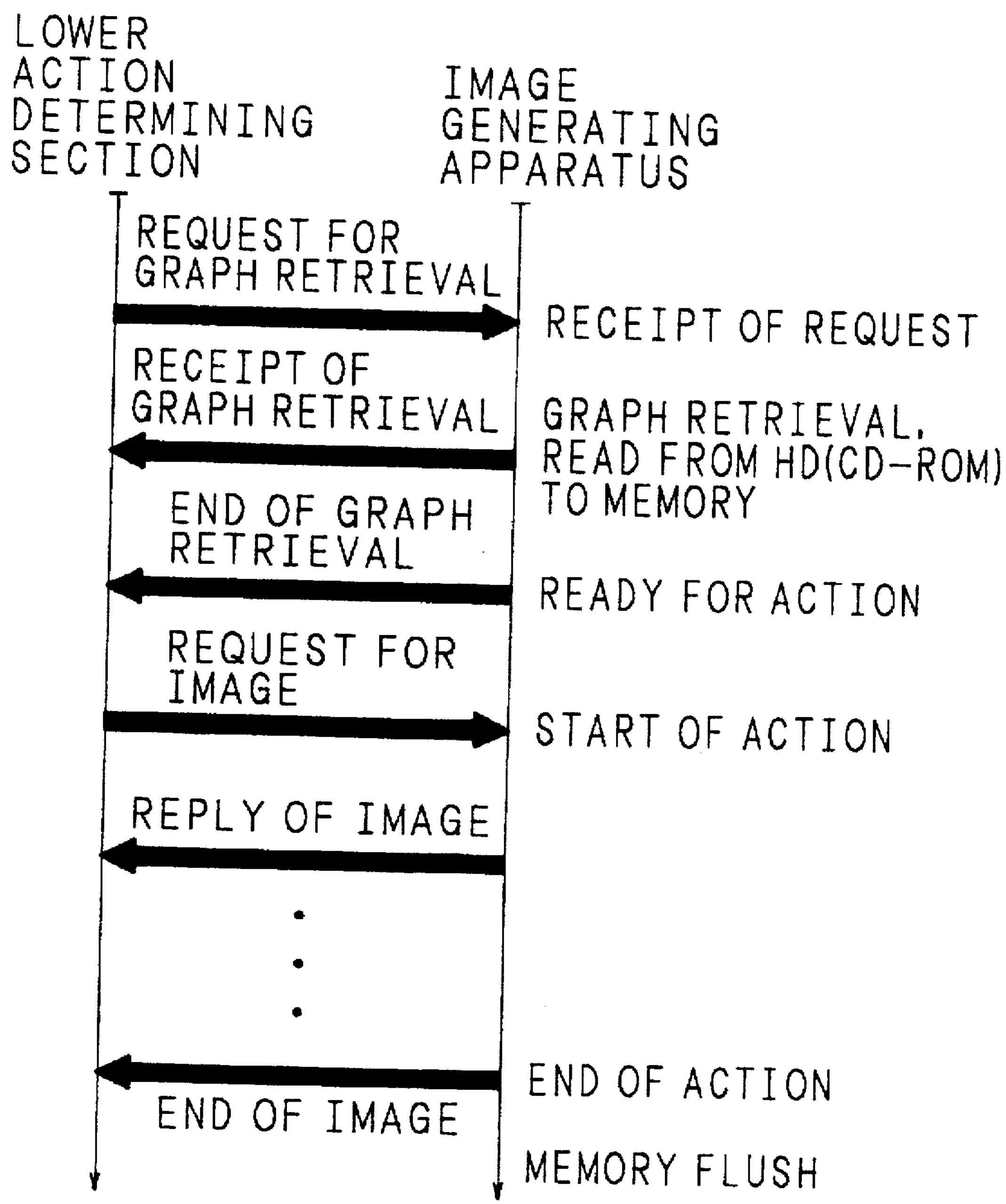
FIG. 45 is a message transfer diagram illustrating the exchange of messages between the image generating apparatus and the lower action determining section in a normal action.

FIG. 45 is a message transfer diagram illustrating the exchange of messages between the image generating apparatus 1 and the lower action determining section 11 in normal action. When a graph retrieval request message is sent from the lower action determining section 11, the request is accepted and a graph retrieval acknowledgement message is returned, while at the same time, the graph is read into memory from the hard disk (or CD-ROM). When reading into memory is completed, a graph retrieval end message is sent to the lower action determining section 11. After that, image display of the action is started in response to the image request message from the lower action determining section 11, and an image response message is returned to the lower action determining section 11. When the action is completed, an image end message is sent to the lower action determining section 11, and the memory is flushed to clear the data of the graph that was read into it.

Figure 46:
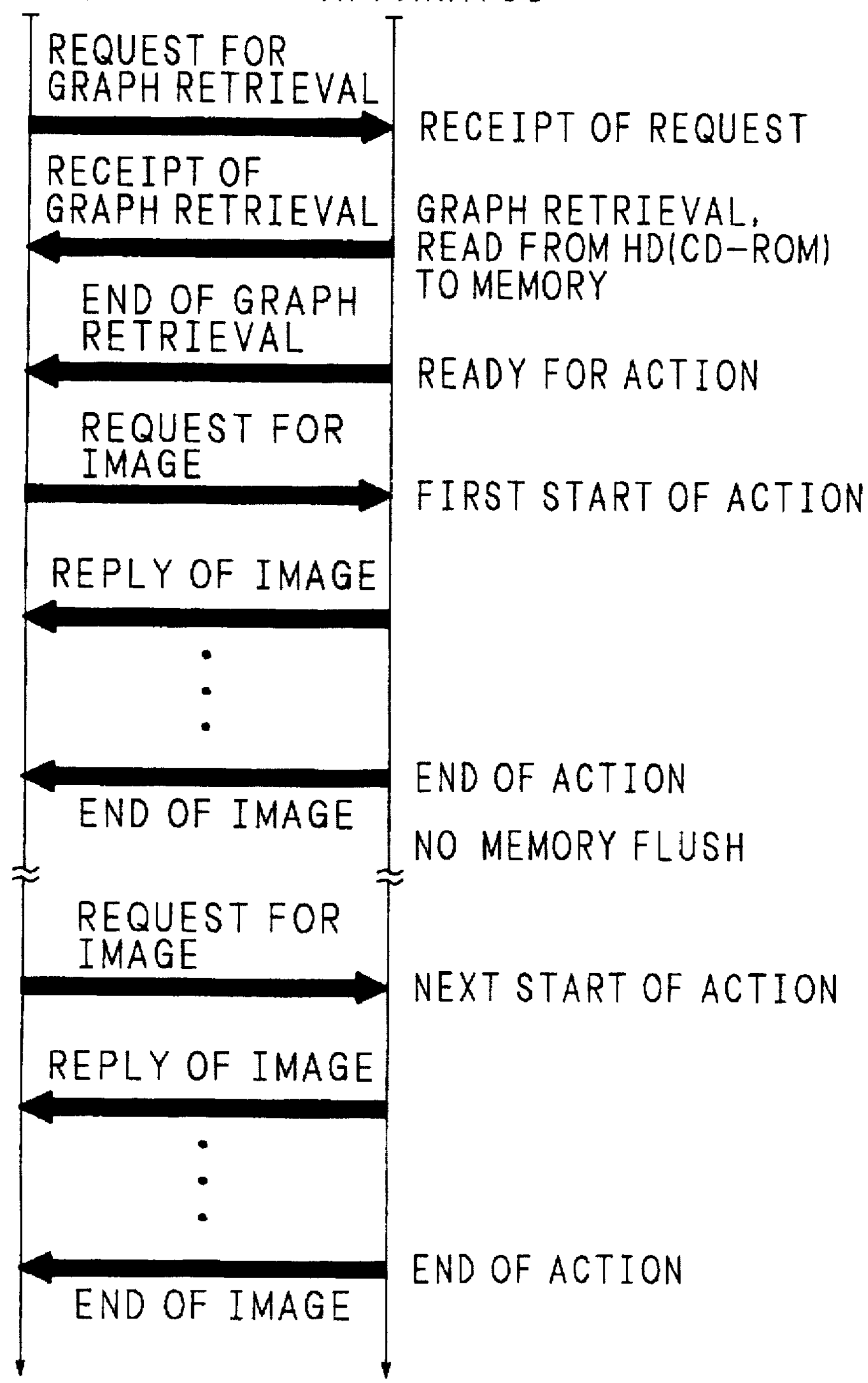
FIG. 46 is a message transfer diagram illustrating the exchange of messages between the image generating apparatus and the lower action determining section in a sudden action.
Figure 47:
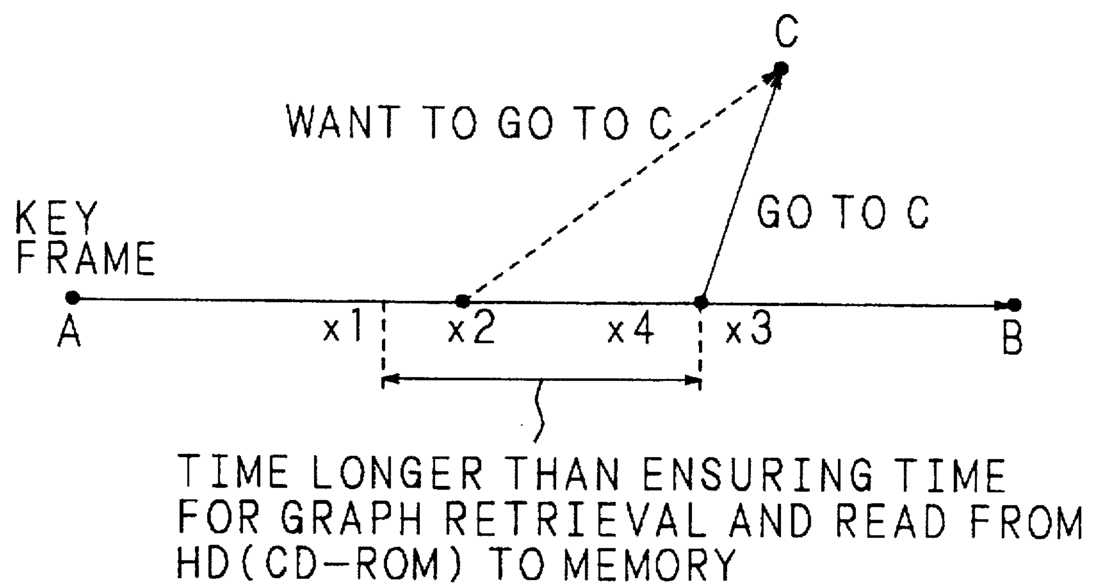
FIG. 47 is a diagram showing an action pattern.

FIG. 46 is a message transfer diagram illustrating the exchange of messages between the image generating apparatus 1 and the lower action determining section 11 in a sudden action. The message exchange between the image generating apparatus 1 and the lower action determining section 11 for the first action is the same as that described above for normal action, but when the action is completed, the memory is not flushed, but the graph data is retained in the memory. This enables the second or later action to be initiated immediately when an image request message is received from the lower action determining section 11. This enhances the reality of sudden action.

Whether to flush the memory at the completion of the action, that is, discrimination between a normal action and a sudden action, is determined by the status of a code flag. When it is desired to deliberately erase the sudden action from the memory, a flush request message is sent to the image generating apparatus 1 from the lower action determining section 11.

③ Action change in the middle of an action

There may occur a situation where an artificial creature, in the middle of performing an action, wants to interrupt the action and perform another action. The following description deals with the exchange of messages between the image generating apparatus 1 and the lower action determining section 11 in such a situation.

Suppose, for example, that an artificial creature, in the middle of an action of walking from point A toward point B, happens to think that it wants to go to point C in a different direction when it arrives at an intermediate point x1. In the figure, each ● indicates a point where a key frame exists. In the example shown, key frames exist at points A, B, and C, and also at intermediate points x2 and x3 between point x1 and point B.

Figure 48:
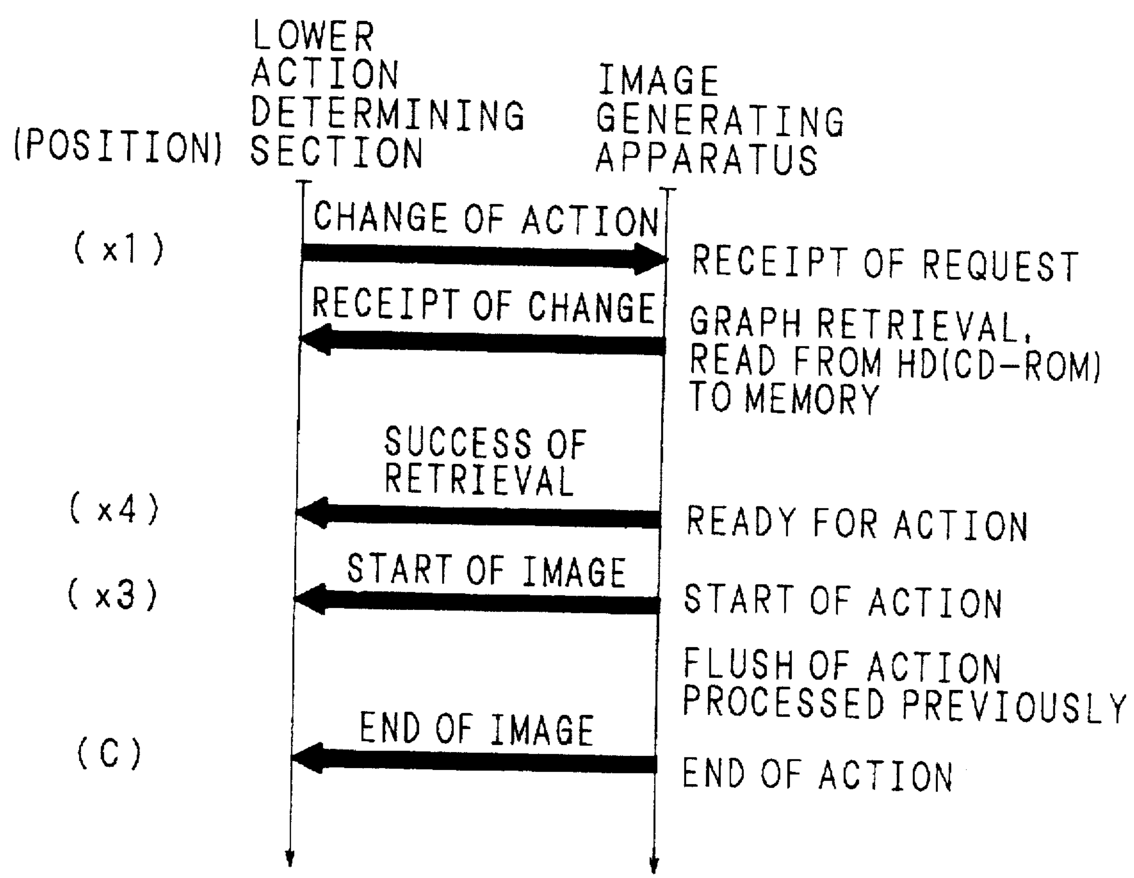
FIG. 48 is a message transfer diagram illustrating the exchange of messages between the image generating apparatus and the lower action determining section when the change of action has been made successfully.

FIG. 48 is a message transfer diagram illustrating the exchange of messages between the image generating apparatus 1 and the lower action determining section 11 when the above change of action to change the target point from point B to point C has been made successfully. At point x1, an action change message is sent from the lower action determining section 11 to the image generating apparatus 1. Upon accepting this message, the image generating apparatus 1 returns a change-accepted message, and retrieves a graph from the hard disk (or CD-ROM) to read it into memory. When the reading action is completed at point x4 before x3, a retrieval success message is sent to the lower action determining section 11. Then, the action of moving from point x3 toward point C is initiated, and an image start message is sent to the lower action determining section 11, while at the same time, the previous action of moving from point A toward point C is flushed from the memory. When the action of moving toward C is completed, an image end message is sent to the lower action determining section 11. In this manner, in the middle of the action of moving from point A toward point B, the target position can be changed from point B to point C, and the point C can be reached via point x3.

Figure 49:
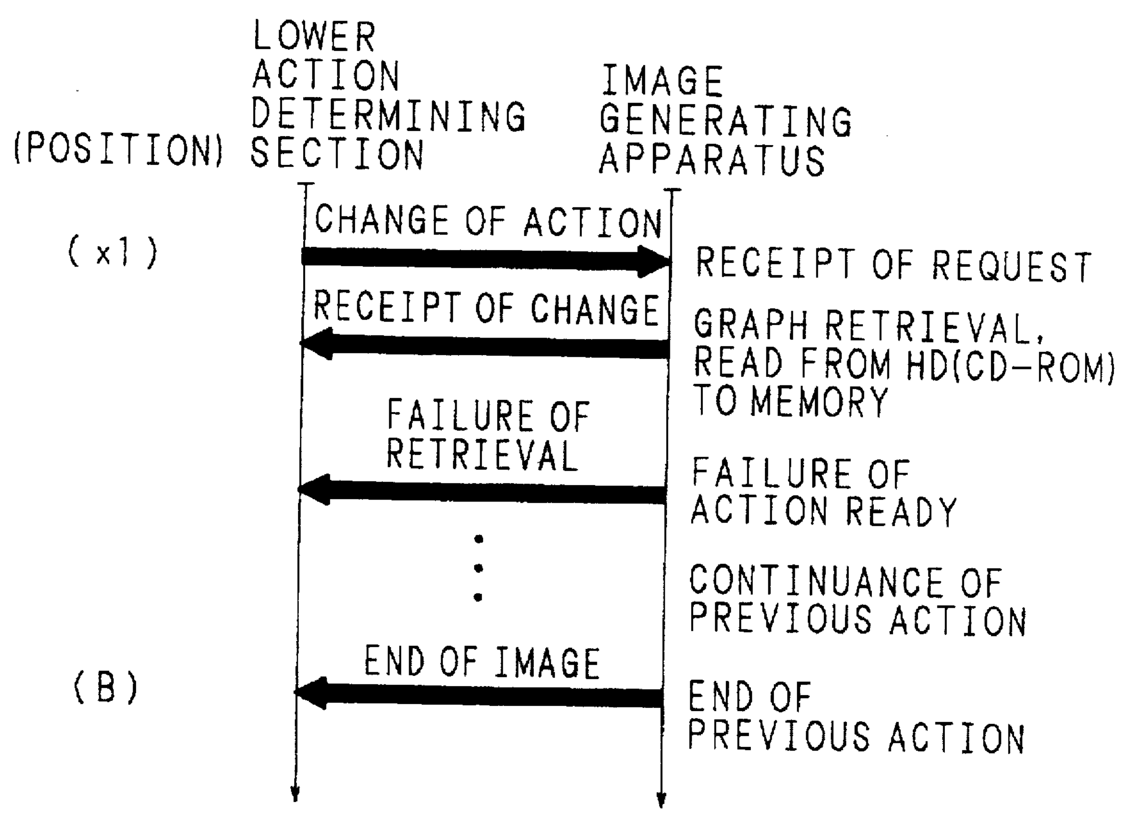
FIG. 49 is a message transfer diagram illustrating the exchange of messages between the image generating apparatus and the lower action determining section when the change of action has failed.

FIG. 49 is a message transfer diagram illustrating the exchange of messages between the image generating apparatus 1 and the lower action determining section 11 when the above change of action to change the target point from point B to point C has failed. As in FIG. 48, an action change message is sent at point x1, and a graph is retrieved and read into memory. However, it is determined that no change of action is made here, and a retrieval failure message is sent to the lower action determining section 11. The criterion for deciding no action change is, for example, as follows: change of action is not accepted within a predetermined time (a few seconds) before the end time of the current action, or no change is accepted after the higher action determining section 12 has issued an action end message. Then, the previous action (action of moving from point A toward point B) is continued, and when the action is completed, the image end message is sent to the lower action determining section 11. As a result, the action change request is not accepted, and the action reaches point B.

④ Planning of action

Figure 50:
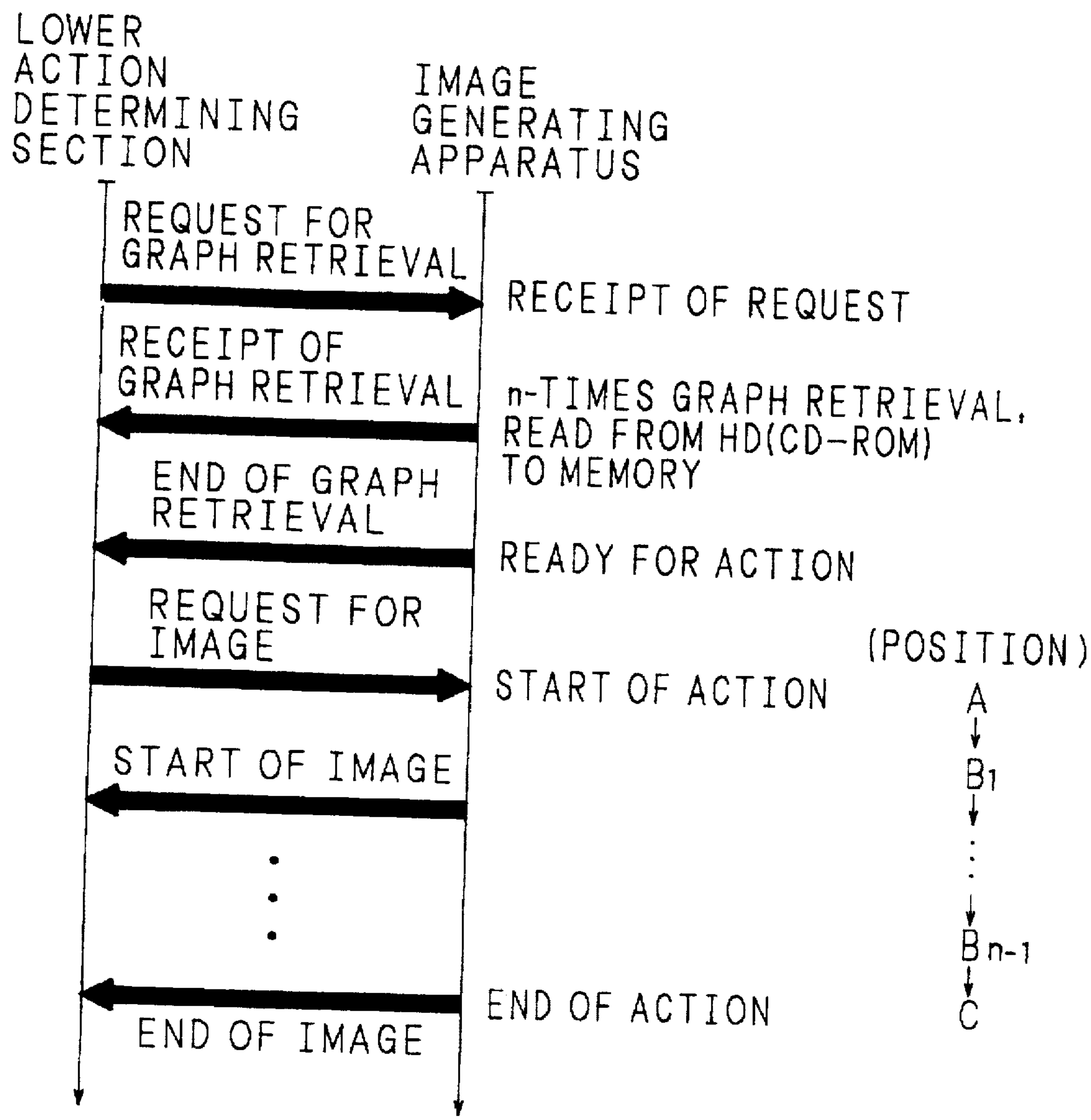
FIG. 50 is a message transfer diagram illustrating the exchange of messages between the image generating apparatus and the lower action determining section for a planned action.

A description will now be given of the exchange of messages when an artificial creature works out an action plan by connecting a series of actions and carries out the plan. Suppose, for example, an action is planned for flying from start point A to target point C via points $B_1$, $B_2$, . . . , $B_{n-1}$. FIG. 50 is a message transfer diagram illustrating the exchange of messages between the image generating apparatus 1 and the lower action determining section 11 in this situation. A message, requesting an image flying from point A to point C via (n−1) intermediate points, is transferred from the lower action determining section 11 to the image generating apparatus 1. Upon accepting this message, the image generating apparatus 1 performs graph retrieval from the hard disk (or CD-ROM) n times, and reads the results into memory. When the read action is completed, a ready message is sent to the lower action determining section 11. Then, when an image request message is received from the lower action determining section 11, the action (flying action) is initiated, and an image start message is returned to the lower action determining section 11. When a series of flying actions is completed and the target point C is reached, an image end message is sent to the lower action determining section 11. If an image request is made for every action between adjacent points, n transfers will become necessary, but in the above example, no transfer is necessary, and the action can be displayed with a single continuous image.

Figure 51A:
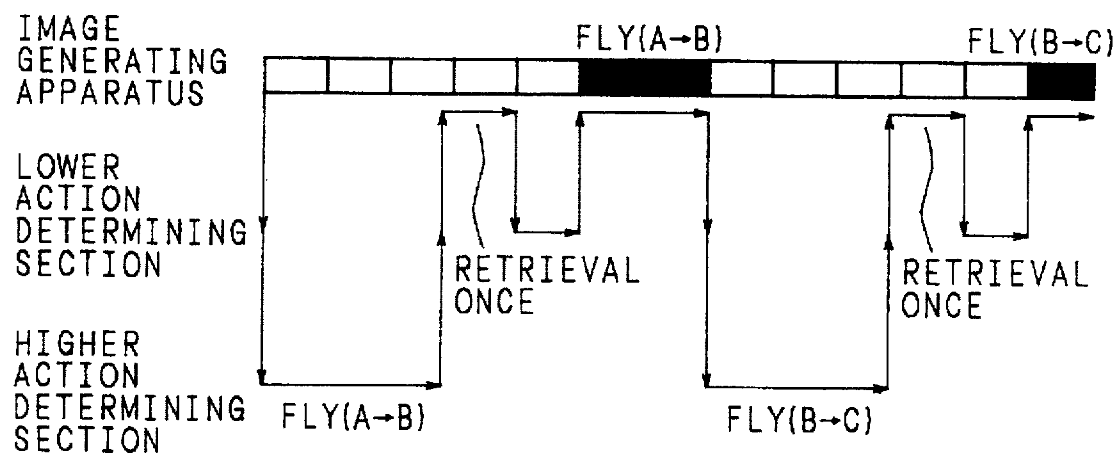
FIGS. 51A and 51B are diagrams illustrating the flow of messages and the operation of the image generating apparatus, and the lower action determining section, and higher action determining section.
Figure 51B:
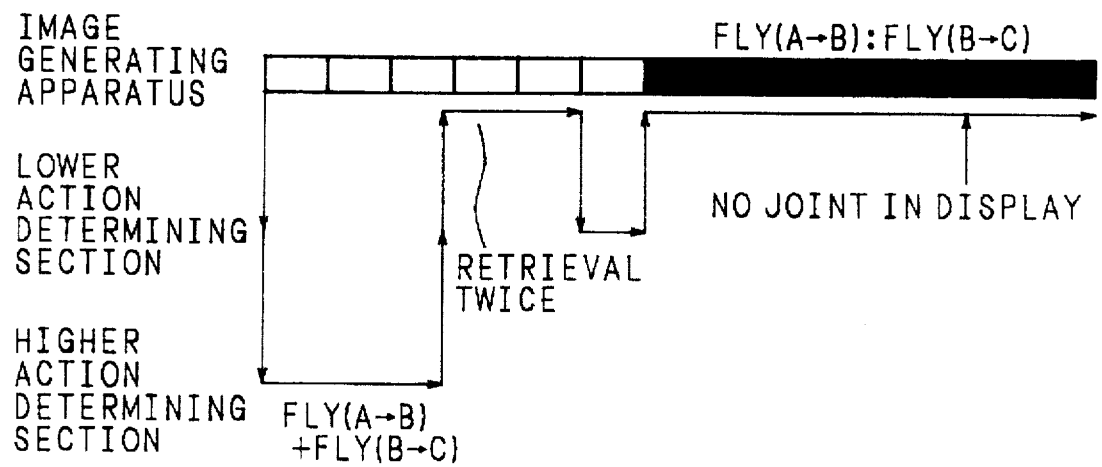

FIGS. 51A and 51B illustrate the flow of messages and the operation of the image generating apparatus 1, lower action determining section 11, and higher action determining section 12 when an action plan for flying from point A to target point C via point B is presented for image display. FIG. 51A shows an example in which an image request message is sent for action from point A to point B, and then for action from point B to point C, respectively. FIG. 51B, shows the above-described example. In the example of FIG. 51A, a joint is seen in image display, but in the example of FIG. 51B, image display is presented as a series of continuous actions.

As described, when a particular action is planned ahead, a message requesting a series of images, as in the above-described example, is sent. Since there are no interruptions associated with transfers, unnatural visual effects due to interruptions can be prevented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image generating apparatus, comprising:

a command interpreting unit for interpreting a command requesting a generation of an intended image;

an information storage unit for storing information required for generating an image;

an image selecting unit for selecting an image from said information storage unit in accordance with an interpretation result from said command interpreting unit; and an image display unit for displaying the image selected by said image selecting unit, said information storage unit including an image information unit storing image information, and a reference information unit storing information to which reference is made in selecting an image from said image information unit, thus allowing said image selecting unit to select images that substantially correspond to the content of interpretation from said command interpreting unit in accordance with the information from said reference information unit.

2. An image generating apparatus according to claim 1, wherein said reference information unit includes a similarity information unit where similarity information is registered that indicates image similarity in a plurality of frames in different image sequences, and said image selecting unit generates images by combining the image sequences in a continuous manner on the basis of the similarity information.

3. An image generating apparatus according to claim 2, wherein said image selecting unit combines the last frame of one image sequence with the first frame of the next image sequence in a continuous manner.

4. An image generating apparatus according to claim 2, wherein said image selecting unit combines an intermediate frame in one image sequence with a frame in another image sequence in a continuous manner.

5. An image generating apparatus according to claim 2, wherein when combining image sequences, said image selecting unit inserts a frame interpolating image between the image sequences.

6. An image generating apparatus according to claim 1, wherein said reference information unit includes a positional displacement information unit where a positional displacement allowable area is registered within which displacement in a display position produces a natural visual effect, and said image selecting unit generates a positionally displaced image by selecting an image leading from the start point to the end point on the basis of the information retrieved from said positional displacement information unit.

7. An image generating apparatus according to claim 6, wherein said positional displacement information unit registers the positional displacement allowable areas in a corresponding relationship to the respective frames of image information stored in said image information unit.

8. An image generating apparatus according to claim 6, wherein said positional displacement information unit registers the sum of the positional displacement allowable areas for the respective frames in the image sequences stored in said image information unit.

9. An image generating apparatus according to claim 6, wherein said positional displacement information unit registers a three-dimensional positional displacement allowable area.

10. An image generating apparatus according to claim 1, wherein said reference information unit includes a thinning-in-time information unit where a time-scale adjustment allowable range is registered for each image sequence representing a continuous motion, and said image selecting unit removes frames in the image sequence on the basis of the information retrieved from said thinning-in-time information unit.

11. An image generating apparatus according to claim 10, wherein said thinning-in-time information unit registers a thinning priority for each frame of the image sequence, and said image selecting unit determines the frames to be removed according to the thinning priority.

12. An image generating apparatus according to claim 1, wherein said reference information unit includes a graph information unit where graph information is stored that describes the action of an object by a node having the type and relative position of the object in an image and by an arc representing elapsed time from one node to the next, and said image selecting unit searches said graph information unit and selects images to be retrieved from said image information unit, by referencing the type of the object before the start of a movement, the position thereof at the end of the movement, and the time taken to complete the movement, which are given as parameters of the command.

13. An image generating apparatus according to claim 12, wherein said graph information unit manages a total graph constructed by connecting a plurality of partial graphs at nodes similar in type, and velocity vector.

14. An image generating apparatus according to claim 13, wherein said graph information unit includes a sorted table in which all the nodes forming the total graph are sorted according to the relative positions of the nodes.

15. An image generating apparatus according to claim 13, wherein said graph information unit includes a transfer table in which precalculated probabilities of transfer between the partial graphs connected as the total graph are stored.

16. An image generating apparatus according to claim 13, wherein from a plurality of candidates obtained by searching the total graph, said image selecting unit selects a candidate whose position error, time error and unnaturalness degree at the end of movement are the smallest.

17. An image generating apparatus according to claim 16, wherein said image selecting unit assigns weights to the position error, the time error and the unnaturalness degree at the end of the movement according to their priorities given as parameters of the command.

18. An image generating apparatus according to claim 1, wherein an action of an object in an image includes one main action and one or more sub actions, said reference information unit includes an action table showing the relationship of image connection between the main action and the sub-actions and a movement table showing the kind of action joining two points, and said image selecting unit selects images to be retrieved from said image information unit by referring to the action table and the movement table on the basis of the action of the object given as a parameter of the command.

19. An image generating apparatus according to claim 18, wherein said image selecting unit retrieves a plurality of candidates, and selects from the plurality of candidates thus retrieved a candidate whose position error, time error and unnaturalness degree at the end of action are the smallest.

20. An image generating apparatus according to claim 19, wherein the unnaturalness degree is obtained with the ratio between the main action and the sub-actions and the number of image connections as indicators.

21. An image generating apparatus according to claim 19, wherein the position error, the time error, and the unnaturalness degree at the end of the action are respectively weighted according to their priorities given as parameters of the command.

22. An image generating apparatus, comprising:

a command output unit for outputting a command requesting an image that fits an intended action;

a command interpreting unit for interpreting a command requesting a generation of an intended image;

an information storage unit for storing information required for generating an image;

an image selecting unit for selecting an image from said information storage unit in accordance with an interpretation result from said command interpreting unit; and an image display unit for displaying the image selected by said image selecting unit, and before display of the image in accordance with the previous command is complete, a request to output the next command is sent to said command output unit.

23. An image generating apparatus, comprising:

a command output unit for outputting a command requesting an image that fits an intended action;

a command interpreting unit for interpreting a command requesting a generation of an intended image;

an information storage unit for storing information required for generating an image;

an image selecting unit for selecting an image from said information storage unit in accordance with an interpretation result from said command interpreting unit, and for storing the selected image; and an image display unit for displaying the image selected by said image selecting unit, and when the command from said command output unit is concerned with a normal action, the stored image is erased upon completion of display, and when the command from said command output unit is concerned with a sudden action, the stored image is retained after completion of display.

24. An image generating apparatus, comprising:

a command output unit for outputting a command requesting an image that fits an intended action;

a command interpreting unit for interpreting a command requesting a generation of an intended image;

an information storage unit for storing information required for generating an image;

an image selecting unit for selecting an image from said information storage unit in accordance with an interpretation result from said command interpreting unit; and an image display unit for displaying the image selected by said image selecting unit, and during display of the image of the action directed by the previous command from said command output unit, if a command directing a different action is outputted within a predetermined time before the completion time of the action directed by the previous command, the output command is rendered invalid.

25. An image generating apparatus, comprising:

a command output unit for outputting a command requesting an image that fits an intended action;

a command interpreting unit for interpreting a command requesting a generation of an intended image;

an information storage unit for storing information required for generating an image;

an image selecting unit for selecting an image from said information storage unit in accordance with an interpretation result from said command interpreting unit; and an image display unit for displaying the image selected by said image selecting unit, and when said command output unit requests images for a plurality of successive actions, images are requested together corresponding to the plurality of successive actions.

26. An image generating apparatus according to claim 22, wherein said command output unit includes a first action determining section for determining a pattern of planned action and a second action determining section for determining a pattern of reflex action.

27. An image generating apparatus, comprising:

rim creating means for creating a rim by extracting an image of a character from each of a plurality of frames produced by actually shooting the character in action;

first calculating means for calculating a three-dimensional position of the thus created rim;

designating means for designating priority of a key rim which is the first or the last rim of one action;

second calculating means for calculating priority of each of intermediate rims between the key rims by interpolation on the basis of the priority of the key rims; and extracting means for selecting the key rims and some of the intermediate rims between the key rims on the basis of the calculated priority of each rim, and for extracting image data and three-dimensional positions of the selected rims including the key rims.

28. An image generating apparatus according to claim 27, wherein said second calculating means calculates the priority of each of the intermediate rims between the key rims by interpolation using a spline function.

29. An image generating apparatus, comprising:

rim creating means for creating a rim by extracting an image of a character from each of a plurality of frames produced by actually shooting the character in action;

first calculating means for calculating a three-dimensional position of the thus created rim;

designating means for designating priority of a key rim, which is the first or the last rim of one action, and priority of an arbitrary rim other than the key rims;

second calculating means for calculating priority of each of remaining rims by interpolation on the basis of the designated priority; and extracting means for selecting key rims and some of intermediate rims between the key rims on the basis of the calculated priority of each rim, and for extracting image data and three-dimensional positions of the selected rims including the key rims.

30. An image generating apparatus, comprising:

rim creating means for creating a rim by extracting an image of a character from each of a plurality of frames produced by actually shooting the character in action;

first calculating means for calculating a three-dimensional position of the thus created rim;

designating means for designating a movement allowable area of a key rim which is the first or the last rim of one action;

second calculating means for calculating a movement allowable area of each of intermediate rims between the key rims on the basis of the designated movement allowable areas of the key rims; and extracting means for selecting the key rims and some of the intermediate rims between the key rims, and for extracting the movement allowable areas of the selected rims.

31. An image generating apparatus according to claim 30, wherein said designating means performs control so that the movement allowable area of a key rim occurring later in order of time is made larger than the movement allowable area of a key rim occurring earlier in order of time.

32. An image generating apparatus according to claim 30, wherein said second calculating means calculates the movement allowable area of each of the intermediate rims by linear interpolation.

* * * * *